United States Patent
Kang et al.

(10) Patent No.: US 11,347,372 B2
(45) Date of Patent: *May 31, 2022

(54) USER TERMINAL DEVICE AND DISPLAYING METHOD THEREOF

(71) Applicant: SAMSUNG ELECTRONICS CO., LTD., Suwon-si (KR)

(72) Inventors: Dong-goo Kang, Seoul (KR); Yun-kyung Kim, Suwon-si (KR); Yong-yeon Lee, Suwon-si (KR); Ji-yeon Kwak, Seoul (KR); Hae-yoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 75 days.

This patent is subject to a terminal disclaimer.

(21) Appl. No.: 16/571,261

(22) Filed: Sep. 16, 2019

(65) Prior Publication Data

US 2020/0012412 A1 Jan. 9, 2020

Related U.S. Application Data

(63) Continuation of application No. 14/618,223, filed on Feb. 10, 2015, now Pat. No. 10,437,414.

(Continued)

(30) Foreign Application Priority Data

Oct. 7, 2014 (KR) .......................... 10-2014-0134886

(51) Int. Cl.
*G06F 3/048* (2013.01)
*G06F 3/04817* (2022.01)
(Continued)

(52) U.S. Cl.
CPC ........ *G06F 3/04817* (2013.01); *G06F 1/1641* (2013.01); *G06F 1/1652* (2013.01);
(Continued)

(58) Field of Classification Search
None
See application file for complete search history.

(56) References Cited

U.S. PATENT DOCUMENTS 7,453,437 B2  11/2008  Inui
8,502,788 B2   8/2013  Cho
(Continued)

FOREIGN PATENT DOCUMENTS

CN   1334690 A    2/2002
CN   1879395 A   12/2006
(Continued)

OTHER PUBLICATIONS

Communication dated Oct. 8, 2019, issued by the Chinese Patent Office in counterpart Chinese Application No. 201580007942.5.
(Continued)

*Primary Examiner* — Thanh T Vu
(74) *Attorney, Agent, or Firm* — Sughrue Mion, PLLC

(57) ABSTRACT

A user terminal device and a controlling method thereof are provided. The user terminal device includes a display configured to be divided into a first area and a second area which is larger than the first area with reference to a folding line, a detector configured to detect a user interaction, and a controller configured to, in response to a folding of the display with reference to the folding line being detected through the detector, control the display to display a predetermined UI on an exposure area which is exposed part of the second area.

12 Claims, 83 Drawing Sheets

Related U.S. Application Data

(60) Provisional application No. 61/937,744, filed on Feb. 10, 2014.

(51) Int. Cl.

| | | |
|---|---|---|
| *G06F 3/0482* | (2013.01) | |
| *G06F 3/04842* | (2022.01) | |
| *G06F 3/0488* | (2022.01) | |
| *G06F 9/451* | (2018.01) | |
| *G06F 1/16* | (2006.01) | |
| *G06F 3/0487* | (2013.01) | |
| *G06F 3/04883* | (2022.01) | |
| *G06F 3/04886* | (2022.01) | |
| *G11B 27/34* | (2006.01) | |
| *H04M 1/02* | (2006.01) | |
| *H04M 1/72403* | (2021.01) | |
| *H04M 1/72469* | (2021.01) | |

(52) U.S. Cl.
CPC .......... *G06F 1/1677* (2013.01); *G06F 1/1694* (2013.01); *G06F 3/0482* (2013.01); *G06F 3/0487* (2013.01); *G06F 3/0488* (2013.01); *G06F 3/04842* (2013.01); *G06F 3/04883* (2013.01); *G06F 3/04886* (2013.01); *G06F 9/451* (2018.02); *G11B 27/34* (2013.01); *H04M 1/0214* (2013.01); *H04M 1/0243* (2013.01); *H04M 1/0245* (2013.01); *H04M 1/72403* (2021.01); *H04M 1/72469* (2021.01); *G06F 2200/1637* (2013.01); *G06F 2203/04803* (2013.01); *H04M 2250/16* (2013.01); *H04M 2250/22* (2013.01)

(56) References Cited

U.S. PATENT DOCUMENTS

| | | | |
|---|---|---|---|
| 8,836,611 | B2 | 9/2014 | Kilpatrick, II et al. |
| 8,863,038 | B2 | 10/2014 | King et al. |
| 8,866,840 | B2 | 10/2014 | Dahl et al. |
| 8,923,934 | B2 | 12/2014 | Choi et al. |
| 8,947,462 | B2 | 2/2015 | Joo |
| 9,020,571 | B2 | 4/2015 | Chi et al. |
| 9,112,988 | B2 | 8/2015 | Lee et al. |
| 9,436,378 | B2 | 9/2016 | Lee et al. |
| 9,448,660 | B2 | 9/2016 | Seo et al. |
| 9,489,078 | B2 | 11/2016 | Seo et al. |
| 9,489,079 | B2 | 11/2016 | Seo et al. |
| 9,489,080 | B2 | 11/2016 | Seo et al. |
| 9,495,094 | B2 | 11/2016 | Kang et al. |
| 9,684,342 | B2 | 6/2017 | Kim et al. |
| 9,818,370 | B2 | 11/2017 | Joo |
| 9,864,438 | B2 | 1/2018 | Seo et al. |
| 10,114,476 | B2 | 10/2018 | Seo et al. |
| 10,275,045 | B2 | 4/2019 | Seo et al. |
| 10,459,625 | B2 | 10/2019 | Seo et al. |
| 10,503,274 | B2 | 12/2019 | Seo et al. |
| 10,534,531 | B2 | 1/2020 | Seo et al. |
| 10,642,485 | B1 | 5/2020 | Seo et al. |
| 2002/0005818 | A1 | 1/2002 | Bruzzone |
| 2005/0104866 | A1* | 5/2005 | Inui ................. G06F 1/1647 |
| | | | 345/173 |
| 2006/0189345 | A1 | 8/2006 | Suzuki et al. |
| 2007/0149262 | A1 | 6/2007 | Navntof |
| 2008/0158795 | A1 | 7/2008 | Aoki et al. |
| 2009/0011798 | A1 | 1/2009 | Yamada |
| 2009/0164951 | A1 | 6/2009 | Kumar |
| 2010/0056272 | A1 | 3/2010 | Dutilly et al. |
| 2010/0064244 | A1 | 3/2010 | Kilpatrick, II et al. |
| 2010/0079355 | A1 | 4/2010 | Kilpatrick, II et al. |
| 2010/0085274 | A1 | 4/2010 | Kilpatrick, II et al. |
| 2010/0120470 | A1 | 5/2010 | Kim et al. |
| 2010/0131880 | A1 | 5/2010 | Lee et al. |
| 2010/0162169 | A1 | 6/2010 | Skarp |
| 2010/0182265 | A1 | 7/2010 | Kim et al. |
| 2010/0241989 | A1* | 9/2010 | Wen ................. G06F 3/04886 |
| | | | 715/800 |
| 2010/0302179 | A1 | 12/2010 | Ahn et al. |
| 2011/0126141 | A1 | 5/2011 | King et al. |
| 2011/0216064 | A1 | 9/2011 | Dahl et al. |
| 2011/0241998 | A1 | 10/2011 | McKinney et al. |
| 2012/0115422 | A1 | 5/2012 | Tziortzis et al. |
| 2012/0129581 | A1 | 5/2012 | Choi et al. |
| 2012/0174026 | A1 | 7/2012 | Shim et al. |
| 2012/0212430 | A1 | 8/2012 | Jung et al. |
| 2012/0262367 | A1 | 10/2012 | Chiu et al. |
| 2012/0299813 | A1 | 11/2012 | Kang et al. |
| 2012/0307472 | A1 | 12/2012 | Bohn et al. |
| 2013/0021762 | A1 | 1/2013 | van Dijk et al. |
| 2013/0027364 | A1 | 1/2013 | Kim et al. |
| 2013/0050270 | A1 | 2/2013 | Joo |
| 2013/0076649 | A1 | 3/2013 | Myers et al. |
| 2013/0097668 | A1 | 4/2013 | Park et al. |
| 2013/0120239 | A1 | 5/2013 | Suzuki et al. |
| 2013/0127918 | A1 | 5/2013 | Kang et al. |
| 2013/0141373 | A1 | 6/2013 | Takuma et al. |
| 2013/0154970 | A1 | 6/2013 | Seo et al. |
| 2013/0176248 | A1 | 7/2013 | Shin et al. |
| 2013/0215041 | A1 | 8/2013 | Kim et al. |
| 2013/0222998 | A1 | 8/2013 | Cho et al. |
| 2013/0265221 | A1 | 10/2013 | Lee et al. |
| 2013/0296000 | A1 | 11/2013 | Park et al. |
| 2013/0300679 | A1 | 11/2013 | Oh et al. |
| 2013/0300687 | A1 | 11/2013 | Park |
| 2013/0300697 | A1 | 11/2013 | Kim et al. |
| 2013/0307816 | A1 | 11/2013 | Lee et al. |
| 2013/0314349 | A1 | 11/2013 | Chien et al. |
| 2013/0315419 | A1 | 11/2013 | Chien |
| 2013/0321340 | A1 | 12/2013 | Seo et al. |
| 2013/0328914 | A1* | 12/2013 | Smith ................. G06F 1/1613 |
| | | | 345/619 |
| 2014/0004906 | A1 | 1/2014 | Chi et al. |
| 2014/0015743 | A1 | 1/2014 | Seo et al. |
| 2014/0028596 | A1 | 1/2014 | Seo et al. |
| 2014/0029212 | A1 | 1/2014 | Hwang et al. |
| 2014/0062919 | A1 | 3/2014 | Park |
| 2014/0245225 | A1 | 8/2014 | Yagihashi et al. |
| 2014/0320393 | A1 | 10/2014 | Modarres et al. |
| 2015/0004939 | A1 | 1/2015 | Higashibeppu |
| 2015/0145798 | A1 | 5/2015 | Joo |
| 2015/0153778 | A1 | 6/2015 | Jung |
| 2015/0227271 | A1 | 8/2015 | Kang et al. |
| 2015/0277695 | A1 | 10/2015 | Lee et al. |
| 2015/0309691 | A1 | 10/2015 | Seo et al. |
| 2015/0378503 | A1 | 12/2015 | Seo et al. |
| 2016/0357397 | A1 | 12/2016 | Lee et al. |
| 2016/0370877 | A1 | 12/2016 | Seo et al. |
| 2017/0052698 | A1 | 2/2017 | Seo et al. |
| 2018/0120954 | A1 | 5/2018 | Seo et al. |
| 2019/0033984 | A1 | 1/2019 | Seo et al. |
| 2019/0179425 | A1 | 6/2019 | Seo et al. |
| 2019/0272091 | A1 | 9/2019 | Seo et al. |
| 2020/0117285 | A1 | 4/2020 | Seo et al. |

FOREIGN PATENT DOCUMENTS

| | | |
|---|---|---|
| CN | 101452365 A | 6/2009 |
| CN | 101788850 A | 7/2010 |
| CN | 102150095 A | 8/2011 |
| CN | 102150120 A | 8/2011 |
| CN | 102187296 A | 9/2011 |
| CN | 102469183 A | 5/2012 |
| CN | 102591558 A | 7/2012 |
| CN | 103477304 A | 12/2013 |
| EP | 2 581 808 A1 | 4/2013 |
| EP | 3105666 | 8/2015 |
| EP | 3105667 | 8/2015 |
| JP | 2005-149364 A | 6/2005 |
| JP | 2009-124449 A | 6/2009 |
| JP | 2009-201157 A | 9/2009 |
| JP | 2010-63159 A | 3/2010 |
| JP | 2010-66918 A | 3/2010 |
| JP | 2010-146506 A | 7/2010 |

(56) References Cited

FOREIGN PATENT DOCUMENTS

| | | |
|---|---|---|
| JP | 2013-73352 A | 4/2013 |
| KR | 10-2006-0066136 A | 6/2006 |
| KR | 10-2010-0019164 A | 2/2010 |
| KR | 10-1063882 B1 | 9/2011 |
| KR | 10-2012-0091979 A | 8/2012 |
| KR | 1020120092037 A | 8/2012 |
| KR | 10-2013-0024085 A | 3/2013 |
| KR | 10-2013-0056674 A | 5/2013 |
| KR | 10-2013-0113895 A | 10/2013 |
| KR | 10-2013-0127122 A | 11/2013 |
| KR | 10-2014-0003132 A | 1/2014 |
| KR | 10-2014-0016082 A | 2/2014 |
| RU | 2480811 C2 | 4/2013 |
| WO | 2005053287 A1 | 6/2005 |
| WO | 2008/147637 A1 | 2/2008 |
| WO | 2010/028394 A1 | 3/2010 |
| WO | 2012/160674 A1 | 11/2012 |
| WO | 2013/154318 A1 | 10/2013 |
| WO | 2014/021628 A1 | 2/2014 |

OTHER PUBLICATIONS

Communication dated Nov. 20, 2019, issued by the Australian Patent Office in counterpart Australian Application No. 2018203609.
"Mailbox", 2013, Retrieved from https://web.archive.org/web/20130427055457/http://uxarchive.com/apps/mailbox, 2 pages total.
Natarajan, A., "How To Answer A Call on Samsung Galaxy Note", Jan. 1, 2013, Retrieved from https://www.primeinspiration.com/how-to-answer-a-call-on-samsung-galaxy-note-2.html, 1 page total.
Communication dated Aug. 5, 2020, from the Brazilian Patent Office in counterpart application No. BR112016018262-6.
Communication dated Aug. 12, 2020, from the European Patent Office in counterpart European Application No. 20170860.9.
Communication dated Jul. 7, 2020, from the European Patent Office in counterpart European Application No. 15746584.0.
Communication dated Aug. 31, 2020, issued by the Korean Intellectual Property Office in corresponding Korean Application No. 10-2020-0066043.
Communication dated Dec. 22, 2020 issued by the Korean Intellectual Property Office in counterpart English Korean Application No. 10-2014-0083244.
Communication dated Dec. 22, 2020 issued by the Korean Intellectual Property Office in counterpart Korean Application No. 10-2014-0083282.
Communication dated Nov. 30, 2020 issued by the European Intellectual Property Office in counterpart European Application No. 15 746 584.0.
An Office Action dated Nov. 9, 2017, which issued during the prosecution of U.S. Appl. No. 14/618,421.
Communication dated Apr. 2, 2019, from the State Intellectual Property Office of People's Republic of China in counterpart Application No. 201580007942.5.
Communication dated Dec. 22, 2017, from the European Patent Office in counterpart European Application No. 15746584.0.
Communication dated Feb. 1, 2017, issued by the United States Patent and Trademark Office in counterpart U.S. Appl. No. 14/618,447.
Communication dated Feb. 12, 2019, from the European Patent Office in counterpart European Application No. 15746532.9.
Communication dated Feb. 12, 2019, from the European Patent Office in counterpart European Application No. 15746883.6.
Communication dated Feb. 8, 2019, from the European Patent Office in counterpart European Application No. 15745916.5.
Communication dated Jan. 18, 2019, from the State Intellectual Property Office of People's Republic of China in counterpart Application No. 201580007966.0.
Communication dated Jan. 20, 2017, issued by the United States Patent and Trademark Office in counterpart U.S. Appl. No. 14/618,421.
Communication dated Jul. 1, 2016 issued by the United States Patent and Trademark Office in counterpart U.S. Appl. No. 14/618,447.
Communication dated Jul. 2, 2018, issued by the State Intellectual Property Office of P.R. China in counterpart Chinese Application No. 201580007966.0.
Communication dated Jul. 3, 2018, issued by the State Intellectual Property Office of P.R. China in counterpart Chinese Application No. 201580007942.5.
Communication dated Jun. 2, 2016 issued by the United States Patent and Trademark Office in counterpart U.S. Appl. No. 14/618,421.
Communication dated Mar. 22, 2017, issued by the United States Patent and Trademark Office in counterpart U.S. Appl. No. 14/618,379.
Communication dated May 2, 2019, issued by the USPTO in counterpart U.S. Appl. No. 16/165,736.
Communication dated May 8, 2019, issued by the State Intellectual Property Office of P.R. China in counterpart Chinese Application No. 201580007989.1.
Communication dated Oct. 2, 2017, from the European Patent Office in counterpart European Application No. 15746883.6.
Communication dated Oct. 27, 2017, from the Russian Patent Office in counterpart Russian Application No. 2016136345/08.
Communication dated Sep. 10, 2018, from the State Intellectual Property Office of People's Republic of China in counterpart Application No. 201580007972.6.
Communication dated Sep. 3, 2018, issued by the State Intellectual Property Office of P.R. China in counterpart Chinese Application No. 201580007989.1.
Communication from United States Patent and Trademark Office dated Apr. 27, 2018, in U.S. Appl. No. 14/618,379.
Communication from United States Patent and Trademark Office dated Feb. 21, 2018, in U.S. Appl. No. 14/618,447.
Communication dated Aug. 31, 2017 by the United States Patent and Trademark Office in counterpart U.S. Appl. No. 14/618,379.
Communication dated Jul. 10, 2017 by the Japanese Patent Office in counterpart Japanese Patent Application No. 2016-568774.
Communication dated Jul. 11, 2017 by the Australian Patent Office in counterpart Australian Patent Application No. 2015214697.
Communication dated Jul. 20, 2017 by the United States Patent and Trademark Office in counterpart U.S. Appl. No. 14/618,447.
Communication dated May 31, 2019, issued by the Korean Intellectual Property Office in counterpart Korean Patent Application No. 10-2014-0090403.
Communication dated Sep. 19, 2017 by the European Patent Office in counterpart European Patent Application No. 15745916.5.
Communication dated Sep. 4, 2017 by the European Patent Office in counterpart European Patent Application No. 15746532.9.
Communication dated Sep. 4, 2017 by the European Patent Office in counterpart European Patent Application No. 15746584.0.
Office Action dated Nov. 28, 2018 by the U.S. Patent and Trademark Office in counterpart U.S. Appl. No. 14/618,379.
Office Action dated Oct. 31, 2018 by the Korean Patent Office in counterpart Korean Patent Application No. 10-2014-0090403.
Patent Examination Report No. 2 dated Nov. 8, 2017, issued by the Australian IP Office in counterpart Australian Patent Application No. 2015214697.
Search Report dated Apr. 27, 2015 issued by the International Searching Authority in counterpart International Patent Application No. PCT/KR2015/001266.
Written Opinion dated Apr. 27, 2015 issued by the International Searching Authority in counterpart International Patent Application No. PCT/KR2015/001266.
Communication dated Feb. 7, 2019, issued by the USPTO in counterpart U.S. Appl. No. 14/618,379.
Communication dated Jul. 19, 2019 by the European Patent Office in counterpart European Patent Application No. 15 745 916.5.
Communication dated Jul. 19, 2019 issued by the Australian Patent Office in counterpart Australian Patent Application No. 2018203609.
Communication dated May 14, 2019, issued by the State Intellectual Property Office of P.R. China in counterpart Chinese Application No. 201580007972.6.
Communication dated Jun. 28, 2019 by the European Patent Office in counterpart European Patent Application No. 15746584.0.
Communication dated Jul. 9, 2019 by the European Patent Office in counterpart European Patent Application No. 15746532.9.

(56) References Cited

OTHER PUBLICATIONS

Search Report dated Apr. 28, 2015 issued by the International Searching Authority in counterpart International Patent Application No. PCT/KR2015/001347.
Written Opinion dated Apr. 28, 2015 issued by the International Searching Authority in counterpart International Patent Application No. PCT/KR2015/001347.
Search Report dated May 19, 2015 issued by the International Searching Authority in counterpart International Patent Application No. PCT/KR2015/001341.
Written Opinion dated May 19, 2015 issued by the International Searching Authority in counterpart International Patent Application No. PCT/KR2015/001341.
Search Report dated Apr. 30, 2015 issued by the International Searching Authority in counterpart International Patent Application No. PCT/KR2015/001312.
Written Opinion dated Apr. 30, 2015 issued by the International Searching Authority in counterpart International Patent Application No. PCT/KR2015/001312.
Communication dated Dec. 30, 2019 issued by the Korean Intellectual Property Office in counterpart Korean Application No. 10-2014-0090403.
Communication dated Mar. 12, 2020 issued by the European Intellectual Property Office in counterpart European Applicabon No. 19208930.6.
Communication dated Jan. 14, 2020 issued by the European Intellectual Property Office in counterpar European Application No. 15 746 532.9.
Communication dated Dec. 30, 2019 issued by the United States Patent Office in counterpart U.S. Appl. No. 16/683,629.
Communication dated Mar. 19, 2020 from the Indian Patent Office in application No. 201617029934.
Communication dated Mar. 20, 2020 from the Indian Patent Office in application No. 201617029937.
Communication dated Apr. 20, 2020 from the Indian Patent Office in application No. 201617029932.
Communication dated May 14, 2020 from the United States Patent and Trademark Office in U.S. Appl. No. 16/594,666.
Communication dated May 14, 2020 from the United States Patent and Trademark Office in U.S. Appl. No. 16/849,653.
Communication dated May 19, 2020 from the Indian Patent Office in application No. 201617029935.
Communication dated Mar. 29, 2021, issued by the Korean Intellectual Property Office in Korean Patent Application No. 10-2020-0066043.
Communication dated Apr. 6, 2021, issued by the European Patent Office in European Patent Application No. 20170860.9.
Communication dated May 12, 2021, issued by the Korean Intellectual Property Office in Korean Patent Application No. 10-2014-0134886.
Communication dated Jun. 4, 2021, issued by the European Patent Office in European Patent Application No. 21156096.6.
Communication dated Aug. 24, 2021 issued by the Intellectual Property India in Indian Application No. 202018019449.
Communication dated Jun. 29, 2021 issued by the Korean Intellectual Property Office in Korean Application No. 10-2014-0083244.
Office Action dated Jul. 8, 2021 issued by the United States Patent and Trademark Office in U.S. Appl. No. 17/091,456.
Communication dated Oct. 11, 2021 issued by the European Patent Office in European Application No. 20 170 860.9.
Communication dated Nov. 9, 2021 issued by the European Patent Office in European Application No. 19 208 930.8.
Communication dated Dec. 6, 2021 issued by the Korean Intellectual Property Office in Korean Application No. 10-2021-0117204.
Communication dated Dec. 29, 2021 issued by the Korean Intellectual Property Office in Korean Application No. 10-2014-0083244.
Communication dated Feb. 24, 2022 issued by the European Patent Office in European Application No. 20 170 860.9.
Communication dated Feb. 28, 2022 issued by the United States Patent Office in U.S. Appl. No. 17/164,364.
Communication dated Mar. 3, 2022 issued by the Korean Intellectual Property Office in Korean Application No. 10-2014-0083244.
Communication dated Apr. 5, 2022, issued by the European Patent Office in counterpart European Patent Application No. 20 170 860.9.

* cited by examiner

USER TERMINAL DEVICE AND DISPLAYING METHOD THEREOF

CROSS-REFERENCE TO RELATED APPLICATIONS

This application is a continuation of U.S. patent application Ser. No. 14/618,223, filed on Feb. 10, 2015, which claims priority from Korean Patent Application No. 10-2014-0134886, filed in the Korean Intellectual Property Office on Oct. 7, 2014, and claims the benefit of U.S. Provisional Application No. 61/937,744, filed in the United States Patent and Trademark Office on Feb. 10, 2014, the disclosures of which are incorporated herein by reference in their entireties.

BACKGROUND

1. Field

Apparatuses and methods consistent with exemplary embodiments relate to a user terminal device and a displaying method thereof, and more particularly, to a user terminal device where a display is folded asymmetrically with reference to a folding line so as to expose a part of the display and a displaying method thereof.

2. Description of Related Art

With the development of electronic technology, various types of user terminal devices have been developed and distributed. Recently, the size of such user terminal devices has been minimized while the functions of the devices have become diverse and thus, the demands for user terminal devices have been increasing continuously.

A user terminal device may provide various contents such as multimedia contents and application screens according to a user's request. A user may select a desired function using a button or a touch screen provided with a user terminal device. A user terminal device may execute a program selectively according to a user interaction and display the result of execution.

Meanwhile, as a user terminal device provides more diverse functions, there are various needs for a method of displaying contents or a user interface method. In other words, as the method of displaying contents has changed and the type and function of contents have been increasing, the existing interaction methods such as simply selecting a button or touching a screen may not be sufficient to perform various functions of a user terminal device.

Particularly, a user terminal device of which display can be folded with reference to a folding line has been developed in order to minimize the size of the user terminal device. When the display is folded symmetrically with reference to the folding line, however, the display is folded completely and a user may not use or watch the display.

SUMMARY

Aspects of one or more exemplary embodiments relate to a user terminal device that, when a display is folded asymmetrically with reference to a folding line, exposing a part of the display, provides various User Interface (UI) through the exposed area, and a display method thereof.

According to an aspect of an exemplary embodiment, there is provided a user terminal device which includes a display configured to be divided into a first area and a second area which is larger than the first area with reference to a folding line, a detector configured to detect a user interaction, and a controller configured to, in response to detecting a folding of the display along the folding line, control the display to display a predetermined UI on an exposure area which is an exposed part of the second area.

The controller, in response to detecting a folding of the display along the folding line while the user terminal device executes a specific application, may be configured to control the display to display a UI for controlling the specific application on the exposure area.

The controller, in response to detecting a predetermined user interaction while the display is folded, may be configured to control the display to display a UI for releasing a lock state of the user terminal device on the exposure area.

The controller, in response to detecting a predetermined user interaction while the display is folded, may be configured to control the display to display a UI for changing a setting of the user terminal device on the exposure area.

The device may further include a communicator configured to send and receive messages, and the controller, in response to receiving a message while the display is folded, may be configured to control the display to display a UI for informing that the message is received on the exposure area.

The controller, in response to detecting an unfolding of the display up to a predetermined angle while the UI for informing that a message is received on the exposure area, may be configured to control the display to display a message window for responding to the message.

The controller, in response to one or more icons being displayed on the exposure area while the display is folded, and detecting an unfolding of the display while one of the icons is touched, may be configured to control the display to display a screen corresponding to the touched icon.

The controller, in response to the touched icon being a photo icon, may be configured to control the display to display a call screen on an upper area and a list for selecting a photo to be shared.

The controller, in response to receiving a message while a specific application is executed as the display is in a folded state, may be configured to control the display to display a UI for informing that the message is received on the exposure area, in response to detecting an unfolding of the display while the UI for informing that the message is received is touched, may be configured to control the display to display a message window for responding to the message, and in response to detecting an unfolding of the display while a UI for informing that the message is received is not touched, may be configured to control the display to display an execution screen of the specific application.

The controller, in response to a UI for releasing a lock state of the user terminal device being displayed on the exposure area as the display is in a folded state, and detecting an unfolding of the display after a lock release command is input through the UI for releasing the lock state of the user terminal device, may be configured to control the display to display a home screen, and in response to detecting an unfolding of the display while the lock release command is not input through a UI for releasing the lock state of the user terminal device, may be configured to control the display to display a UI for releasing the lock state of the user terminal device on full screen.

The controller, in response to a telephone call request being received while the display is folded, may be configured to control the display to display a UI for informing that a telephone call request is received on the exposure area, in response to the display being unfolded to a first angle range, may be configured to control the display to display at least one icon for controlling a function of the telephone call, and in response to the display being unfolded to a second angle range that is more than the first angle range, may be configured to accept the telephone call request and control the display to display a telephone call screen.

The controller, in response to a telephone call request being received while a specific application is executed as the display is in a folded state, may be configured to control the display to display a UI for informing that the telephone call request is received on the exposure area, in response to detecting an unfolding of the display, may be configured to accept the telephone call request and control the display to display a telephone call screen, and in response to terminating the telephone call, may be configured to control the display to display an execution screen of the specific application.

The controller, in response to detecting a folding of the display to a first angle while an execution screen of a specific application is displayed on the display, may be configured to control the display to display at least part of an execution screen of the specific application on at least part of the second area, and in response to detecting a folding of the display such that the first area of the display comes in contact with a second area, may be configured to control the display to display a brief information providing screen of the specific application on the exposure area.

According to an aspect of another exemplary embodiment, there is provided a displaying method of a user terminal device which includes displaying an image on a display which is divided into a first area and a second area that is larger than the first area with reference to a folding line and, in response to a detecting a folding of the display with reference to the folding line, displaying a predetermined UI on an exposure area which is an exposed part of the second area.

The displaying may include, in response to detecting a folding of the display with reference to a folding line while the user terminal device executes a specific application, displaying a UI for controlling the specific application on the exposure area.

The method may include, in response to detecting a predetermined user interaction while the display is folded, displaying a UI for releasing a lock state of the user terminal device on the exposure area.

The method may include, in response to detecting a predetermined user interaction while the display is folded, displaying a UI for changing a setting of the user terminal device on the exposure area.

The method may include, in response to receiving a message while the display is folded, displaying a UI for informing that the message is received on the exposure area.

The method may include, in response to the UI for informing that the message is received being displayed on the exposure area while the display is folded, and detecting an unfolding of the display up to a predetermined angle while the UI for informing that the message is received on the exposure area, displaying a message window for responding to the message.

The displaying may include displaying one or more icons on the exposure area, and in response to the one or more icons being displayed on the exposure area while the display is folded, and detecting an unfolding of the display while one of the plurality of icons is touched, displaying a screen corresponding to the touched icon.

The method may include, in response to a message being received while a specific application is executed as the display is in a folding state, displaying a UI for informing that the message is received on the exposure area, in response to detecting an unfolding of the display while the UI for informing that the message is received is touched, displaying a message window for responding to the message, and in response to detecting an unfolding of the display while the UI for informing that the message is received is not touched, displaying an execution screen of the specific application.

The displaying may include displaying a UI for releasing a lock state of the user terminal device on the exposure area while the display is folded, and in response to a UI for releasing a lock state of the user terminal device being displayed on the exposure area while the display is folded, and detecting an unfolding of the display after a lock release command is input through the UI for releasing the lock state of the user terminal device, displaying a home screen, and in response to detecting an unfolding of the display while a lock release command is not input through the UI for releasing the lock state of the user terminal device, displaying a UI for releasing the lock state of the user terminal device on full screen.

The displaying may include, in response to a telephone call request being received while the display is folded, displaying a UI for informing that a telephone call request is received on the exposure area, in response to the display being unfolded to a first angle range, displaying at least one icon for controlling a function of the telephone call, and in response to the display being unfolded to a second angle range that is more than the first angle range, accepting the telephone call request and displaying a telephone call screen.

The method may include, in response to a telephone call request being received f while a specific application is executed as the display is in a folding state, displaying a UI for informing that the telephone call request is received on the exposure area, in response to detecting an unfolding of the display, accepting the telephone call request and displaying a telephone call screen, and in response to the telephone call being terminated, displaying an execution screen of the specific application.

The method may include, in response to detecting a folding of the display to a first angle while an execution screen of a specific application is displayed on the display, displaying part of an execution screen of the specific application on at least part of the second area, and in response to detecting a folding of the display such that the first area of the display comes in contact with the second area, displaying a brief information providing screen of the specific application on the exposure area.

According to another aspect of an exemplary embodiment, there is provided a foldable display device including a display comprising a first area and a second area that is greater than the first area, wherein the display is configured to fold along an axis dividing the first area and the second area; a detector comprising: a touch detector configured to detect a user input; and a folding detector configured to detect a folding angle of the display; and a controller configured to control the display to display a user interface on an exposure area of the second area.

The controller may be configured to control the display to display a different number of guidance messages according to the folding angle of the display.

The controller, in response to the folding angle of the display being within a first angle range, may be configured to control the display to display two guidance messages; and in response to the hinge angle of the display being within a second angle range, which is greater than the first angle range, may be configured to control the display to display three guidance messages.

As described above, according to one or more exemplary embodiments, a user may perform various functions of a user terminal device through a UI displayed on the exposure area even when the display is folded, and may be provided with various pieces of information.

BRIEF DESCRIPTION OF THE DRAWINGS

The above and/or other aspects of exemplary embodiments will be more apparent with reference to the accompanying drawings, in which:

FIGS. 8A to 16B are views illustrating an exemplary embodiment where a user terminal device performs various functions according to a folding interaction and an unfolding interaction according to various exemplary embodiments;

DETAILED DESCRIPTION

One or more exemplary embodiments may vary and may be provided in different types of exemplary embodiments. Specific exemplary embodiments will be described with reference to accompanying drawings and detailed explanation. However, this does not necessarily limit the scope of the exemplary embodiments to a specific embodiment form. Instead, modifications, equivalents and replacements included in the disclosed concept and technical scope of this specification may be employed. While describing exemplary embodiments, if a specific description regarding a known technology might obscure the gist of an inventive concept, the specific description may be omitted.

In the present disclosure, relational terms such as first and second, and the like, may be used to distinguish one entity from another entity, without necessarily implying any actual relationship or order between such entities.

The terms used in the following description are provided to explain a specific exemplary embodiment and are not intended to limit the scope of rights. A singular term includes a plural form unless it is expressly says otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or combination thereof.

In an exemplary embodiment, 'a module' or 'a unit' performs at least one function or operation, and may be realized as hardware, software, or a combination thereof. In addition, a plurality of 'modules' or a plurality of 'units' may be integrated into at least one module and may be realized as at least one processor except for 'modules' or 'units' that should be realized in a specific hardware.

Figure 1:
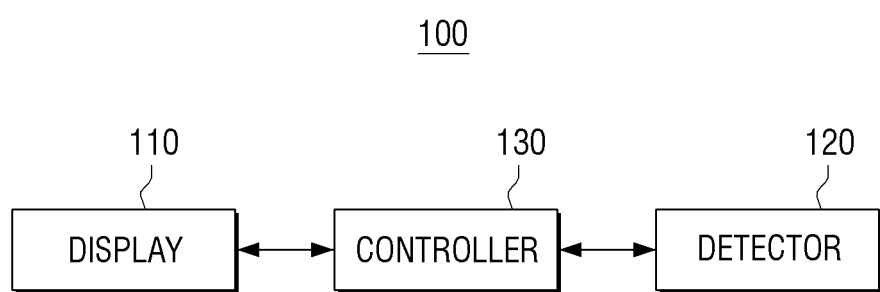
FIG. 1 is a block diagram illustrating configuration of a user terminal device according to an exemplary embodiment.

An exemplary embodiment will now be described in detail with accompanying drawings. FIG. 1 is a block diagram illustrating configuration of a user terminal device 100 according to an exemplary embodiment. As illustrated in FIG. 1, the user terminal device 100 includes a display 110, a detector 120, and a controller 130. The user terminal device 100 may be realized as various types of devices such as a TV, monitor, PC, laptop PC, mobile phone, tablet PC, touchscreen, PDA, MP3 player, kiosk, electronic album, table display device, LCD display, LED display, OLED display, camera, watch, wearable device, etc. If a user terminal device is realized as portable device such as mobile phone, tablet PC, PDA, MP3 player, laptop PC, watch, wearable device, etc., the user terminal device may be referred to a mobile device. Throughout this specification, for convenience and not for any limiting purposes, it may be referred to as a user terminal device.

The display 110 displays various image data and UIs. In particular, the display 110 may be realized as a touch screen as it is combined with a touch detector. In addition, the display 110 may include a folding line so that the display 110 may be folded.

In particular, the display 110 consists of a first area and a second area which is larger than the first area with reference to the folding line. If the display is folded such that the first area comes in touch with the second area with reference to the folding line, the display 110 may display on an exposure area of the second area, the area being exposed while the display 110 is folded, at least one of a UI including information regarding the user terminal device 100 and a UI for controlling the user terminal device 100.

The detector 120 detects a user interaction. In particular, the detector 120 may include a touch detector which detects a user's touch interaction. In addition, the detector 120 may include a folding detector which detects a folding interaction where the display 110 is folded with reference to the folding line and an unfolding interaction where the display 110 is unfolded with reference to the folding line.

The controller 130 controls overall operations of the user terminal device 100. In particular, if the display is folded with reference to the folding line, the controller 130 may control the display 110 to display a predetermined UI on an exposure area of the second area. In this case, the predetermined UI may include at least one of a UI representing state information of the user terminal device 100 and a UI for controlling the user terminal device 100. In addition, the exposure area represents an area of the second area, which is exposed to the outside when the first area completely comes into contact with the second area.

In particular, if a folding interaction of folding the display 110 with reference to the folding line is detected through the detector 120 while the user terminal device 100 executes a specific application, the controller 130 may control the display 110 to display a UI for controlling the specific application in the exposure area of the second area. For example, if a folding interaction of folding the display 110 with reference to the folding line is detected through the detector while the user terminal device 100 executes a music application, the controller 130 may control the display 110 to display a UI for controlling reproduction of music on the exposed area.

In addition, if a predetermined user interaction occurs (for example, a touch interaction of touching the exposed area) while the display 110 is folded, the controller 130 may control the display 110 to display a UI for releasing a lock state of the user terminal device 100 on the exposure area of the second area.

If a predetermined user interaction occurs (for example, a touch interaction of touching the exposed area) while the display 110 is folded, the controller 130 may control the display 110 to display a UI for changing the setting of the user terminal device on the exposed area. For example, if a touch interaction of touching the exposure area is detected while the display 110 is folded, the controller 130 may control the display 110 to display a UI for changing an audio, video or other setting of the user terminal device on the exposed area.

In addition, if a message is received from outside of the device while the display 110 is folded, the controller 130 may control the display 110 to display a UI for informing that the message is received on the exposed area. In this case, the UI displayed on the exposure area may include information regarding a sender and the message.

If the UI informing that a message is received is displayed on the exposure area while the display 110 is folded and an unfolding interaction of unfolding the display to a predetermined angle is detected while the UI is touched, the controller 130 may control the display 110 to display a message window for responding to the received message.

However, the device is not limited to a using a predetermined angle. It may be a range of angles. It may also be an angle or a range of angles that may be set by a user.

In addition, the controller 130 may control the display 110 to display a plurality of icons on the exposure area while the display 110 is folded. If one of the plurality of icons is touched through the detector 120 while the plurality of icons are displayed on the exposure area while the display 110 is folded and an unfolding interaction of unfolding the display 110 is detected through the detector 120 while one of the plurality of icons is touched, the controller 130 may control the display 110 to display a screen corresponding to the touched icon. For example, if an unfolding interaction of unfolding the display 110 is detected while a message icon from among the plurality of icons is touched, the controller 130 may control the display 110 to display a message window corresponding to the message icon. Of course, the device is not limited to a message icon. It could be any number of icons, e.g., a music icon, a telephone icon, a document icon, etc.

In addition, if a message is received from outside while the user terminal device executes a specific application in a folding state, the controller 130 may control the display 110 to display a UI informing that the message is received on the exposed area. If an unfolding interaction of unfolding the display 110 is detected through the detector 120 while the UI is touched, the controller 130 may control the display 110 to display a message window for responding to the message. If an unfolding action of unfolding the display is detected through the detector 120 while the UI is not touched, the controller 130 may control the display 110 to display an execution screen for the specific application.

If a UI for releasing a lock state of the user terminal device 100 is displayed on the exposure area while the display 110 is folded, a lock release command is input through the UI and then, an unfolding interaction of unfolding the display 110 is detected through the detector 120, the controller 130 may control the display 110 to display a home screen. However, if a lock release command is not input through the UI, and an unfolding interaction of unfolding the display 110 is detected through the detector 120, the controller 130 may control the display 110 to display the UI for releasing the lock state of the user terminal device 100 on full screen.

In addition, if a call request is received from outside while the display 110 is folded, the controller 130 may control the display 110 to display a UI on the exposed area for informing that a call request is received from outside. If an unfolding interaction of unfolding the display to a first angle range is detected, the controller 130 may control the display 110 to display at least one icon for controlling a telephone call function. If an unfolding interaction of unfolding the display to a second angle that is greater than the first angle scope is detected, the controller 130 may accept the call request and control the display 110 to display a telephone call screen.

If a call request is received from outside while the display executes a specific application as it is being folded, the controller 130 may control the display 110 to display a UI for informing that a call request is received on the exposed area. If an unfolding interaction of unfolding the display 110 is detected through the detector 120, the controller 130 may accept the call request and control the display 110 to display a telephone call screen. When a telephone call is completed, the controller 130 may control the display 110 to display the execution screen of the specific application again.

If a first folding interaction of folding the display to the first angle is detected while the display 110 displays the execution screen of a specific application, the controller 130 may control the display 110 to display part of the execution screen of the specific application on at least part of the second area. If a second folding interaction of folding the display 110 such that the first area and the second area of the display 110 come in contact with each other is detected, the controller 130 may control the display 110 to display a brief information providing screen of the specific application on the exposed area.

In the above-described one or more exemplary embodiments, a user may perform various functions of a user terminal device through a UI displayed on the exposure area even when the display 110 is in a folding state and thus, the user may be provided with various information and options for interaction.

Figure 2:
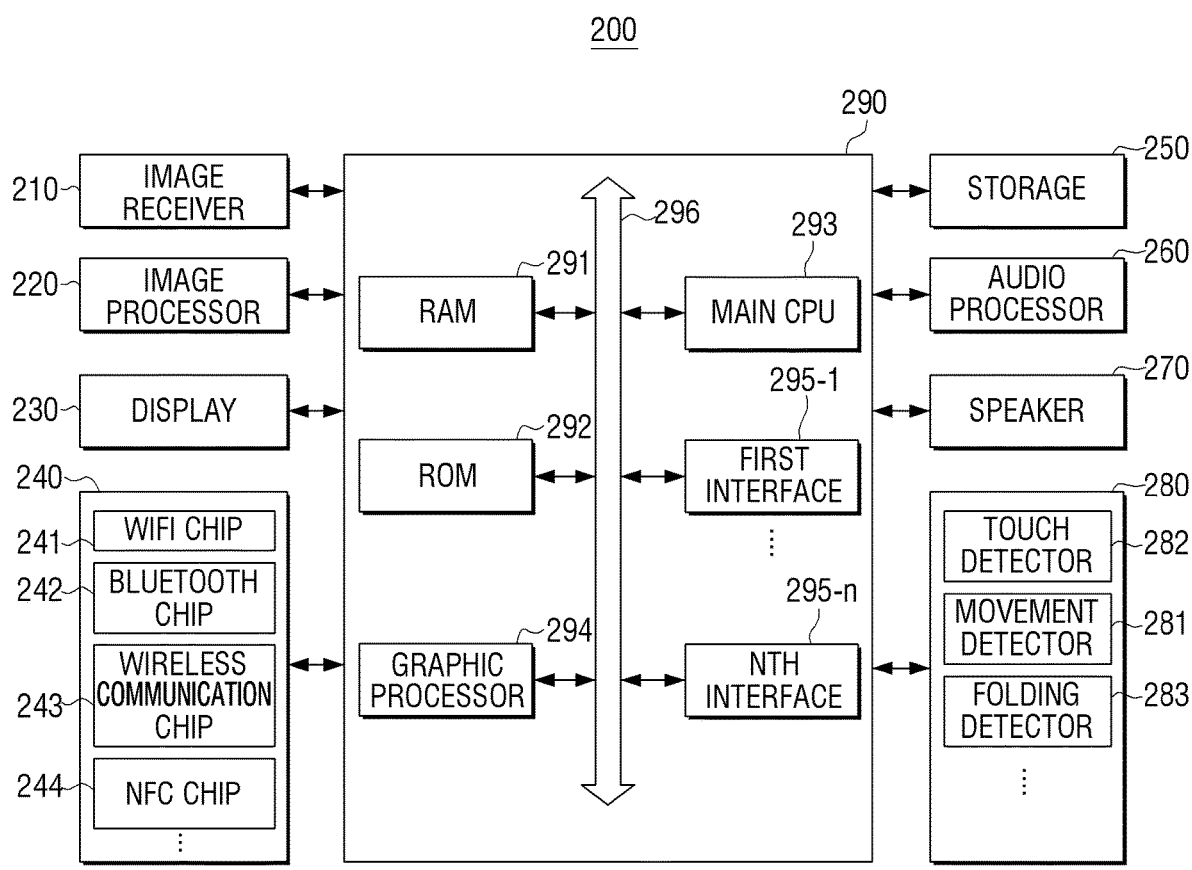
FIG. 2 is a block diagram illustrating a detailed configuration of a user terminal device according to an exemplary embodiment.

One or more exemplary embodiments will be described in greater detail with reference to FIGS. 2 to 23B. FIG. 2 is a block diagram illustrating configuration of a user terminal device 200 in detail according to an exemplary embodiment. As illustrated in FIG. 2, the user terminal device includes an image receiver 210, an image processor 220, a display 230, a communicator 240, a storage 250, an audio processor 260, a speaker 270, a detector 280, and a controller 290.

Meanwhile, FIG. 2 illustrates various components comprehensively, assuming that the user terminal device 200 is an apparatus having various functions such as contents providing function, display function, etc. Accordingly, depending on one or more exemplary embodiments, a part of the components illustrated in FIG. 2 may be omitted or changed, or other components may be further added.

The image receiver 210 receives image data through various sources. For example, the image receiver 210 may receive broadcasting data from an external broadcasting station, VOD data in real time from an external server, or image data from an external apparatus.

The image processor 220 processes image data received from the image receiver 210. The image processor 220 may perform various image processing with respect to image data, such as decoding, scaling, noise filtering, frame rate conversion, resolution conversion, etc.

The display 230 displays at least one of a video frame which is generated as the image processor 220 processes image data received from the image receiver 220 and various screens generated by a graphic processor 293.

Figure 3A:
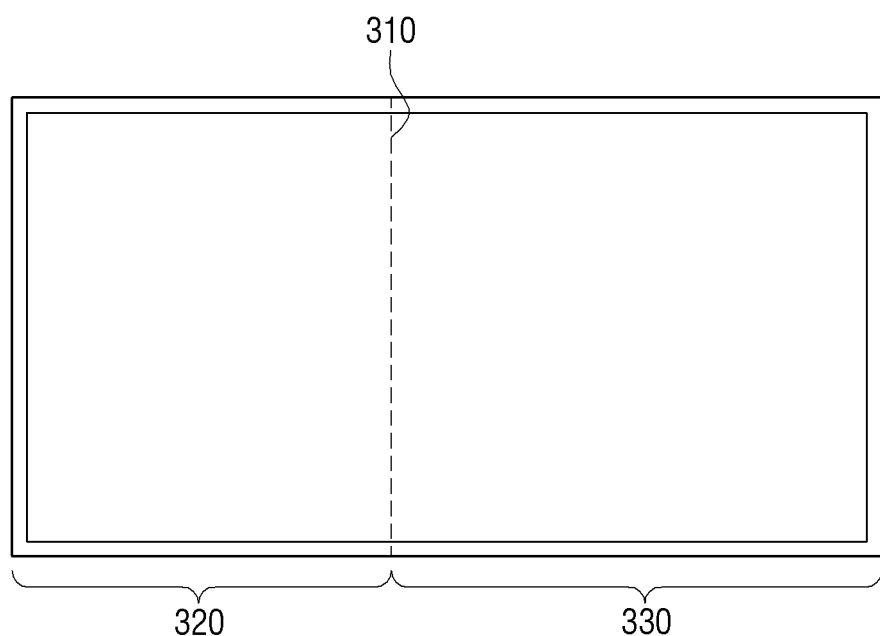
FIGS. 3A to 3E are views illustrating a user terminal device with a rectangular display panel according to an exemplary embodiment.
Figure 3B:
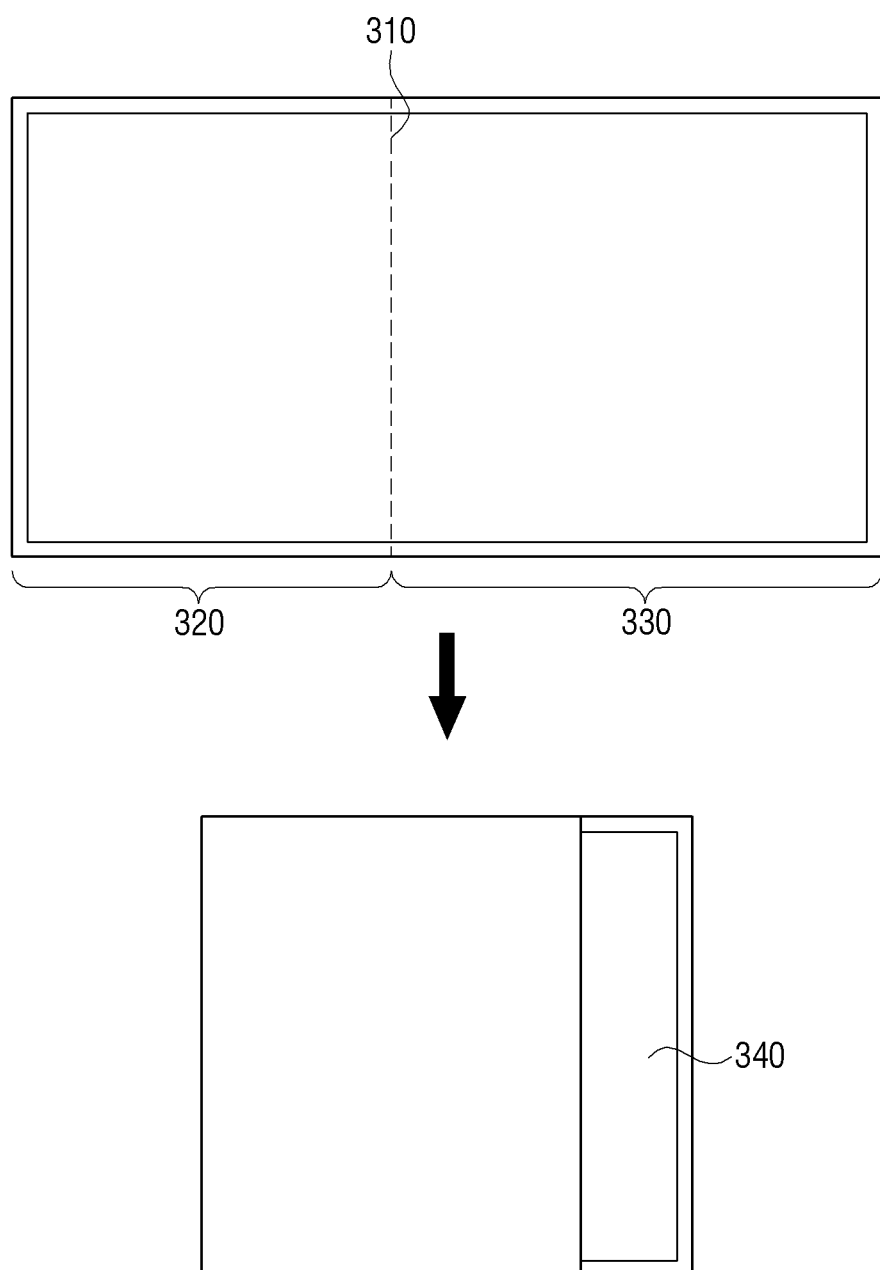
Figure 3C:
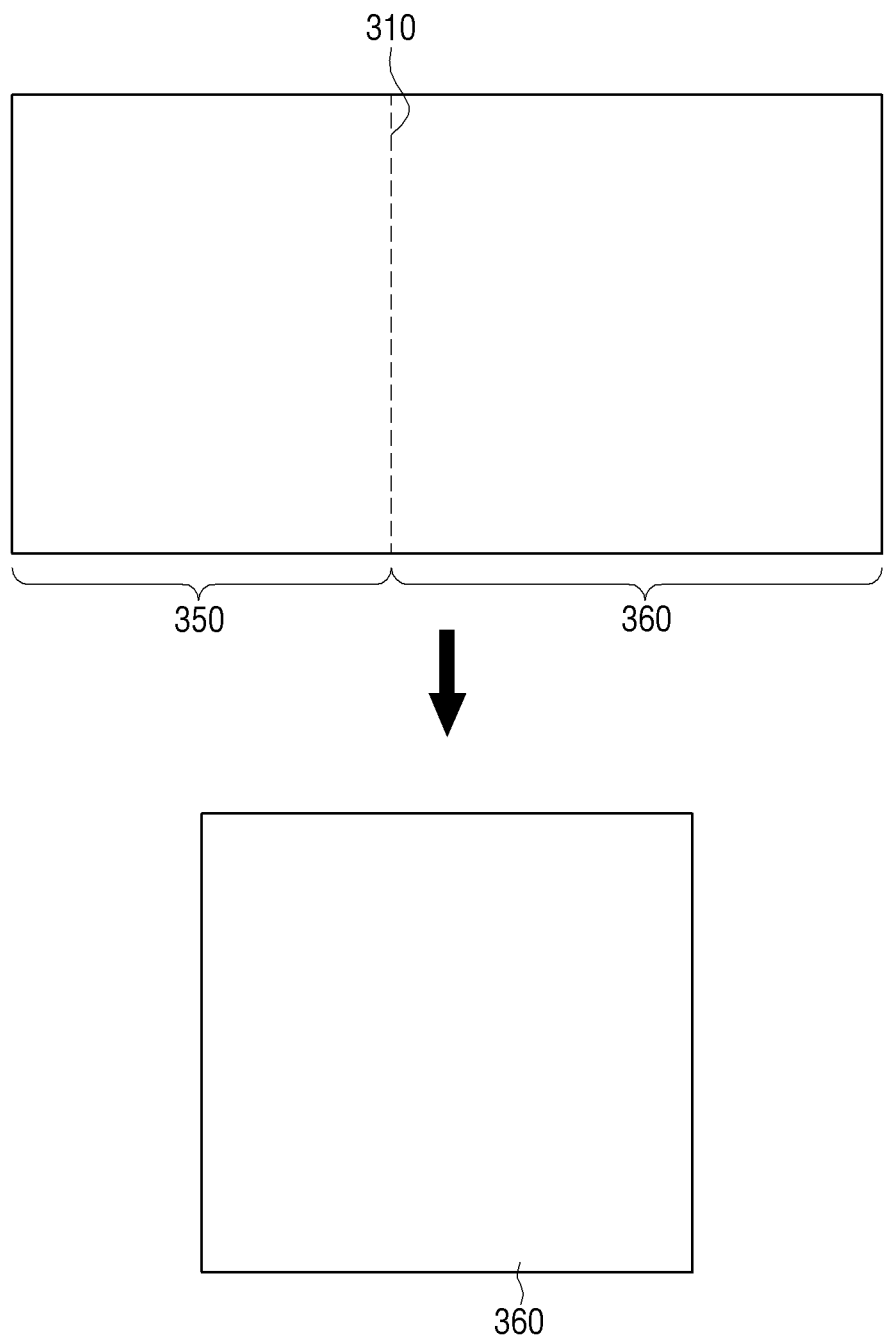

In particular, as illustrated in FIG. 3A, the display 230 may consist of a first area 320 and a second area 330 which is larger than the first area 320 with reference to a folding line 310. As illustrated in FIG. 3B, if the display 230 is folded with reference to the folding line 310, the display 230 may include an exposure area 340 which is the exposed part of the second area 330. Meanwhile, FIG. 3C is a view illustrating a cover which is on the rear side of the user terminal device 200 when the user terminal device 200 is folded.

Figure 3D:
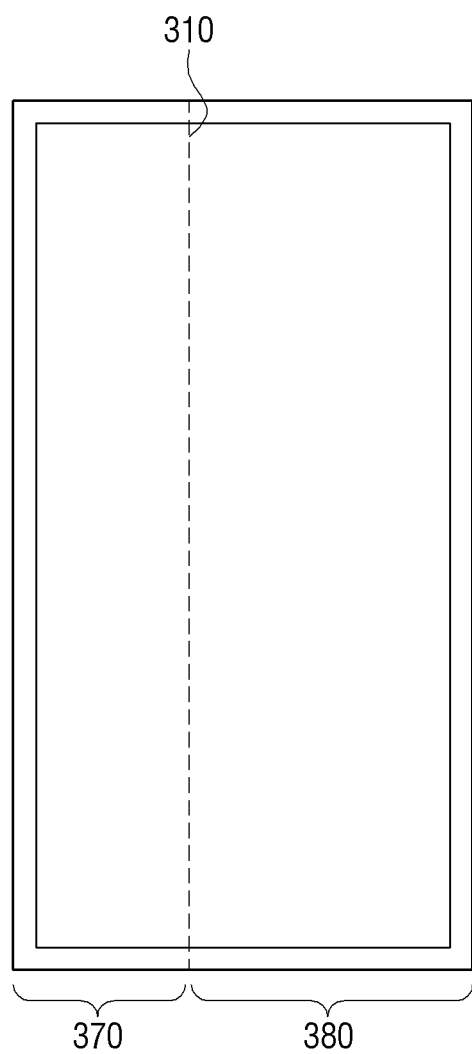
Figure 3E:
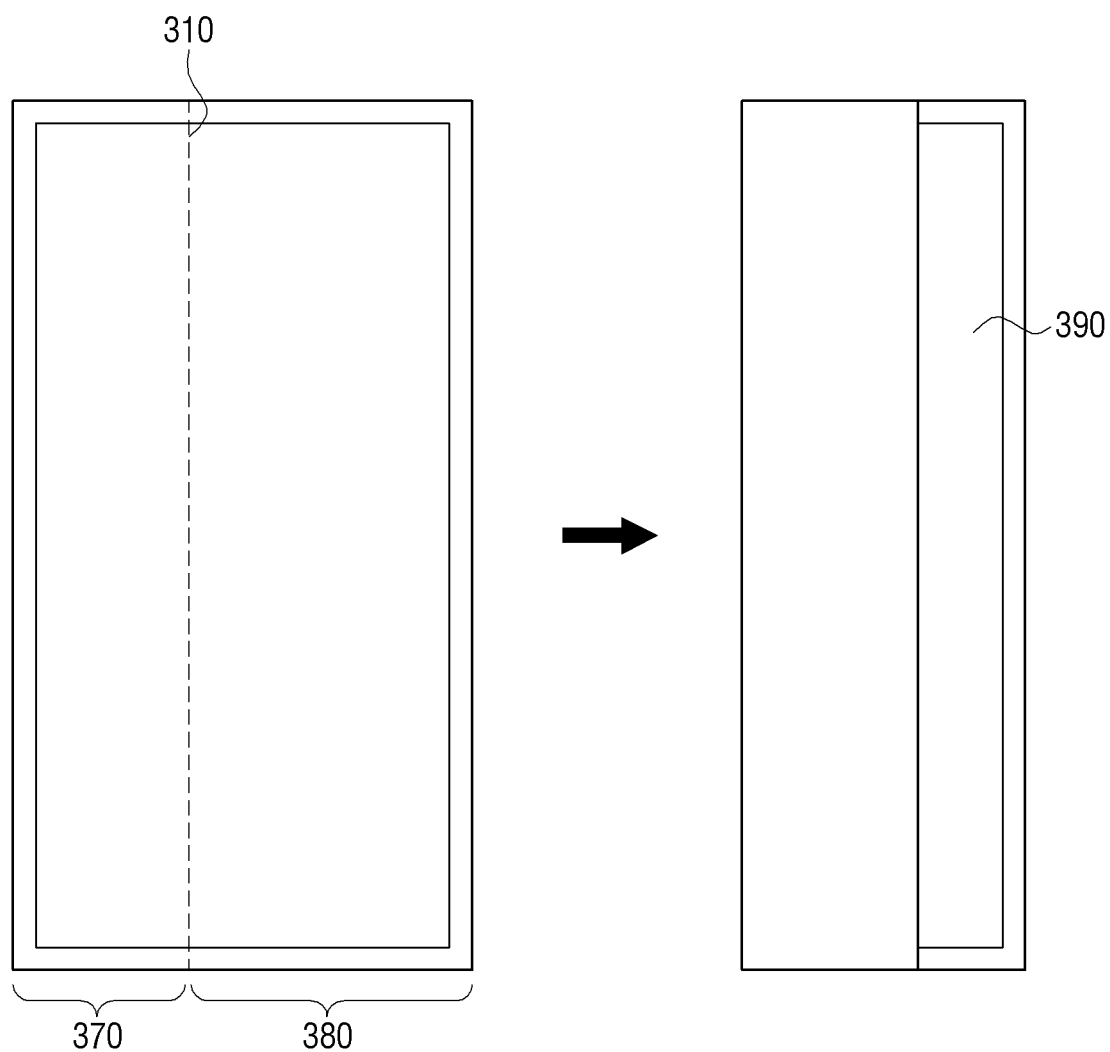

Meanwhile, in the above-described exemplary embodiment, the length of the folding line 310 is in parallel with a short side, but this is only an example. As illustrated in FIG. 3D, the length of the folding line 310 may be in parallel with a long side. In this case, the display 230 may consist of a first area 350 and a second area 360 with reference to the folding line 310. As illustrated in FIG. 3E, if the display 230 is folded with reference to the folding line 310, the display 230 may include an exposure area 370 of the second area 360, which is exposed to outside.

Meanwhile, in the above-exemplary embodiment, the folding line 310 may be a line which is generated by a physical hinge. In addition, if the display 230 is a flexible display, the folding line 310 may be a line which can be folded by a user.

The communicator 240 performs communication with various types of external apparatuses according to various types of communication methods. The communicator 240 may include a WiFi chip 241, a Bluetooth chip 242, a wireless communication chip 243, and a Near Field Communication (NFC) chip 244. The controller 290 performs communication with various external apparatuses using the communicator 240.

In particular, the WiFi chip 241 and the Bluetooth chip 242 perform communication according to a WiFi method and a Bluetooth method, respectively. In the case of the WiFi chip 241 or the Bluetooth chip 242, various connection information such as SSID and a session key may be transmitted/received first for communication connection and then, various information may be transmitted/received. The wireless communication chip 243 represents a chip which performs communication according to various communication standards such as IEEE, Zigbee, $3^{rd}$ Generation (3G), $3^{rd}$ Generation Partnership Project (3GPP), Long Term Evolution (LTE) and so on. The NFC chip 244 represents a chip which operates according to an NFC method which uses 13.56 MHz band among various RF-ID frequency bands such as 135 kHz, 13.56 MHz, 433 MHz, 860-960 MHz, 2.45 GHz, and so on.

Figure 4:
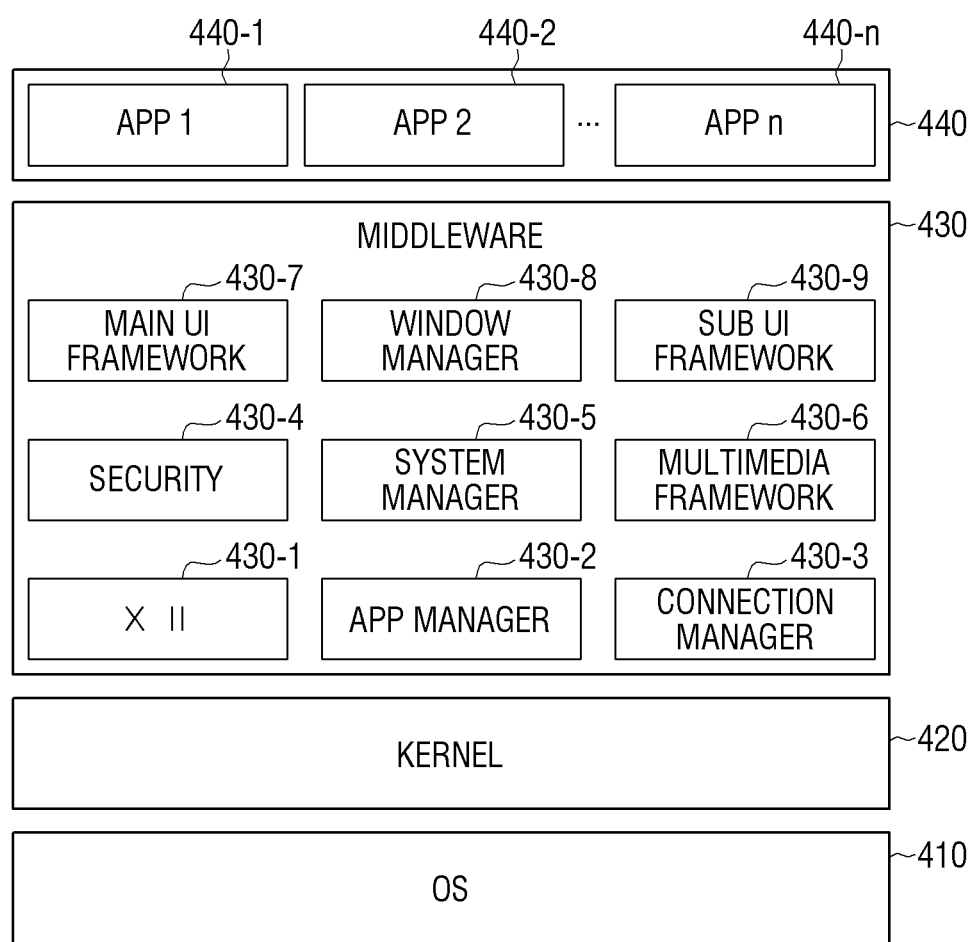
FIG. 4 is a view illustrating a configuration of software stored in a storage according to an exemplary embodiment.

The storage 250 may store various programs and data necessary to operate the user terminal device 200. Specifically, the storage 250 may store programs and data to configure various screens to be displayed on a main area and a sub area. FIG. 4 is a view provided to explain the structure of software stored in the user terminal device 200. According to FIG. 4, the storage 250 may store an Operating System (OS) 410, a kernel 420, middleware 430, an application 440, etc.

The OS 410 controls and manages overall operations of hardware. In other words, the OS 410 manages hardware and is responsible for basic functions such as memory and security.

The kernel 420 serves as a path transmitting various signals detected at the display 230, such as a touch signal, to the middleware 430.

The middleware 430 includes various software modules for controlling the operation of the user terminal device 200. According to FIG. 4, the middleware 430 includes an X11 module 430-1, an APP manager 430-2, a connection manager 430-3, a security module 430-4, a system manager 430-5, a multimedia framework 430-6, a UI framework 430-7, a window manager 430-8, and a writing recognition module 430-9.

The X11 module 430-1 receives various event signals from various hardware provided in the user terminal device 200. Herein, the event may vary, ranging from an event of setting of a system alarm, an event of executing or terminating a specific program, etc.

The APP manager 430-2 manages the execution state of various applications 440 which are installed in the storage 250. When an application execution event is detected from the X11 module 430-1, the APP manager 430-2 calls and executes an application corresponding to the event.

The connection manager 430-3 supports wired or wireless network connection. The connection manager 430-3 may include various detailed modules such as a DNET module, a UPnP module, etc.

The security module 430-4 supports certification, permission, secure storage, etc. with respect to hardware.

The system manager 430-5 monitors the state of each element of the user terminal device 200, and provides the monitoring result to other modules. For example, if there is not enough battery left, an error occurs, or connection is cut off, the system manager 430-5 may provide the monitoring result to a main UI framework 430-7 or a sub UI framework 430-9 and output an alarm message or an alarm sound.

The multimedia framework 430-6 may be stored in the user terminal device 200, or may reproduce multimedia contents provided from an external source. The multimedia framework 430-6 may include a player module, a camcorder module, a sound processing module, etc. Accordingly, the multimedia framework 430-6 may reproduce various multimedia contents, and generate and reproduce screens and sounds.

The main UI framework 430-7 provides various UIs to be displayed on a main area of the display 230, and the sub UI framework 430-9 provides various UIs to be displayed on a sub area. The main UI framework 430-7 and the sub UI framework 430-9 may include an image composite module to configure various objects, a coordinates composite module to calculate a coordinates where an object is to be displayed, a rendering module to render the configured object on the calculated coordinates, a 2D/3D UI toolkit to provide a tool for configuring a UI in 2D or 3D form, etc. The main UI framework 430-7 and the sub UI framework 430-9 may include an image composite module to configure various objects, a coordinates composite module to calculate a coordinates where an object is to be displayed, a rendering module to render the configured object on the calculated coordinates, a 2D/3D UI toolkit to provide a tool for configuring a UI in 2D or 3D form, etc.

The window manager 430-8 may detect a touch event using a user's body part or pen or other input events. When such an event is detected, the window manager 430-8 transmits an event signal to the main UI framework 430-7 or the sub UI framework 430-9 so that an operation corresponding to the event is performed.

In addition, if a user touches and drags a screen, various program modules such as a writing module for drawing a line according to a drag trace and an angle calculation module for calculating a pitch angle, a roll angle, a yaw angle, etc. based on a sensor value sensed by a movement detector 282 may be stored.

The application module 440 includes applications 440-1-440-n for supporting various functions. For example, program modules for providing various services, such as a navigation program module, a game module, an electronic book module, a calendar module, an alarm management module, a music module, an electronic banking module, a stock module, a calculator module, an electronic mail module, a spreadsheet module, a word processor module, etc. may be included. Such applications may be set as default or may be set temporarily by a user when necessary. If an object is selected, the main CPU 294 may execute an application corresponding to the selected object using the application module 440.

The software structure displayed in FIG. 4 is only an example and thus, an exemplary embodiment is not necessarily limited thereto. Thus, part of the structure may be omitted or changed, or new structure may be added, if necessary. For example, the storage 250 may additionally provide various programs such as a sensing module for analyzing signals sensed by various sensors, a messaging module including a messenger program, a Short Message Service (SMS) & Multimedia Message Service (MMS) program, an e-mail program, etc., a call info aggregator program module, a VoIP module, a web browser module, etc.

Referring back to FIG. 2, the audio processor 260 processes audio data of image contents. The audio processor 260 may perform various processing such as decoding, amplification, noise filtering, compression, equalization, noise cancellation, echo or reverb removal or addition, etc., with respect to audio data. The audio data processed by the audio processor 260 may be output to the audio output unit 270 (e.g., audio outputter).

The audio output unit 270 outputs not only various audio data which is processed in many ways such as decoding, amplification, and noise filtering by the audio processor 260 but also various alarm sounds or voice messages. In particular, the audio output unit 270 may be realized as a speaker, but this is only an example. The audio output unit 270 may be realized as an output terminal which may output audio data.

The detector 280 detects various user interactions. In particular, the detector 280 may include a touch detector 281, a movement detector 282, and a folding detector 283 as illustrated in FIG. 2.

Specifically, the touch detector 281 may detect a user's touch interaction using a touch panel attached to the rear side of a display panel. The movement detector 282 may detect a movement (for example, a rotation movement, a vertical movement, or a horizontal movement, etc.) of the user terminal device 100 using at least one of an accelerator sensor, a geomagnetic sensor, and a gyro sensor. The folding detector 283 may detect at least one of whether the user terminal device 200 is folded with reference to the folding line 310 and the angle at which the terminal device 200 is folded using a bending sensor (for example, a light sensor, a fiber optic sensor, a conductive ink-based sensor, a conductive fabric sensor, etc.).

Meanwhile, the touch detector 281 might activate only a touch sensor disposed on the exposure area while the display 230 is folded, and inactivate a touch sensor disposed on the other areas.

The controller 290 controls overall operations of the user terminal device 200 using various programs stored in the storage 250.

As illustrated in FIG. 2, the controller 290 includes a RAM 291, a ROM 292, a graphic processor 293, a main CPU 294, a first to an nth interface 295-1-295-n, and a bus 296. In this case, the RAM 291, the ROM 292, the graphic processor 293, the main CPU 294, the first to the nth interface 295-1-295-n, etc. may be interconnected through the bus 296.

The ROM 292 stores a set of commands for system booting. If a turn-on command is input and thus, power is supplied, the main CPU 294 copies O/S stored in the storage 250 in the RAM 291 according to a command stored in the ROM 292, and boots a system by executing the O/S. When the booting is completed, the main CPU 294 copies various application programs stored in the storage 250 in the RAM 291, and executes the application programs copied in the RAM 291 to perform various operations.

The graphic processor 293 generates a screen including various objects such as an icon, an image, a text, etc. using a computing unit (e.g., computer) and a rendering unit (e.g., renderer). The computing unit computes property values such as coordinates, shape, size, and color of each object to be displayed according to the layout of the screen using a control command received from the detector 280. The rendering unit generates a screen with various layouts including objects based on the property values computed by the computing unit. The screen generated by the rendering unit is displayed in a display area of the display 230.

The main CPU 294 accesses the storage 250, and performs booting using the O/S stored in the storage 250. The main CPU 294 performs various operations using various programs, contents, data, etc. stored in the storage 250.

The first to the nth interface 295-1-295-n are connected to the above-described various elements. One of the above interface may be a network interface which is connected to an external apparatus via network.

In particular, the controller 290 may provide various functions using an exposure area which is exposed to the outside when the display 110 is folded.

<A UI Provided on the Exposure Area>

If the display 230 is folded with reference to the folding line 310 such that the first area 320 and the second area 330 come in contact with each other, the controller 290 may control the display 230 to display a predetermined UI on the exposure area 340 of the second area 320, which is exposed to the outside. In this case, the predetermined UI may include at least one of a UI including the state information of the user terminal device 200 and a UI for controlling the user terminal device 200.

Figure 5A:
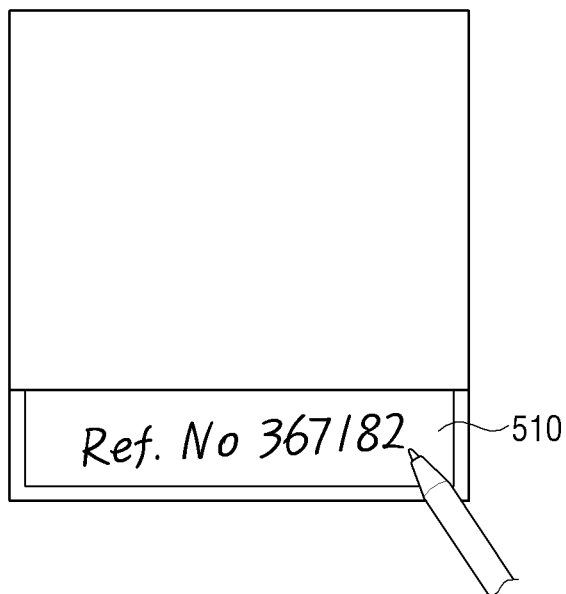
FIGS. 5A to 7B are views illustrating a UI displayed on an exposure area according to various exemplary embodiments.

In an exemplary embodiment, if a folding interaction of folding the display 230 with reference to the folding line 310 such that the first area 320 and the second area 330 come in contact with each other is detected, the controller 290 may control the display 230 to display a UI 510 providing a memo function on the exposure area as illustrated in FIG. 5A. In this case, if a user input, e.g., a finger, pen, or stylus, is detected through the UI 510 which provides a memo function, the controller 290 may control the display 230 to display an image according to the user input.

Figure 5B:
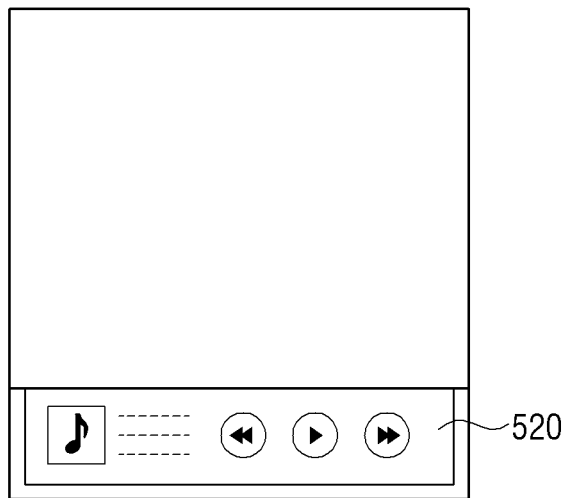

In addition, the controller 290 may control the display 230 to display a UI for controlling a specific application on the exposure area. Specifically, if a folding interaction of folding the display 230 with reference to the folding line 310 such that the first area 320 and the second area 330 come in contact with each other is detected while a specific application is executed, the controller 290 may control the display 230 to display a UI for controlling the specific application on the exposure area. For example, if a folding interaction of folding the display 230 with reference to the folding line 310 such that the first area 320 and the second area 330 come in contact with each other is detected while a music application is executed, the controller 290 may control the display 230 to display a UI 520 controlling the music application on the exposure area as illustrated in FIG. 5B. In this case, the UI 520 for controlling a music application may include information regarding currently-played music, a play/stop icon, a skip icon, a rewind icon, a next song, a past song, thumbs up, thumbs down, etc.

Figure 5C:
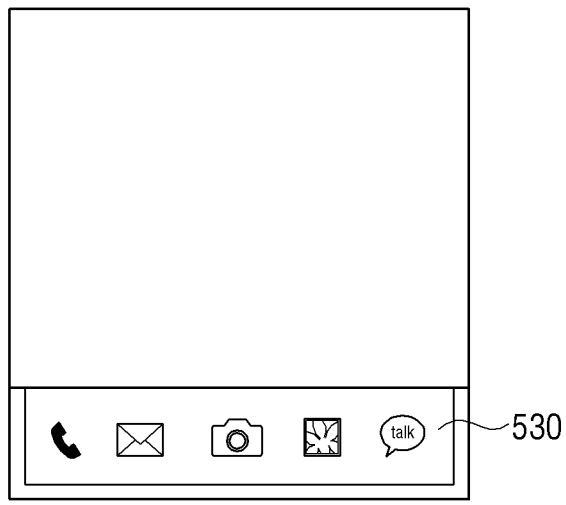

In addition, the controller 290 may control the display 230 to display a UI including a hot key icon for checking the current state of the user terminal device 200 on the exposure area. For example, if a predetermined user interaction (for example, an interaction of touching or tapping the exposure area twice in a row) is detected while the display 230 is folded, the controller 290 may control the display 230 to display a UI 530 including a hot key icon for checking the current state of the user terminal device 200 on the exposure area as illustrated in FIG. 5C. In this case, the hot key icon for checking the current state of the user terminal device 200 may include a hot key icon for checking a battery state, a hot key icon for checking a network state, a hot key icon for checking display brightness setting, etc.

Figure 5D:
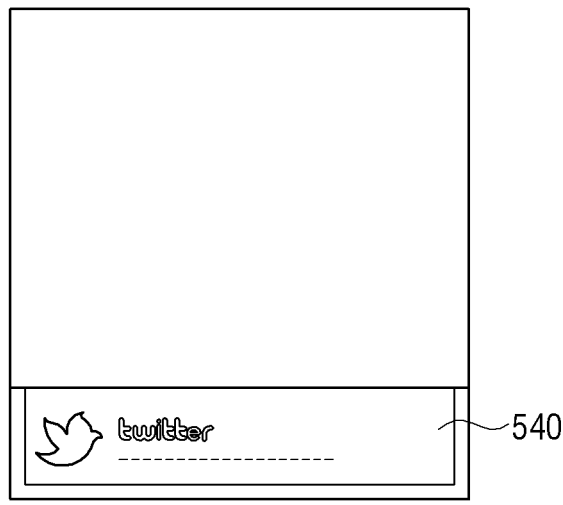

In addition, the controller 290 may control the display 230 to display a UI informing that a message or data is received from the outside on the exposure area. For example, if an SNS message or SMS message is received from the outside through the communicator 240 while the display 230 is folded, the controller 290 may control the display 230 to display a UI 540 informing that the SNS message or SMS message is received on the exposure area as illustrated in FIG. 5D. In this case, the UI 540 informing that an SNS message or SMS message is received may include at least one of information regarding a sender and information regarding the SNS message or SMS message.

Further, the controller 290 may control the display 230 to display various types of UIs for releasing a lock state of the user terminal device 200 on the exposure area.

Figure 6A:
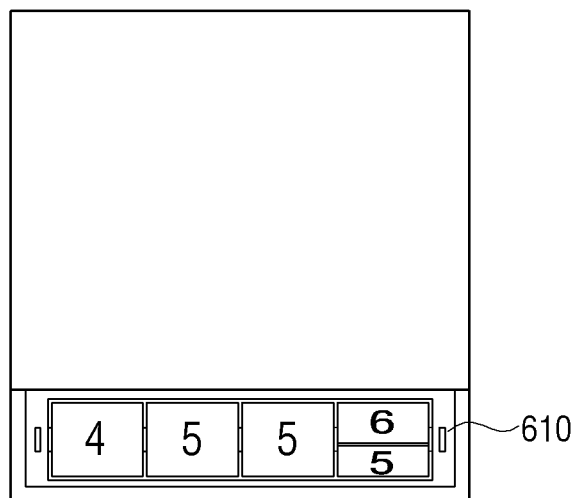

Specifically, as illustrated in FIG. 6A, the controller 290 may control the display 230 to display a UI 610 for inputting a pin number to release the lock state of the user terminal device 200 on the exposure area. In this case, the UI 610 for inputting a pin number may change the pin number by a touch interaction of swiping up and down. If a predetermined pin number is input on the UI 610 displayed on the exposure area, the controller 290 may release the lock state of the user terminal device 200. Additionally, the user may set the pin number through user input.

Figure 6B:
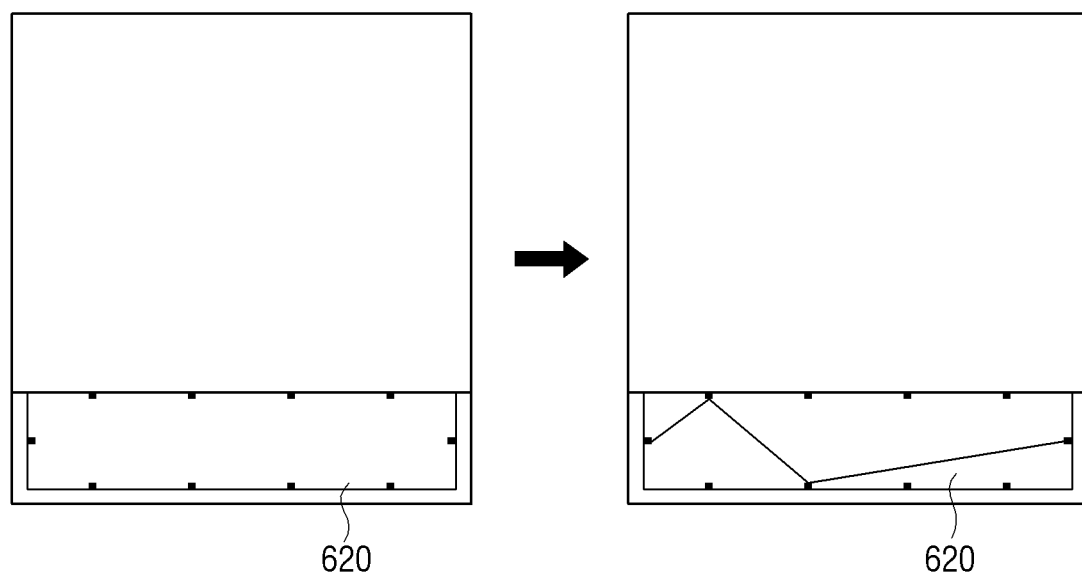

In addition, as illustrated in FIG. 6B, the controller 290 may control the display 230 to display a UI 620 including a plurality of dots on a corner of the exposure area to release the lock state of the user terminal device 200 on the exposure area. In this case, if a touch interaction of connecting dots in a predetermined pattern is detected on the UI 620, the controller 290 may release the lock state of the user terminal device 200. Additionally, the user may set the pattern through user input.

Figure 6C:
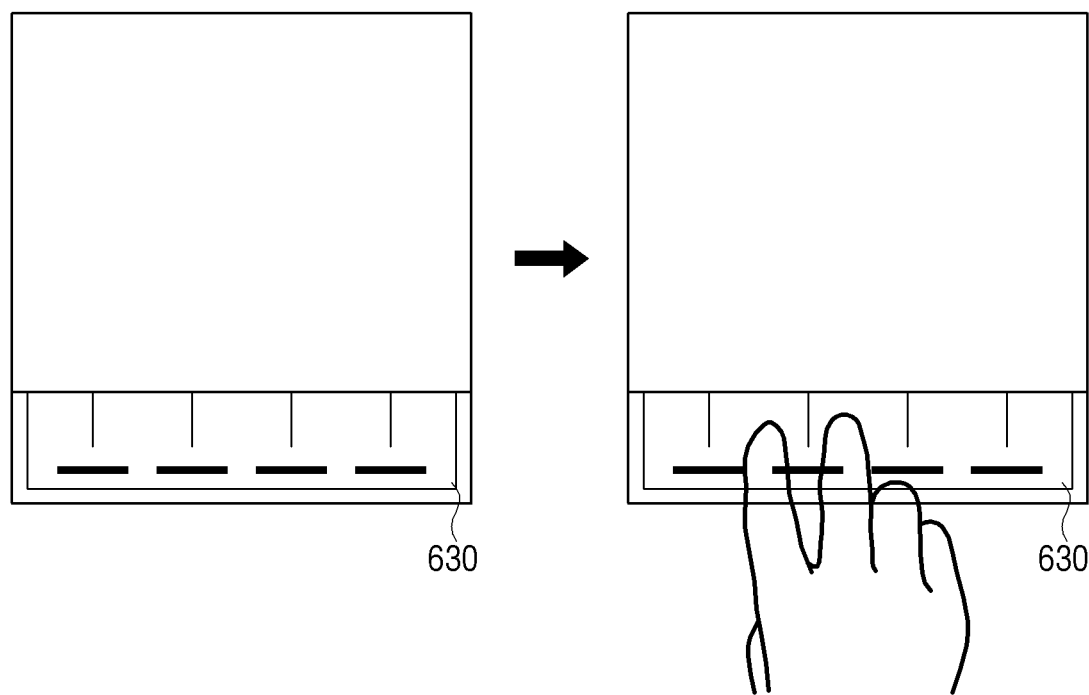

As illustrated in FIG. 6C, the controller 290 may control the display 230 to display a UI 630 in the form of a keyboard, i.e., piano to release the lock state of the user terminal device 200 on the exposure area. In this case, if a touch interaction of touching the keyboard, i.e., piano in a predetermined rhythm is detected on the UI 630, the controller may release the lock state of the user terminal device 200.

Figure 6D:
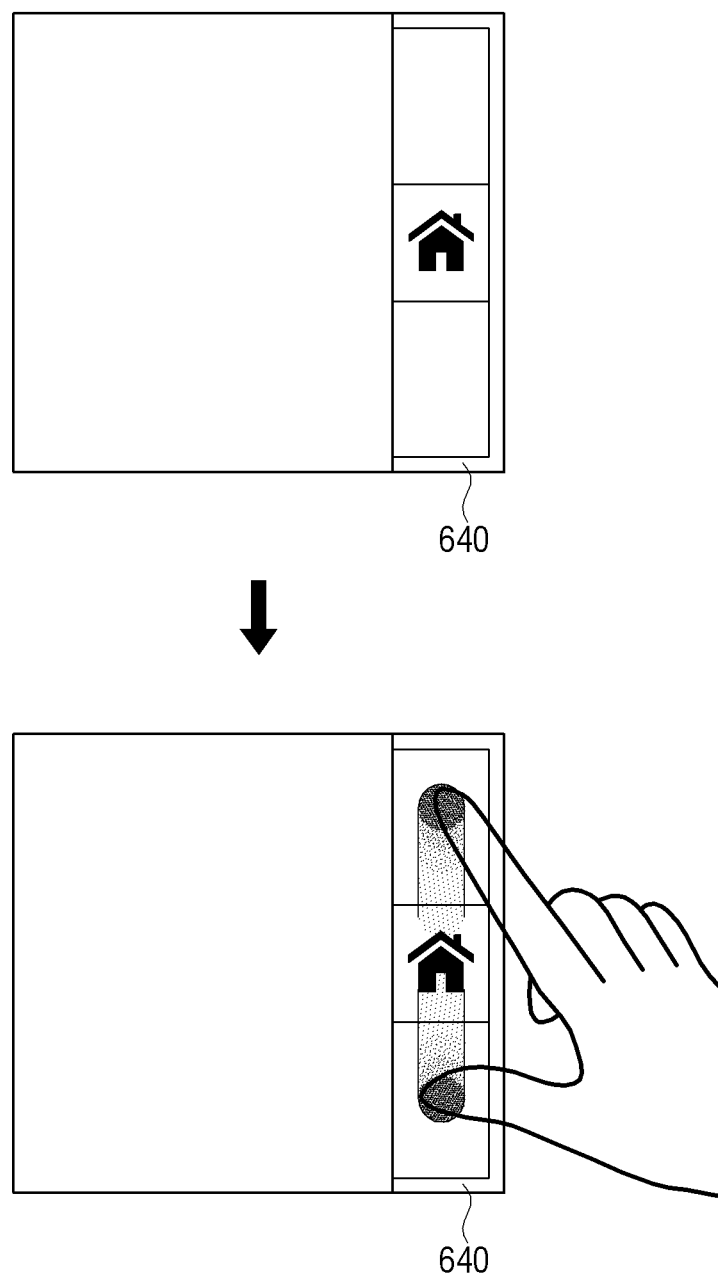

In addition, as illustrated in FIG. 6D, the controller 290 may control the display 230 to display a UI 640 including a home icon to release the lock state of the user terminal device on the exposure area. In this case, if a touch interaction of pinching out with reference to the home icon included in the UI 640 is detected, the controller 290 may release the lock state of the user terminal device 200.

The controller 290 may control the display 230 to display a UI for changing the setting of the user terminal device 200 on the exposure area.

Figure 7A:
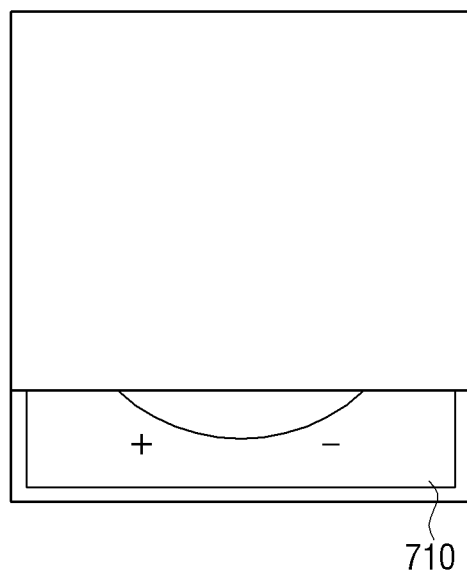

Specifically, as illustrated in FIG. 7A, the controller 290 may control the display 230 to display a UI 710 in the form of an arc for adjusting the volume of the user terminal device 200. Meanwhile, in the above exemplary embodiment, the UI displayed on the exposure area adjusts the volume, but this is only an example. A UI for adjusting another setting of the user terminal device 200 (for example, display brightness, etc.) may be displayed.

Figure 7B:
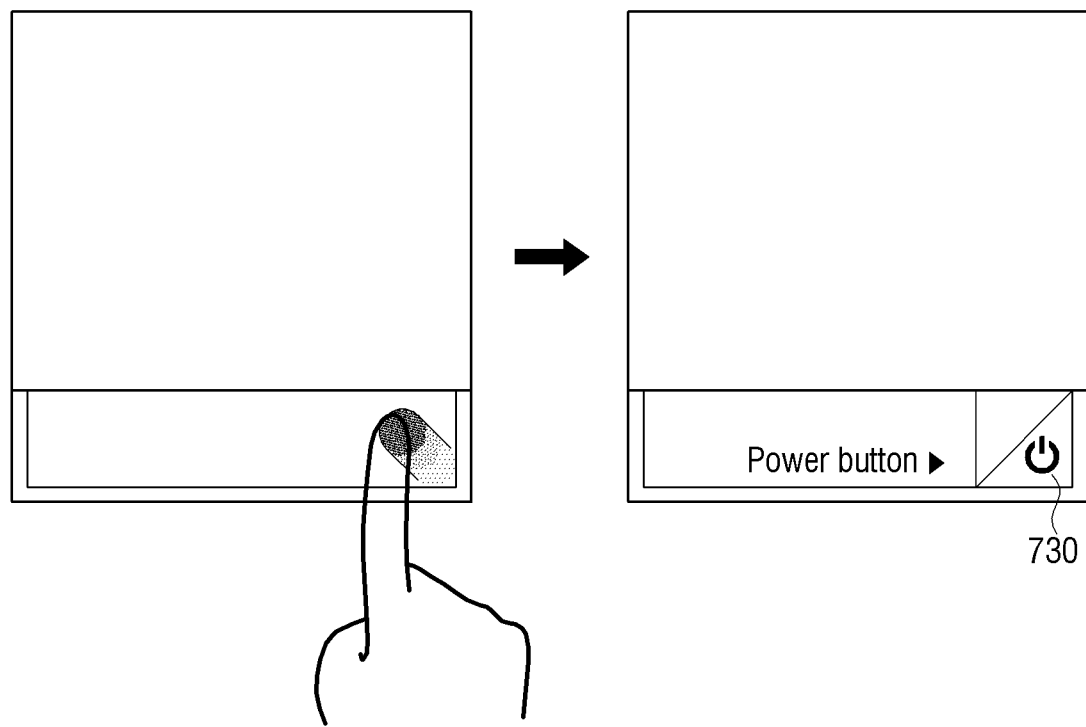

In addition, as illustrated in FIG. 7B, if a touch interaction of dragging one of a plurality of vertexes included in the exposure area in a diagonal direction is detected, the controller 290 may control the display 230 to display a UI 720 for turning off the power of the user terminal device 200 at the corner area corresponding to the vertex where the touch interaction is detected.

<A Folding Interaction and an Unfolding Interaction>

If a plurality of icons are displayed on the exposure area while the display 230 is folded, and an unfolding interaction of unfolding the display 230 while one of the plurality of icons is touched, the controller 290 may control the display 230 to display a screen corresponding to the touched icon on full screen.

Figure 8A:
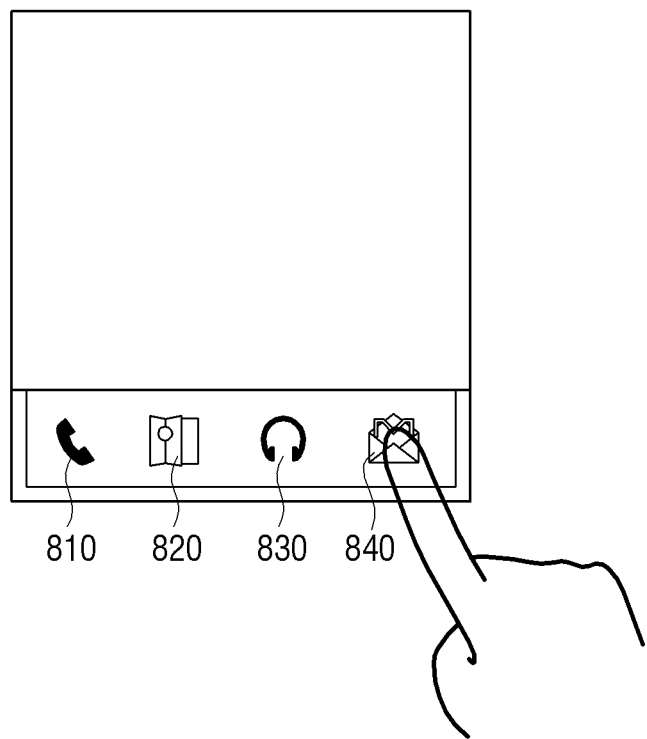

Specifically, as illustrated in FIG. 8A, the display 230 displays the first to the fourth icons 810 to 840 while the display 230 is folded. If an unfolding interaction of unfolding the display 230 is detected while the fourth icon 840 out of the first to the fourth icon 810 to 840 is touched, the controller 290 may control the display 230 to display a message window 850 corresponding to the fourth icon 840 on full screen as illustrated in FIG. 8B.

Meanwhile, in the above exemplary embodiment, an unfolding interaction is detected while the fourth icon 840 is touched, but this is only an example. If an unfolding interaction is detected while another icon is touched, a screen corresponding to the other-touched icon may be displayed on the full screen of the display 230. For example, if an unfolding interaction is detected while the first icon 810 is touched, the controller 290 may control the display 230 to display an execution screen of a call application corresponding to the first icon 810 (for example, a recent call list screen, an address book screen, a call sending screen, etc.) on full screen. In addition, if an unfolding interaction is detected while the second icon 820 is touched, the controller 290 may control the display 230 to display a web browser screen corresponding to the second icon 820 on full screen. If an unfolding interaction is detected while the third icon 830 is touched, the controller 290 may control the display 230 to display an execution screen of a music application corresponding to the third icon 830 (for example, a music play screen, a music list screen, etc.) on full screen.

In addition, if the exposure area is touched while the display 230 is folded and then, an unfolding interaction of unfolding a hinge angle of the display 230 as much as a predetermined angle is detected, the controller 290 may control the display 230 to display a screen for executing a specific function.

Figure 9A:
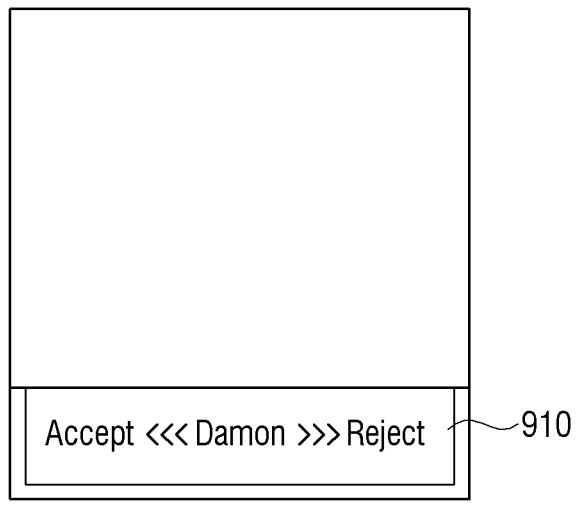
Figure 9B:
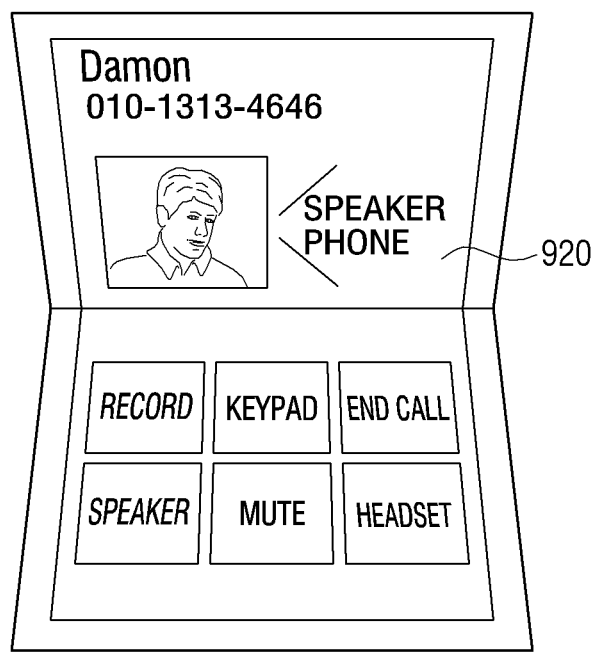

Specifically, if a call request is received while the display 230 is folded, the controller 290 may control the display 230 to display a UI 910 informing that a call request is received on the exposure area as illustrated in FIG. 9A. If an unfolding interaction of unfolding a hinge angle of the display 230 as much as a predetermined angle (for example, 70° to 120°) is detected while the UI 910 informing that a call request is received is touched, the controller 290 may accept the call request, execute a speaker phone function, and control the display 230 to display an execution screen 920 including various icons as illustrated in FIG. 9B.

Figure 10A:
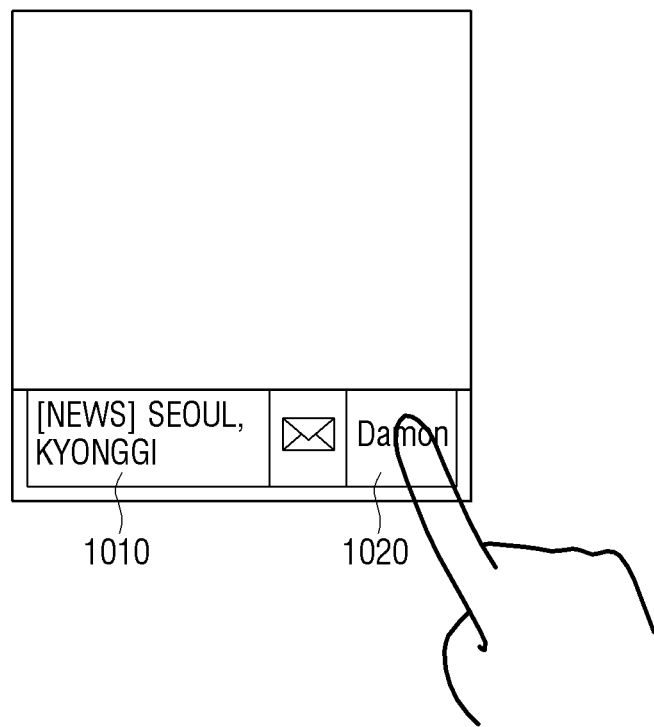
Figure 10B:
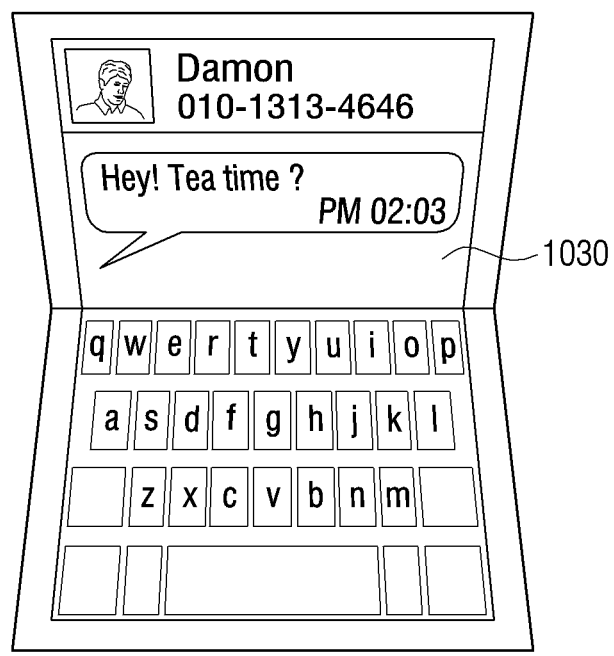

Specifically, if a message is received from outside while news information 1010 is displayed at the same as the display 230 is folded, the controller 290 may control the display 230 to display a UI 1020 informing that the message is received along with the news information 1010 on the exposure area as illustrated in FIG. 10A. If an unfolding interaction of unfolding a hinge angle of the display 230 as much as a predetermined angle (for example, 70° to 120°) is detected while the UI 1020 informing that a message is received is touched, the controller 290 may control the display 230 to display a message window 1030 for writing a reply to the received message as illustrated in FIG. 10B.

In addition, the controller 290 may control the display 230 to display different screens when the exposure area is touched and then, an unfolding interaction is detected and when an unfolding interaction is detected.

Figure 11A:
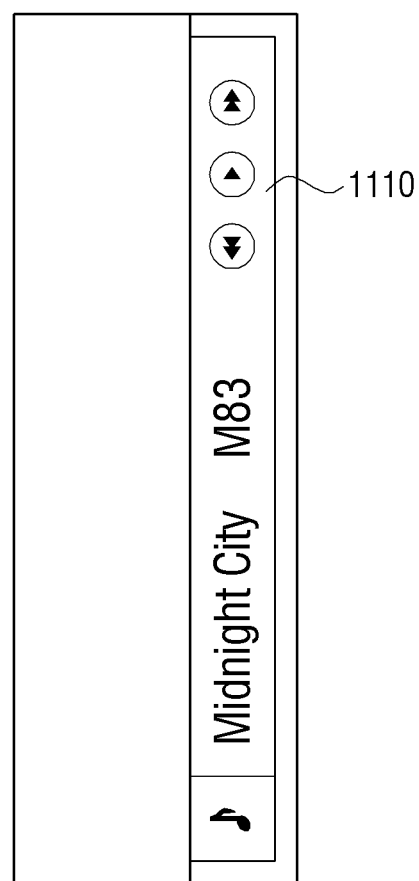

Specifically, the controller 290 may control the display 230 to display a UI 1110 corresponding to a music application on the exposure area as illustrated in FIG. 11A.

Figure 11B:
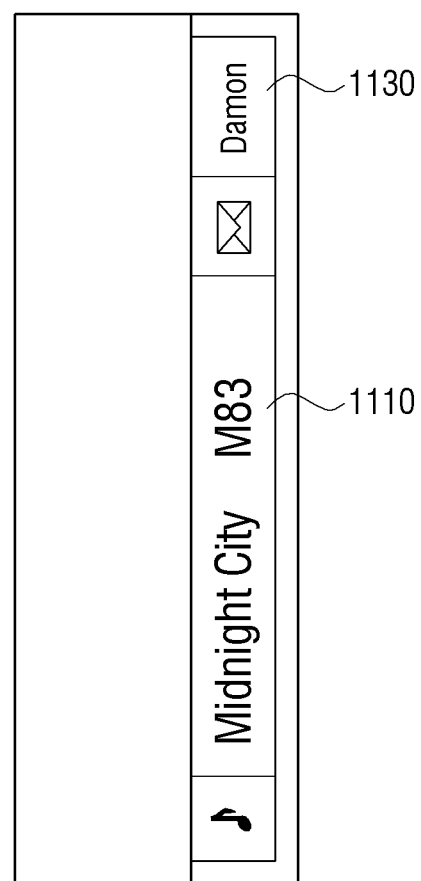

If a message is received from outside while the UI 1110 corresponding to a music application is displayed on the exposure area, the controller 290 may control the display 230 to display a UI 1120 informing that the message is received along with the music application UI 1110 on the exposure area as illustrated in FIG. 11B.

Figure 11C:
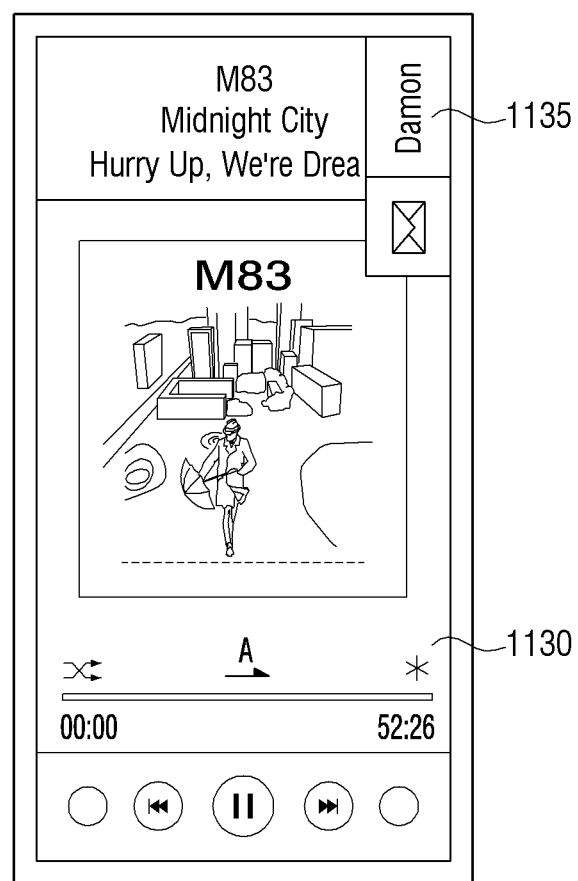

In this case, if an unfolding interaction of unfolding the display 230 is detected while the exposure area is not touched, the controller 290 may control the display 230 to display an execution screen 1130 of the existing music application as illustrated in FIG. 11C. In this case, a UI 1135 informing that a message is received may be displayed on one area of the execution screen 1130 of the music application for a predetermined time.

Figure 11D:
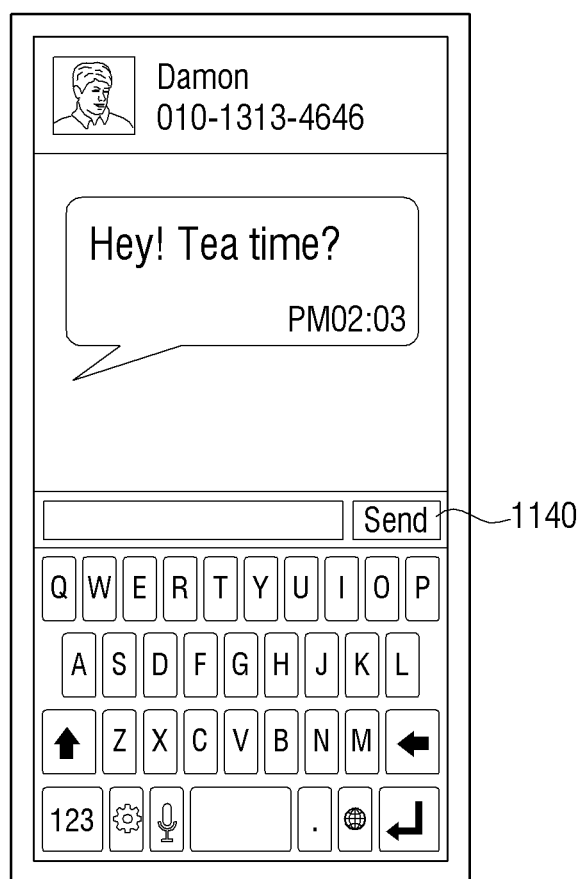

However, if an unfolding interaction of unfolding the display 230 is detected while the UI 1120 informing that a message is received is displayed on the exposure area, the controller 290 may control the display 230 to display a message window 1140 for writing a reply to the received message as illustrated in FIG. 11D.

In addition, the controller 290 may control the display 230 to display different screens according to the order of detecting an unfolding interaction and a touch interaction for lock-releasing.

Figure 12A:
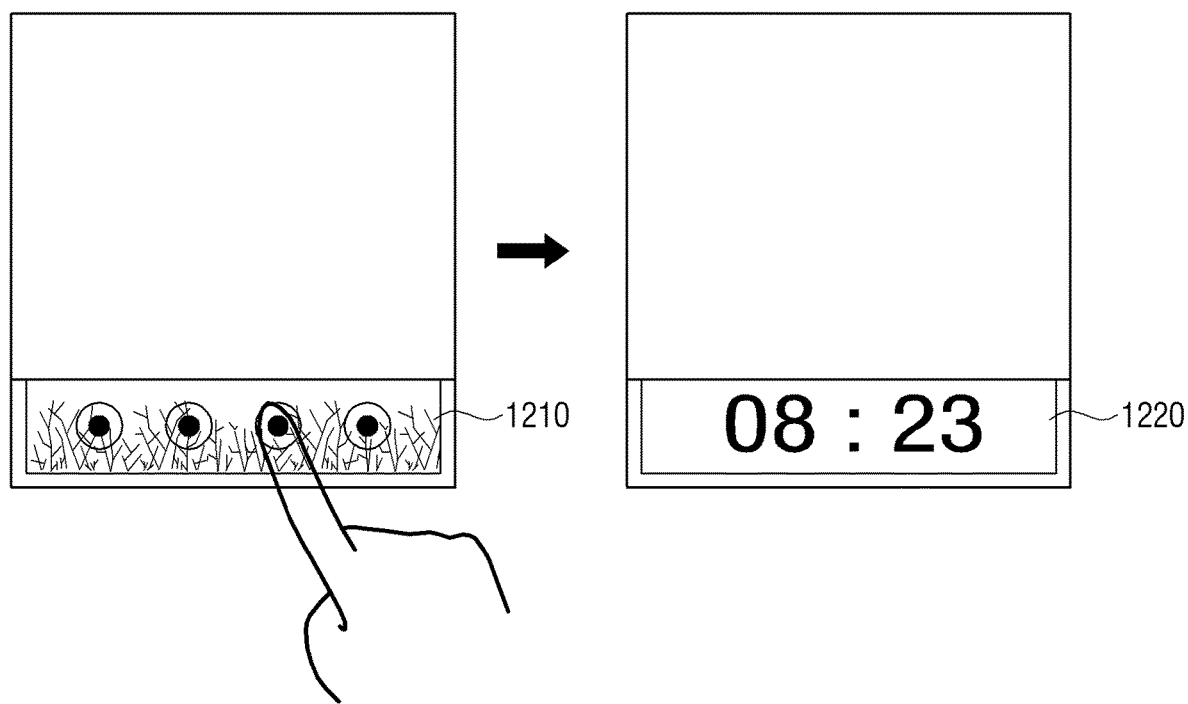

Specifically, as illustrated in the left side of FIG. 12A, if a touch interaction for lock-releasing is detected while a UI 1210 for releasing the lock of the user terminal device 200 is displayed on the exposure area, the controller 290 may release the lock state of the user terminal device 200, and as illustrated in the right side of FIG. 12A, may control the display 230 to display a first home screen 1220 including time information on the exposure area.

Figure 12B:
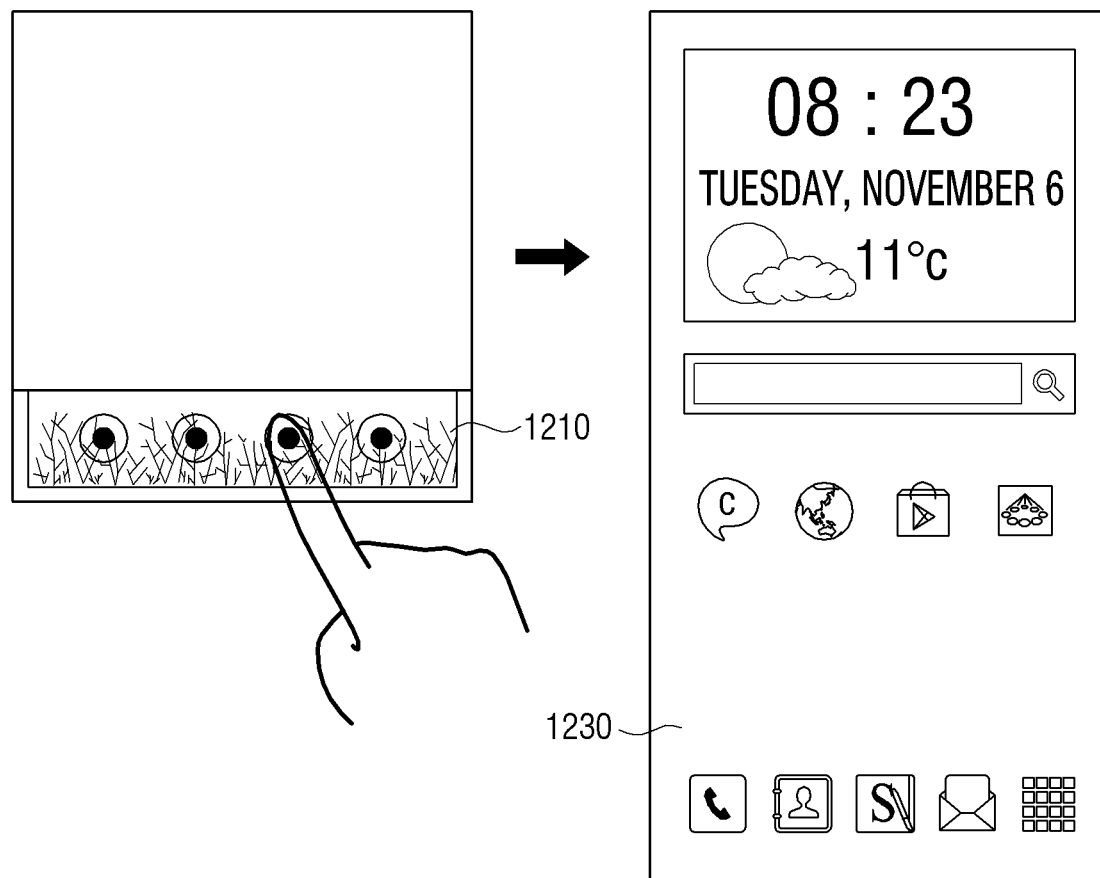

In addition, as illustrated in the left side of FIG. 12B, if a touch interaction for lock-releasing is detected while the UI 1210 for releasing the lock of the user terminal device 200 is displayed on the exposure area, and an unfolding interaction is detected, the controller 290 may release the lock state of the user terminal device 200, and as illustrated in the right side of FIG. 12B, may control the display 230 to display a second home screen 1230 on full screen.

Figure 12C:
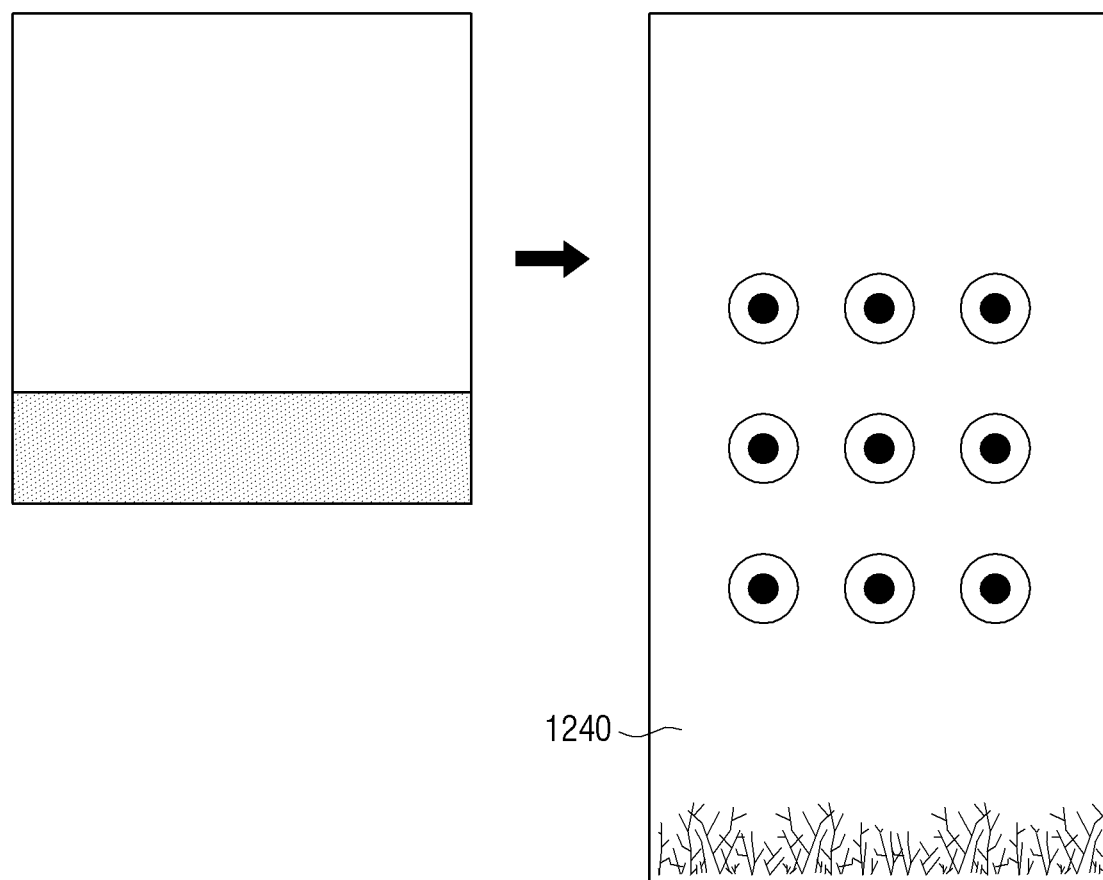

As illustrated in the left side of FIG. 12C, if an unfolding interaction is detected while an image is not displayed on the exposure area, the controller 290 may control the display 230 to display a UI 1240 for releasing the lock of the user terminal device on full screen as illustrated in the right side of FIG. 12C. If a touch interaction for lock-releasing is detected on the UI 1240 for releasing the lock of the user terminal device 200, which is displayed on full screen, the controller 290 may release the lock state of the user terminal device 200, and as illustrated in the right side of FIG. 12B, may control the display 230 to display the second home screen 1230 on full screen.

In addition, the controller 290 may control the display 230 to display distinctively a screen which is displayed when only an unfolding interaction is detected while a UI corresponding to a specific application is displayed on the exposure area and a screen which is displayed when an unfolding interaction is detected after the exposure area is touched.

Figure 13A:
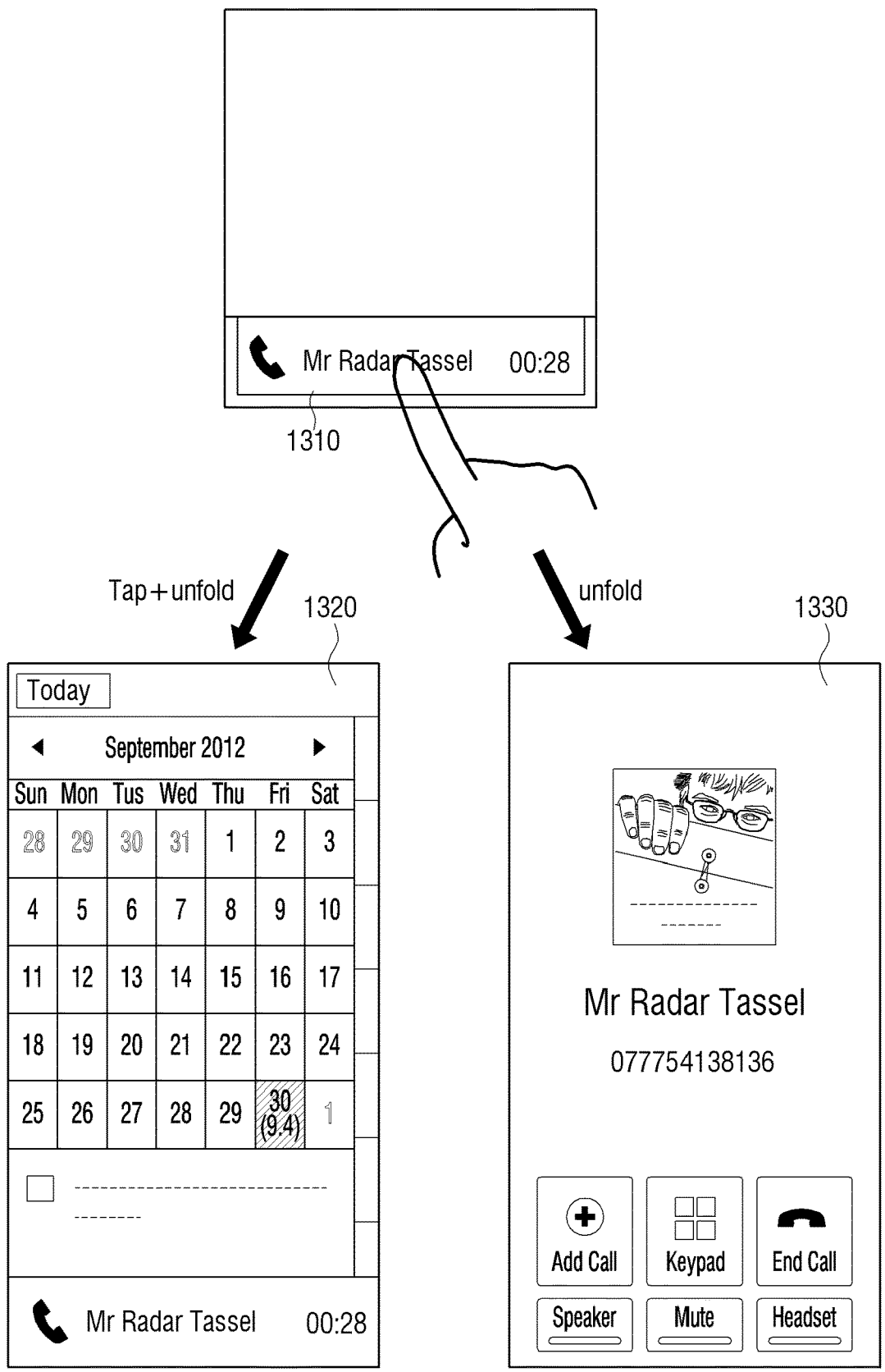

Specifically, if a call request is received from outside while the display 230 is folded, the controller 290 may control the display 230 to display a UI 1310 informing a call request is received on the exposure area as illustrated in the left side of FIG. 13A. If the UI 1310 displayed on the exposure area is touched and then, an unfolding interaction of unfolding the display 230 is detected, the controller 290 may control the display 230 to display an execution screen 1320 of a calendar application which is related to a call request function on full screen (in another example, an execution screen of a memo application) as illustrated in the lower left side of FIG. 13A. On the other hand, if an unfolding interaction of unfolding the display 230 is detected while the UI 1310 displayed on the exposure area is not touched, the controller 290 may control the display 230 to display a call screen 1330 on full screen as illustrated in the lower right side of FIG. 13A.

Figure 13B:
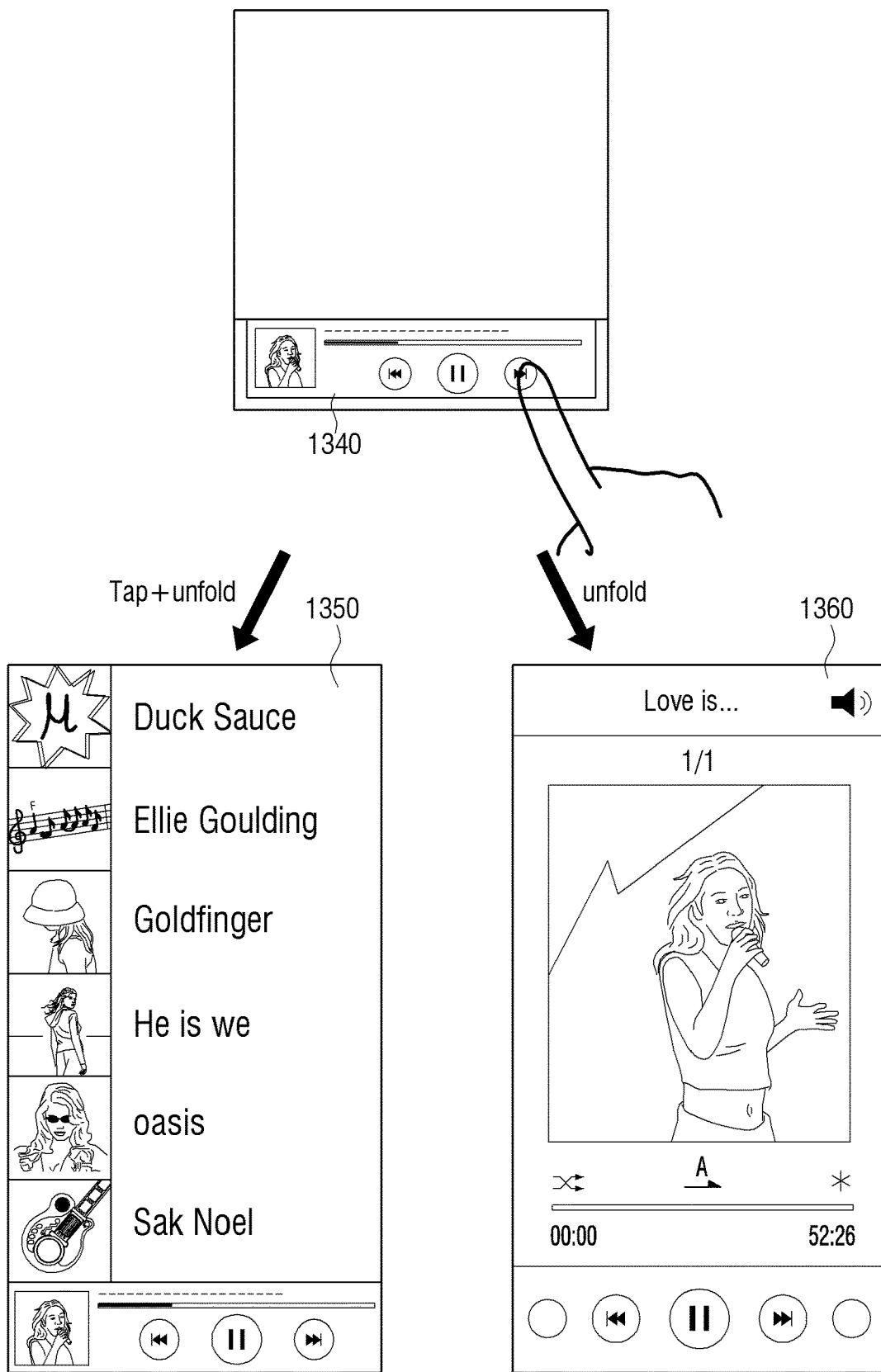

If a folding interaction of folding the display 230 is detected while a music application is executed, the controller 290 may control the display 230 to display a UI 1340 for controlling the music application on the exposure area as illustrated in the upper portion of FIG. 13B. If the UI 1430 displayed on the exposure area is touched and then, an unfolding interaction of unfolding the display 230 is detected, the controller 290 may control the display 230 to maintain music play and display a play list 1350 on full screen as illustrated in the lower left side of FIG. 13B. On the other hand, if an unfolding interaction of unfolding the display 230 is detected while the UI 1340 displayed on the exposure area is not touched, the controller 290 may control the display 230 to display a music player screen 1360 on full screen as illustrated in the lower right side of FIG. 13B.

If a first unfolding interaction of unfolding a hinge angle of the display 230 as much as a predetermined angle is detected, the controller 290 may control the display 230 to display at least one icon for executing a specific function. If a second unfolding interaction of unfolding the display 230 completely while at least one icon is touched, the controller 290 may execute a function corresponding to the touched icon.

Figure 14A:
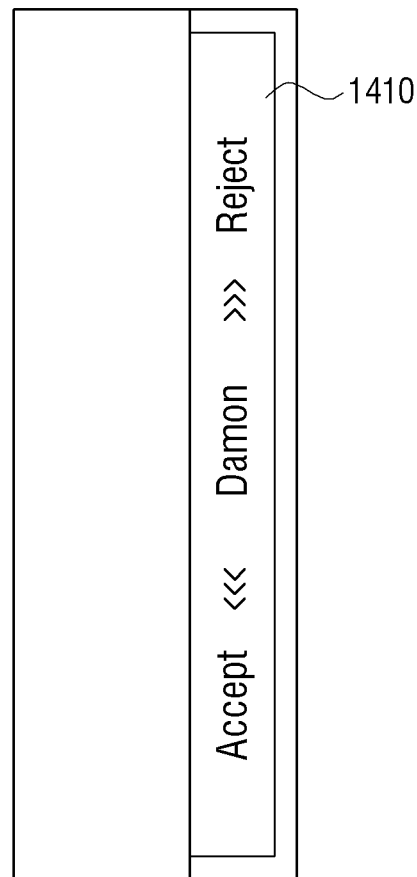

According to an exemplary embodiment, if a call request is received from outside while the display 230 is folded, the controller 290 may control the display 230 to display a UI 1410 informing that a call request is received on the exposure area as illustrated in FIG. 14A.

Figure 14B:
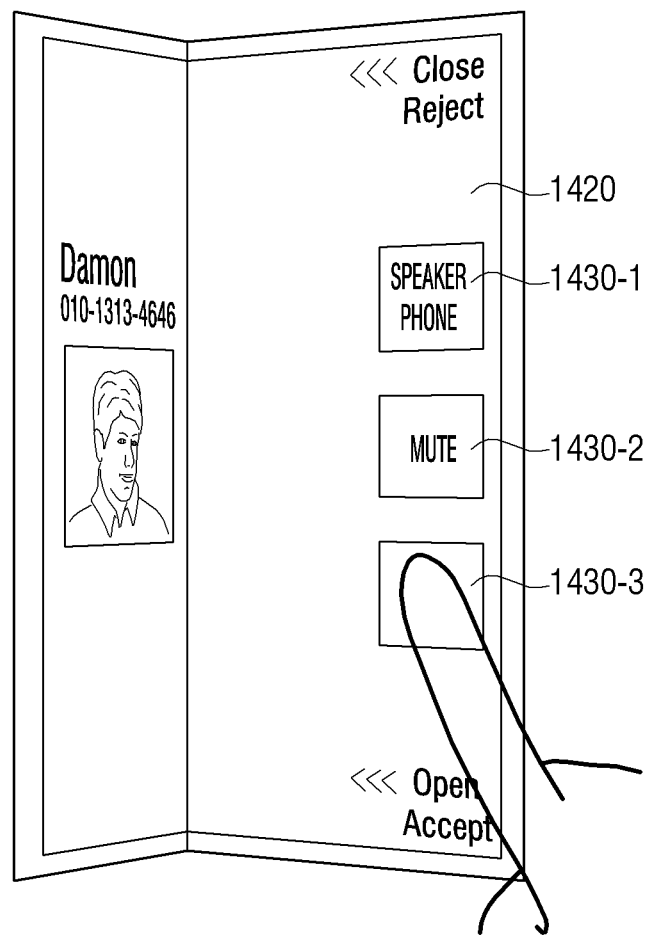

If the first unfolding interaction of unfolding a hinge angle of the display 230 as much as a predetermined angle (for example, 30° to 150°) is detected while the UI 1410 informing that a call request is received is displayed, the controller 290 may control the display 230 to display a UI 1420 including a plurality of icons 1430-1 to 1430-3 for performing various functions in relation with making a call as illustrated in FIG. 14B.

Figure 14C:
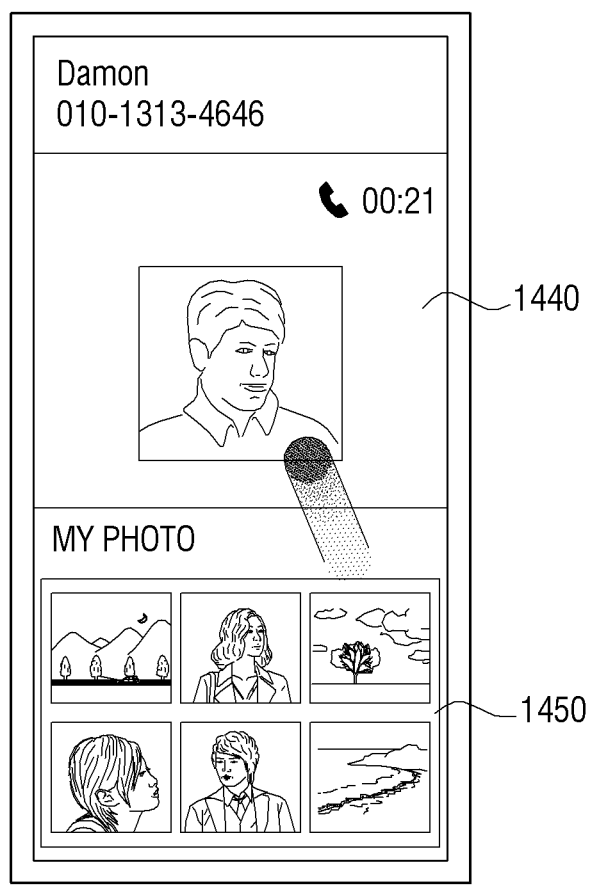

If an unfolding interaction of unfolding the display 230 completely (that is, unfolding the display 230 such that a hinge angle of the display 230 becomes 180°) is detected while a photo sharing icon is touched from among the plurality of icons 1430-1 to 1430-3, the controller 290 may accept a call request, and as illustrated in FIG. 14C, may control the display 230 to display a call screen 1440 on the upper area and a list 1450 for selecting a photo to be shared. In this case, if a touch interaction of dragging one of a plurality of photos included in the list 1450 to the call screen 1440 is selected, the controller 290 may control the communicator 240 to transmit the photo where the touch interaction is detected to a receiver.

If an unfolding interaction is detected, the controller 290 may control the display 230 to display a plurality of guidance messages according to a hinge angle of the display 230 while the unfolding interaction is detected. In this case, the guidance messages may include a guidance message for informing an incoming text message, a guidance message for informing an absence call, a guidance message for informing an incoming an SNS message or SMS message, a guidance message for informing update of applications, etc.

Figure 15A:
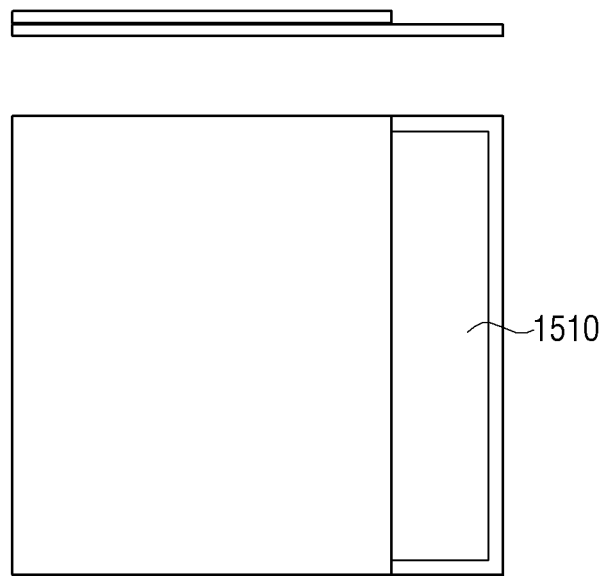

Specifically, as illustrated in FIG. 15A, the controller 290 may control the display 230 to display one guidance message while the display 230 is folded. Subsequently, if an unfolding interaction of unfolding the display 230 is detected, the controller 290 may control the display 230 to display the different number of guidance messages according to a hinge angle of the display 230. For example, if a hinge angle of the display 230 is within a first angle range (for example, between 5° and 15°), the controller 290 may control the display 230 to display two guidance messages 1510, 1520. If a hinge angle of the display 230 is within a second angle range (for example, between 15° and 25°), the controller 290 may control the display 230 to display three guidance messages 1510, 1520, 1530. That is, the controller 290 may increase the number of guidance messages displayed as a hinge angle of display 230 becomes greater.

Figure 15B:
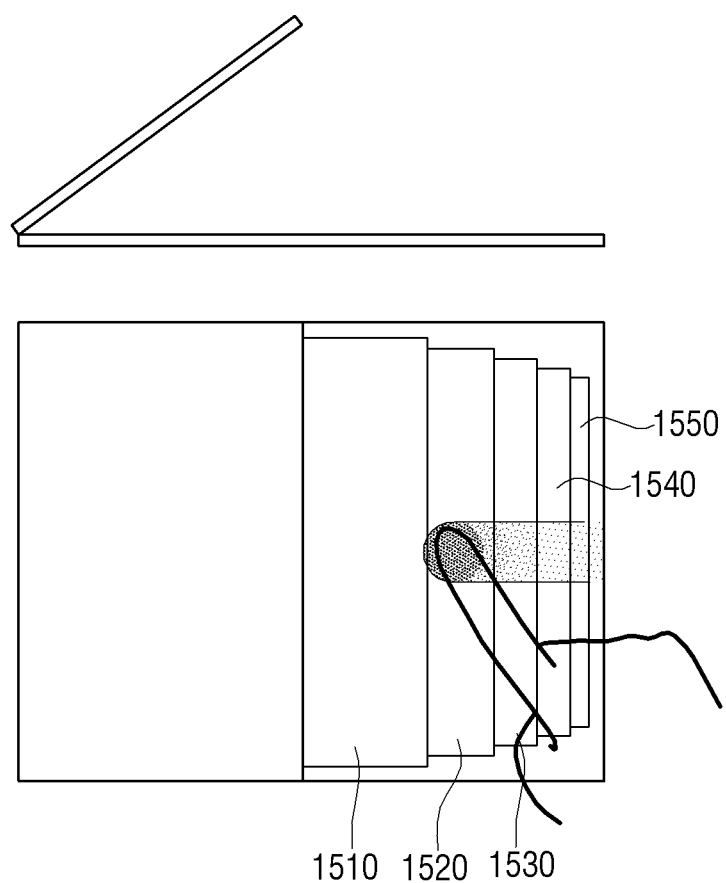

If a hinge angle of the display 230 is within a fourth angle range (for example, between 35° and 45°), the controller 290 may control the display 230 to display five guidance messages (possibly overlapping) 1510 to 1550 as illustrated in FIG. 15B. In this case, as illustrated in FIG. 15B, the first guidance message 1510 which is updated most recently may be disposed on the top.

Figure 15C:
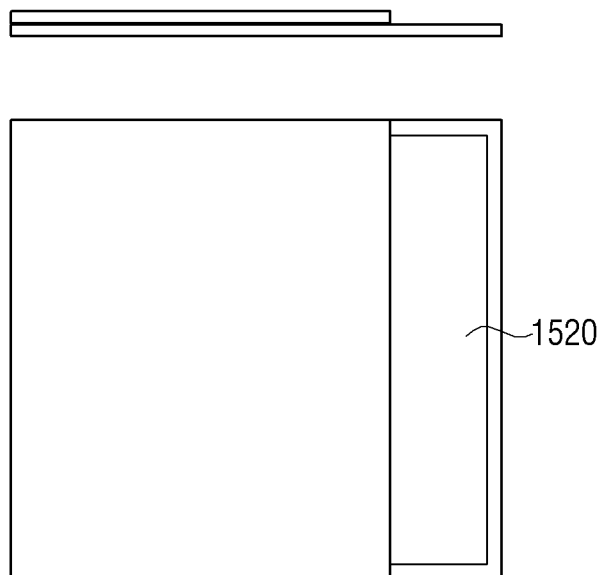

As illustrated in FIG. 15B, if a folding interaction of folding the display 230 again is detected when the second guidance message 1520 is touched while the five guidance messages 1510 to 1550 are displayed, the controller 290 may control the display 230 to display the second guidance message 1520 on the exposure area as illustrated in FIG. 15C.

Figure 15D:
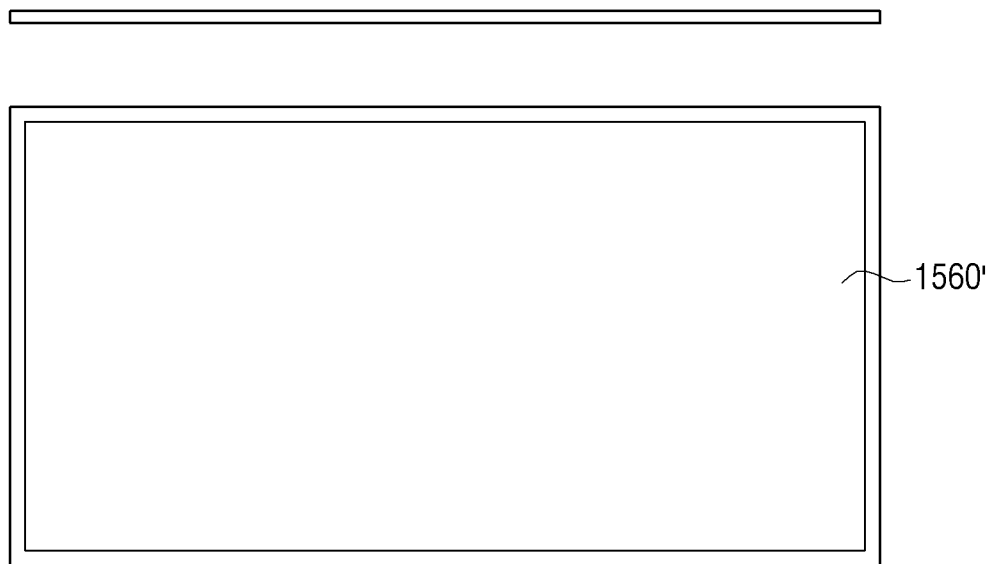

In addition, as illustrated in FIG. 15B, if an unfolding interaction of unfolding the display 230 completely is detected when the second guidance message 1520 is touched while the five guidance messages 1510 to 1550 are displayed, the controller 290 may control the display 230 to display a screen corresponding to the second guidance message 1520 on full screen as illustrated in FIG. 15D.

Further, the controller 290 may perform different functions according to the direction of a touch interaction which is detected on the exposure area while the display 230 is folded.

Figure 16A:
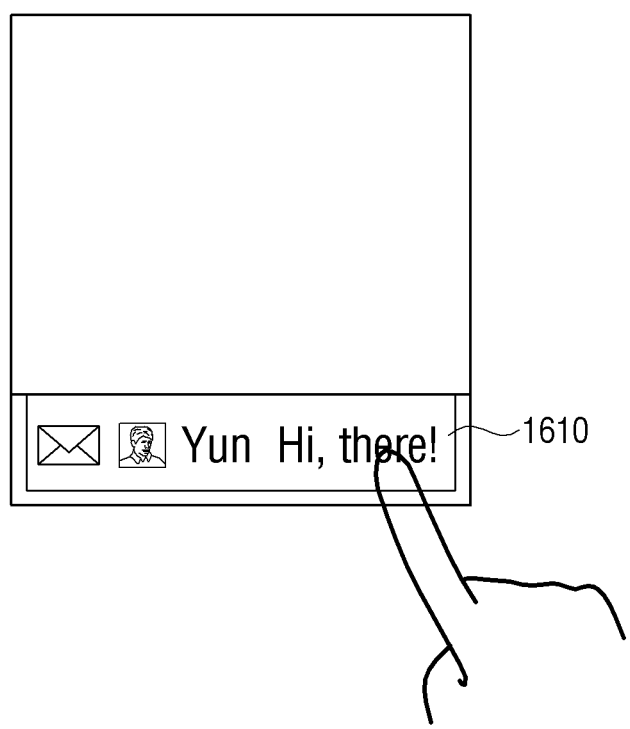
Figure 16B:
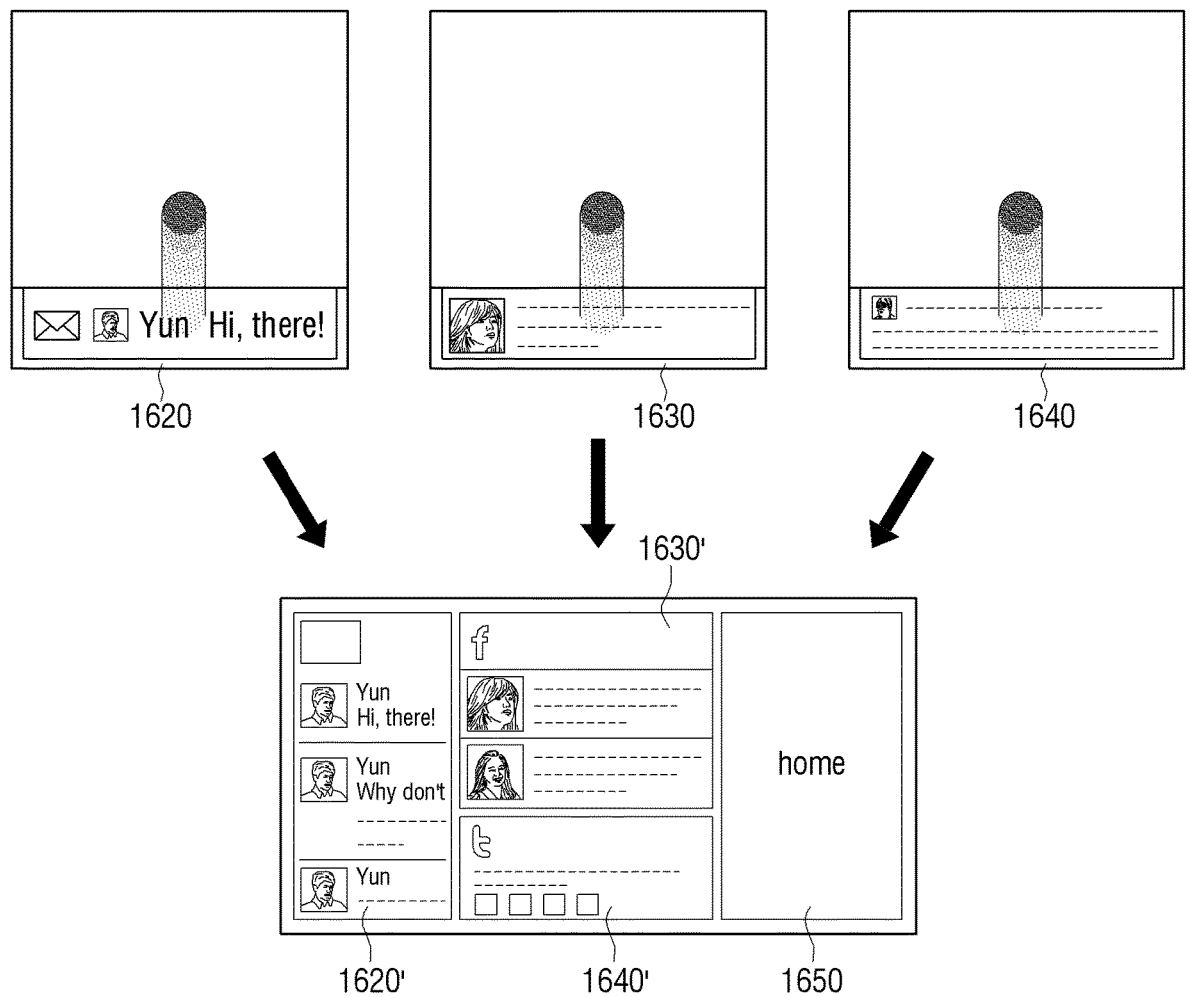

Specifically, if a message is received from outside while the display 230 is folded, the controller 290 may control the display 230 to display a UI 1610 informing that the message is received on the exposure area as illustrated in FIG. 16A.

In this case, if a touch interaction in the left-and-right direction is detected on the UI 1610 informing that a message is received, the controller 290 may control the display 230 to display a UI informing the previous message or the next message on the exposure area according to the touch interaction.

If a touch interaction in the down direction is detected on the UI 1610 informing that a message is received, the controller 290 may delete a currently-received message.

If a touch interaction in the up direction is detected on the UI 1610 informing that a message is received, the controller 290 may store the received messages. Specifically, as illustrated in the upper left side of FIG. 16B, if a touch interaction in the up direction is detected on a UI 1620 informing that a first message is received, a touch interaction in the up direction is detected on a UI 1630 informing a second message is received, a touch interaction in the up direction is detected on a UI 1640 informing that a third message is received and then, an unfolding interaction of unfolding the display 230 is detected, the controller 290 may control the display 230 to display a screen 1620' including the first message, a screen 1630' including the second message, a screen 1640' including the third message and a home screen 1650 as illustrated in the lower right side of FIG. 16B.

<Maintain the Current Function Despite the Change in the Shape of the Display 230>

The controller 290 may maintain the current function even if the shape of the display 230 changes according to a folding interaction or an unfolding interaction, and control the display 230 to display a screen corresponding to the current function.

Figure 17A:
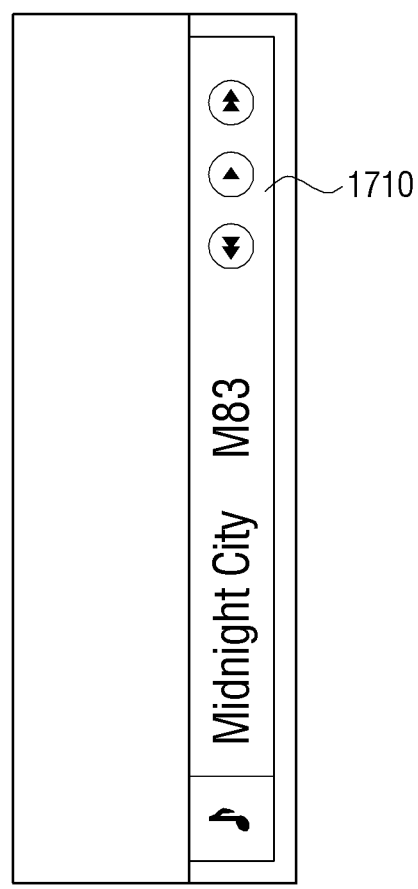
FIGS. 17A to 23B are views illustrating an exemplary embodiment where a user terminal device maintains a function when a folding interaction and an unfolding interaction are detected according to various exemplary embodiments.
Figure 17B:
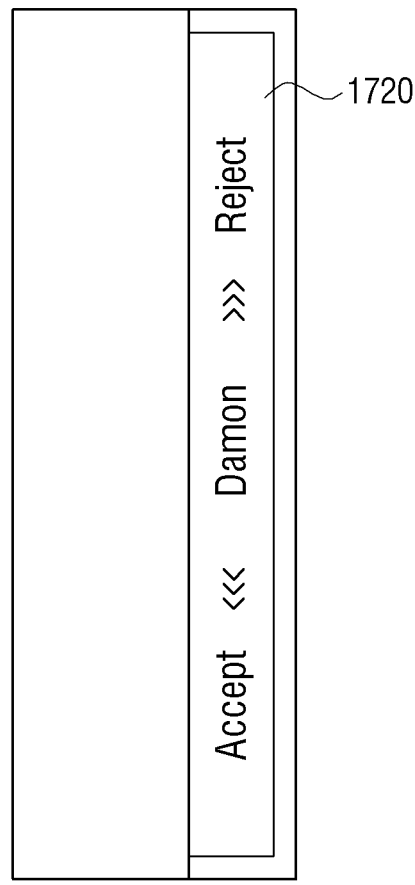
Figure 17C:
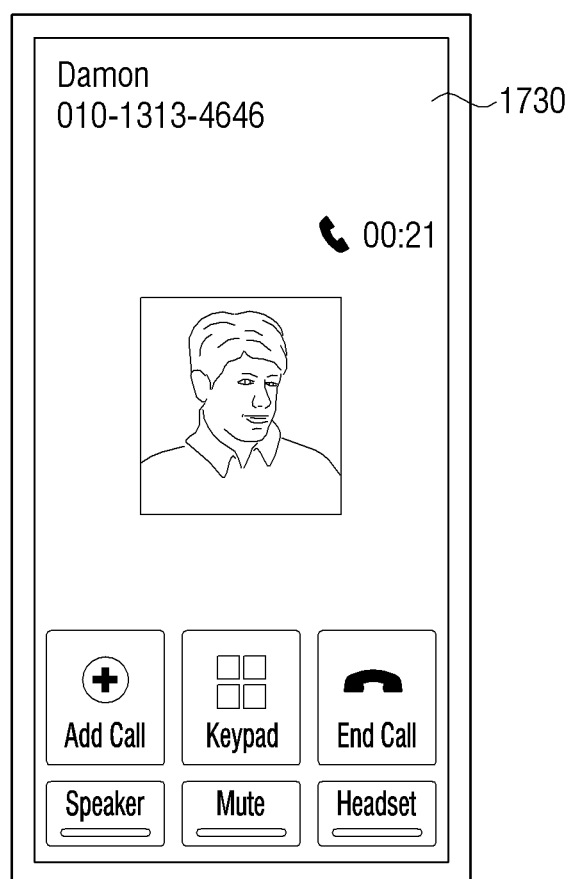
Figure 17D:
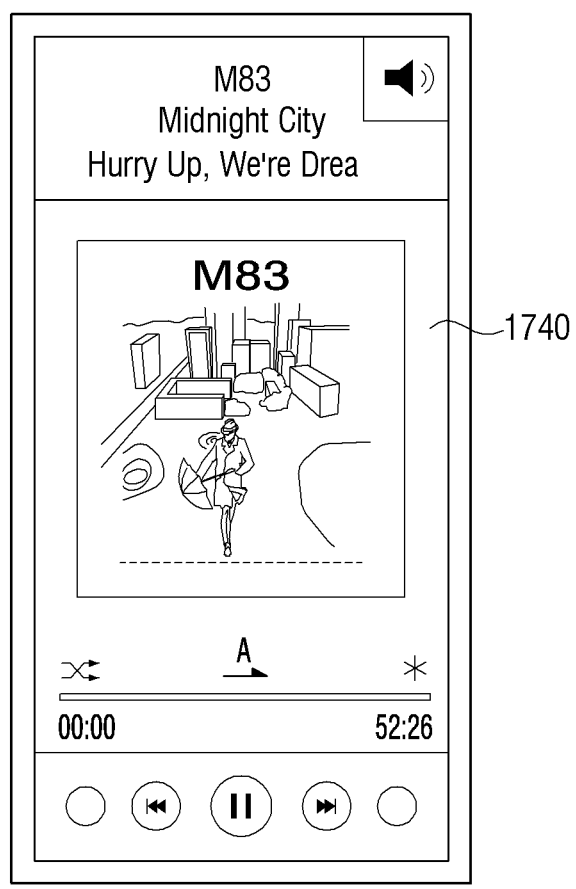
Figure 17E:
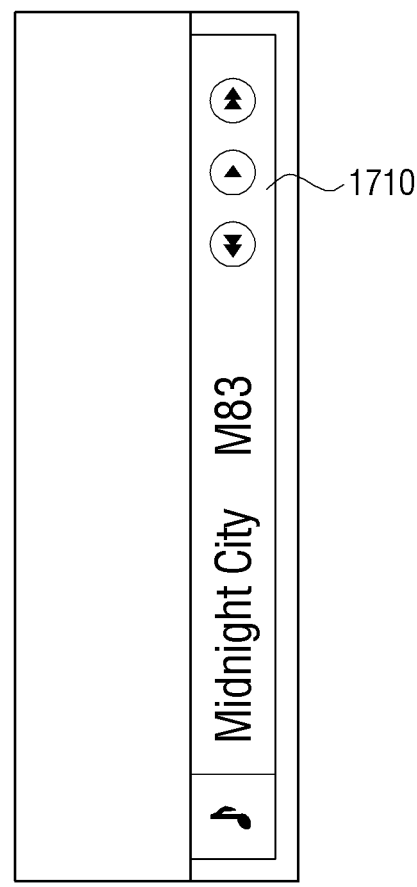

According to an exemplary embodiment, if a folding interaction of folding the display 230 is detected while a music application is executed, the controller 290 may control the display 230 to display a UI 1710 corresponding to the music application on the exposure area as illustrated in FIG. 17A. If a call request is received while the UI 1710 corresponding to the music application is displayed on the exposure area, the controller 290 may control the display 230 to display a UI 1720 informing that a call request is received on the exposure area as illustrated in FIG. 17B. If an unfolding interaction of unfolding the display 230 is detected while the UI 1720 informing that a call request is received is displayed on the exposure area, the controller 290 may control the display 230 to display a call screen 1730 on full screen as illustrated in FIG. 17C. Subsequently, when the telephone call is completed, the controller 290 may control the display 230 to display an execution screen 1740 of the music application on full screen as illustrated in FIG. 17D. If a folding interaction of folding the display 230 is detected again, the controller 290 may control the display 230 to display the UI corresponding to the music application on the exposure area as illustrated in FIG. 17E.

Figure 18A:
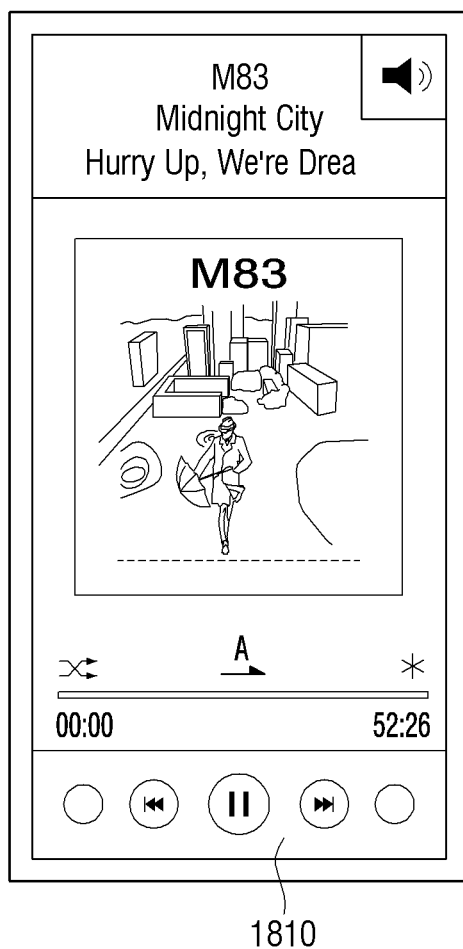
Figure 18B:
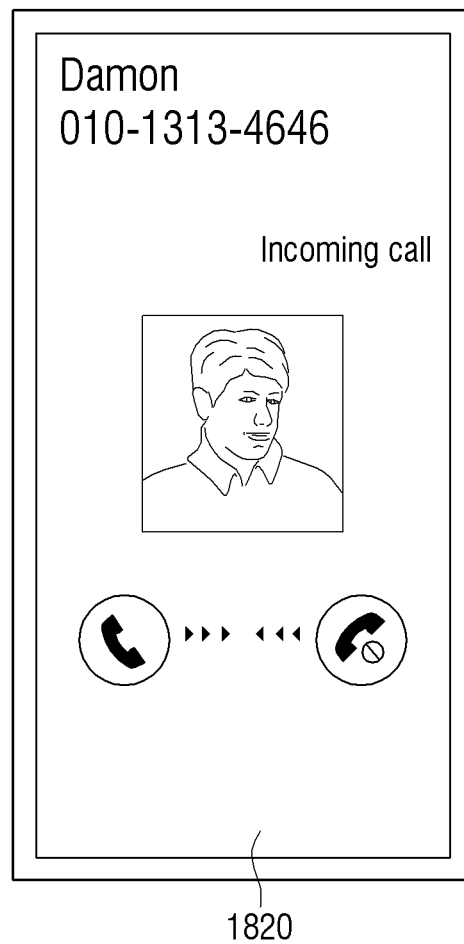
Figure 18C:
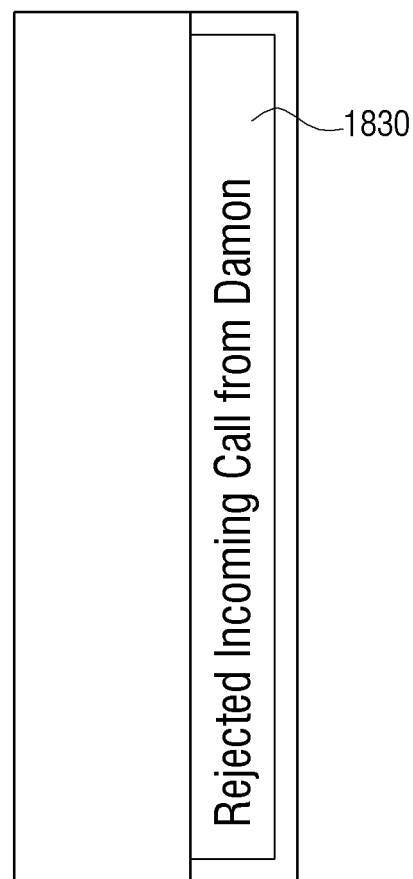
Figure 18D:
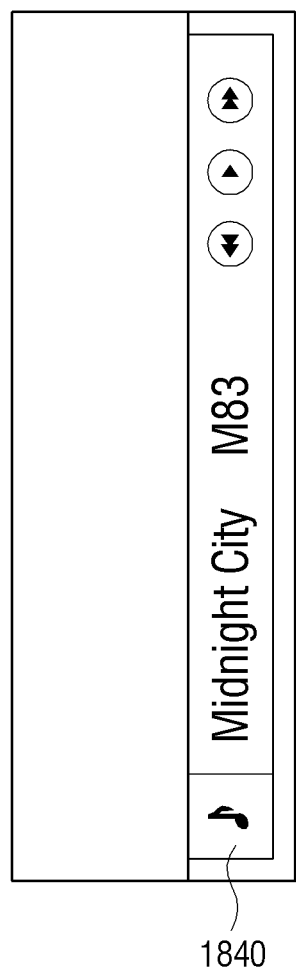
Figure 18E:
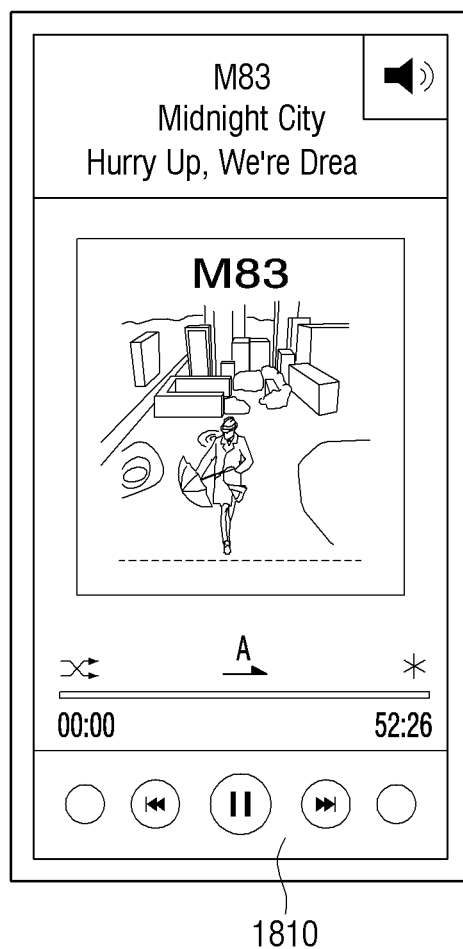

According to another exemplary embodiment, as illustrated in FIG. 18A, the controller 290 may control the display 230 to display an execution screen 1810 of a music application on full screen while the music application is executed. If a call request is received from outside, the controller 290 may control the display 230 to display a screen 1820 for confirming whether to accept the call request as illustrated in FIG. 18B. If a folding interaction of folding the display 230 is detected while the screen 1820 for confirming whether to accept the call request is displayed, the controller 290 may control the display 230 to display a UI 1830 informing that a call request is rejected on the exposure area as illustrated in FIG. 18C. When the telephone call is completed, the controller 290 may control the display 230 to display a UI 1840 corresponding to the music application on the exposure area as illustrated in FIG. 18D. Subsequently, if an unfolding interaction of unfolding the display 230 is detected again, the controller 290 may control the display 230 to display the execution screen 1810 of the music application on full screen as illustrated in FIG. 18E.

The controller 290 may determine a display area which can be watched by a user according to a hinge angle of the display 230, and control the display 230 to display a screen including different amount of information on the determined display area. In this case, the hinge angle of the display 230 may be matched with the watchable display area and then stored.

Figure 19A:
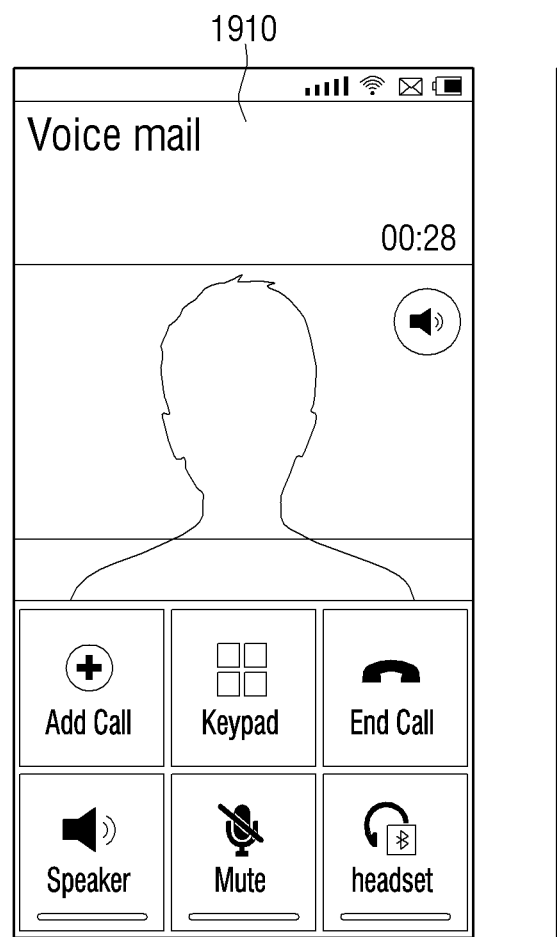

According to an exemplary embodiment, if the display 230 is unfolded while a telephone call is performed, the controller 290 may control the display 230 to display a first telephone call screen 1910 on full screen as illustrated in FIG. 19A.

Figure 19B:
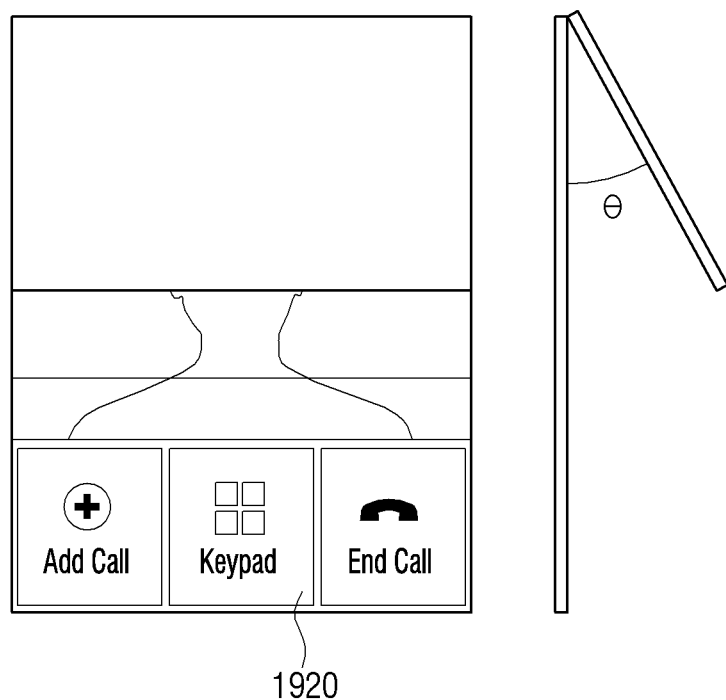

If a hinge angle of the display 230 is folded as much as Θ while a telephone call is performed, the controller 290 may determine a display area corresponding to the hinge angle, and as illustrated in FIG. 19B, may control the display 230 to display a second telephone call screen 1920 on the determined display area. In this case, the second telephone call screen 1920 may include the amount of information and icons which are smaller than those included in the first telephone call screen 1910.

Figure 19C:
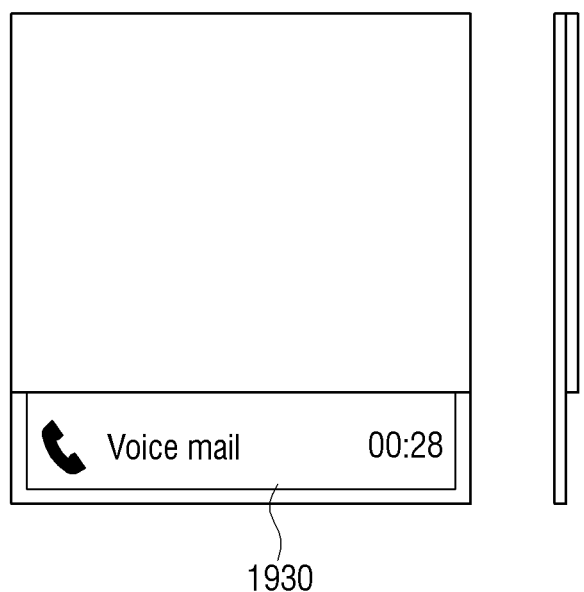

In addition, if the display 230 is folded while a telephone call is performed, the controller 290 may control the display 230 to display a UI 1930 informing that a telephone call is being performed on the exposure area as illustrated in FIG. 19C.

Figure 20A:
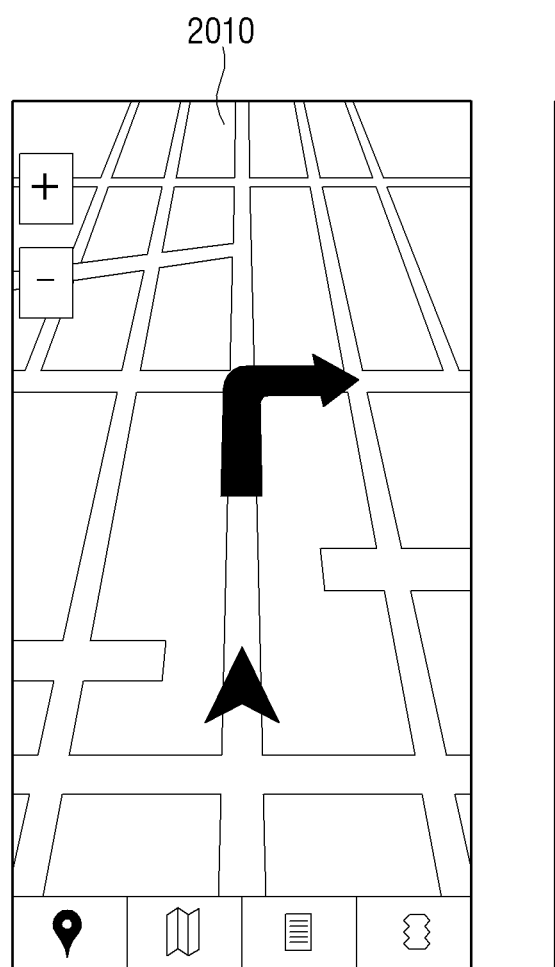

According to another exemplary embodiment, if the display 230 is unfolded while a navigation application is executed, the controller 290 may control the display 230 to display a first navigation screen 2010 on full screen as illustrated in FIG. 20A.

Figure 20B:
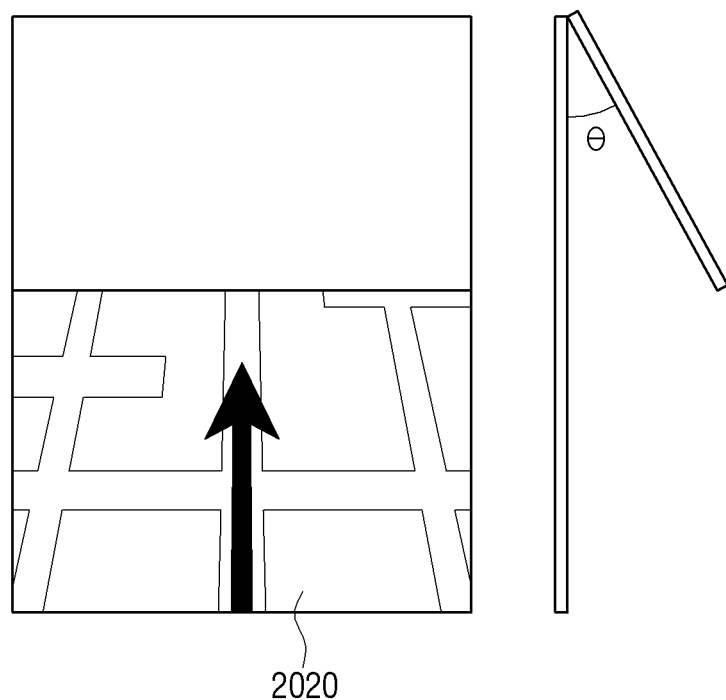

If a hinge angle of the display 230 is folded as much as Θ while a navigation application is executed, the controller 290 may determine a display area corresponding to the hinge angle, and as illustrated in FIG. 20B, may control the display 230 to display a second navigation screen 2020 on the determined display area. In this case, the guiding area of the second navigation screen 2020 may be smaller than the guiding area of the first navigation screen 2010.

Figure 20C:
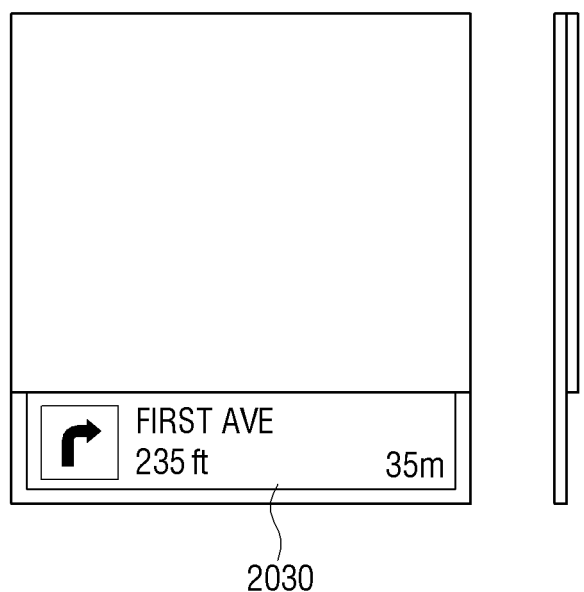

If the display 230 is folded while a navigation application is executed, the controller 290 may control the display 230 to display a third navigation screen 2030 on the exposure area as illustrated in FIG. 20C. In this case, the third navigation screen 2030 might include only direction information and distance information instead of a map screen included in the first navigation screen 2010 and the second navigation screen 2020. However, a map screen may also be included on the exposure area in third navigation screen 2030.

Whenever if a folding interaction or an unfolding interaction is detected, the controller 290 may control the display 230 to reconfigure and display information such that the information corresponds to the size and direction of a screen.

Figure 21A:
Figure 21B:
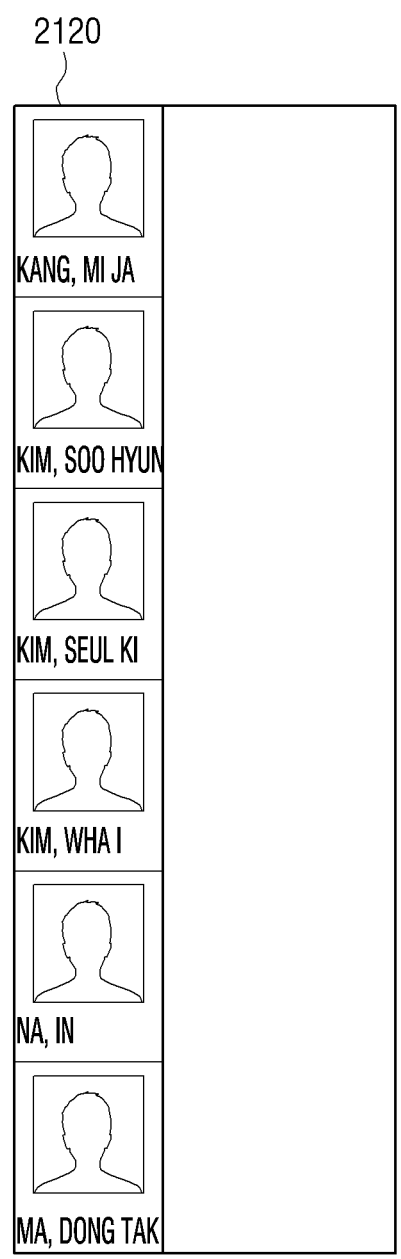

Specifically, as illustrated in FIG. 21A, if a folding interaction of folding the display 230 is detected while a first address book list 2110 is displayed on full screen, the controller 290 may control the display 230 to display a second address book list 2120 on the exposure area as illustrated in FIG. 21B. In this case, the first address book list 2110 might include user information such as image, name, telephone number, direct call icon, etc., and the second address book list 2120 might include user information such as image and name only, but the display is not limited to this.

Figure 22A:
Figure 22B:
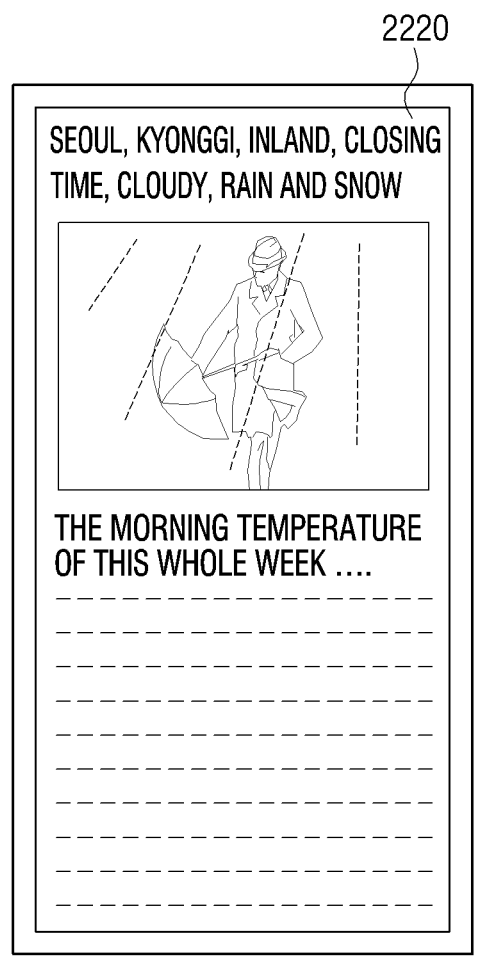

In addition, as illustrated in FIG. 22A, if an unfolding interaction of unfolding the display 230 is detected while a news title 2210 is displayed on the exposure area when the display 230 is folded, the controller 290 may control the display 230 to display a full screen 2220 including not only the news title but also the news image and the news text as illustrated in FIG. 22B.

Figure 23A:
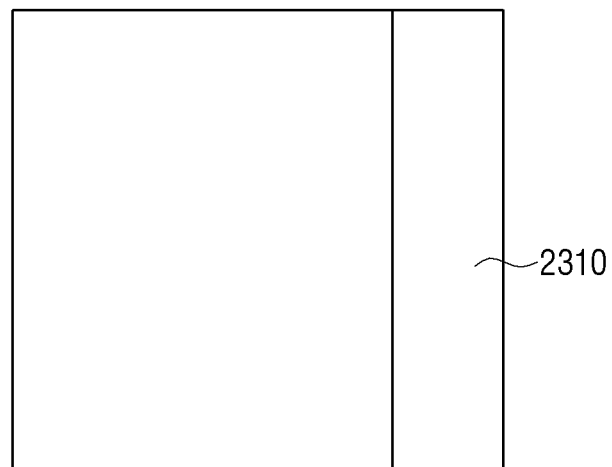
Figure 23A:
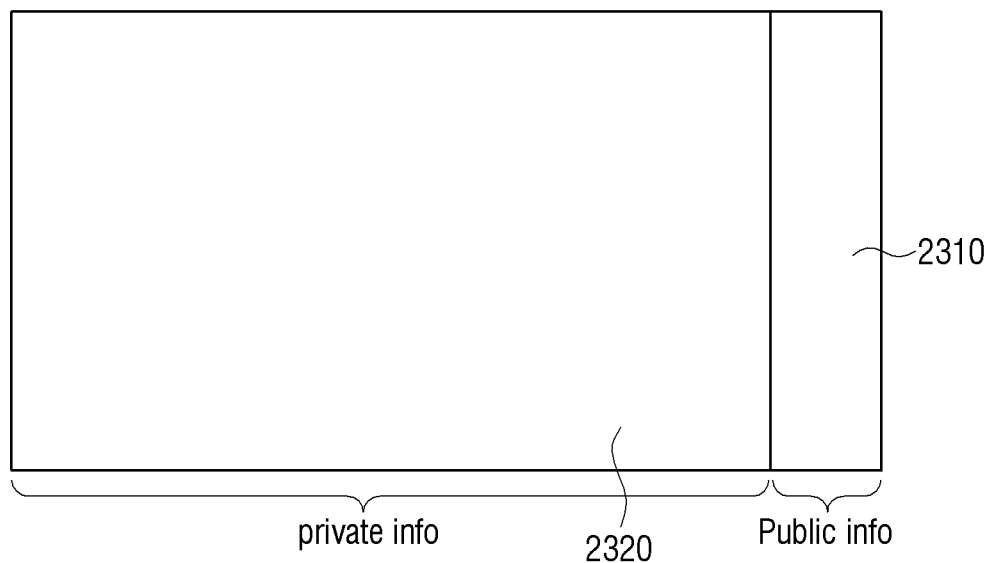
Figure 23B:
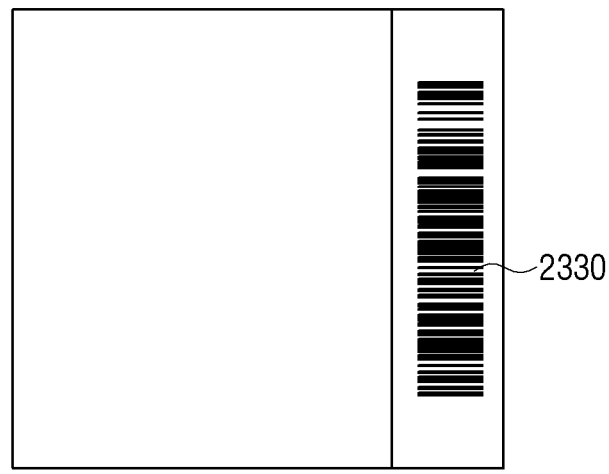
Figure 23B:
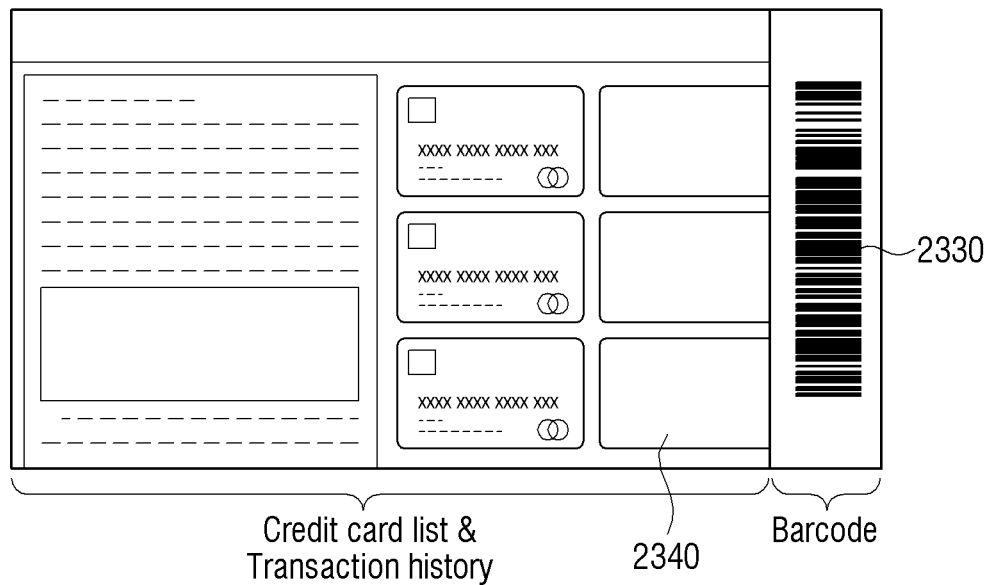

In addition, the controller 290 may control the display 230 to display different information on the exposure area and the hidden area when the display 230 is folded. In this case, as illustrated in FIG. 23A, the controller 290 may control the display 230 to display public information on an exposure area 2310 and private information on a hidden area 2320. For example, as illustrated in FIG. 23B, the controller 290 may control the display 230 to display barcode information which is public information on the exposure area 2330, and credit card list and transaction information which is private information on the hidden area 2340.

Figure 24:
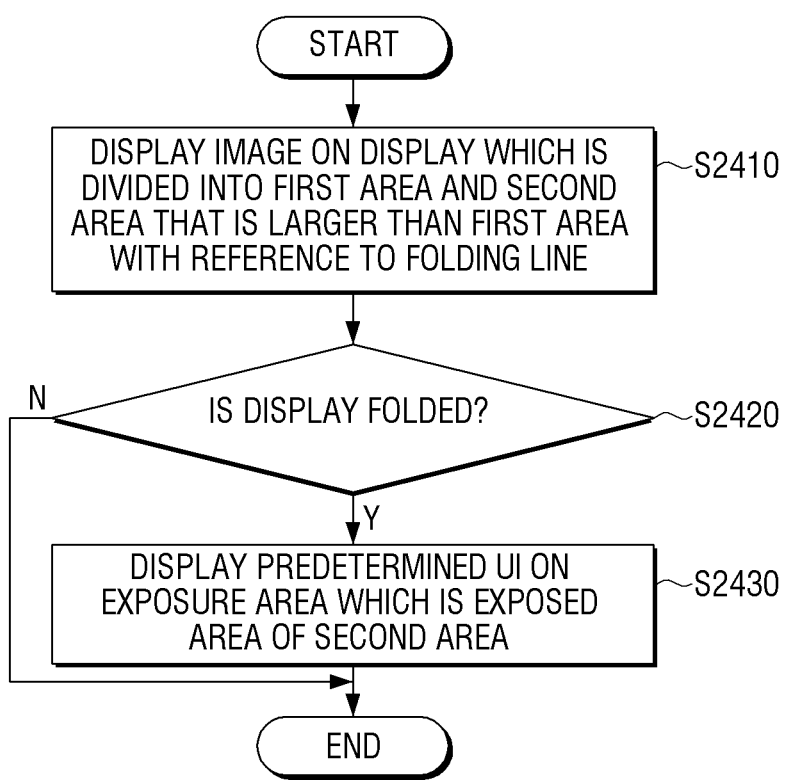
FIG. 24 is a flowchart illustrating a display method of a user terminal device according to an exemplary embodiment.

Hereinafter, a displaying method of the user terminal device 200 according to an exemplary embodiment will be described with reference to FIG. 24.

Specifically, the user terminal device 200 displays an image on the display 230 which is divided into a first area and a second area which is larger than the first area with reference to a folding line (S2410).

The user terminal device 200 determines whether the display 230 is folded or not (S2420).

If the display 230 is folded (S2420—Y), the user terminal device 200 displays a predetermined UI on the exposure area which is an exposed part of the second area (S2430). In this case, the predetermined UI may include a UI including state information of the user terminal device 200 and a UI for controlling the user terminal device 200.

As described above, a UI is displayed on the exposure area which is exposed to outside when the display 230 is folded and thus, a user may perform various functions of the user terminal device through the UI displayed on the exposure area and receive various information even if the display is folded.

FIGS. 25A to 27B are views provided to explain an exemplary embodiment of performing various functions of a user terminal device based on a folding interaction and an unfolding interaction according to various exemplary embodiments.

According to an exemplary embodiment, if an unfolding interaction is detected while a UI for informing that a message is received from outside is displayed when the display 230 is folded, the controller 290 may control the display 230 to display the message received from outside.

Figure 25A:
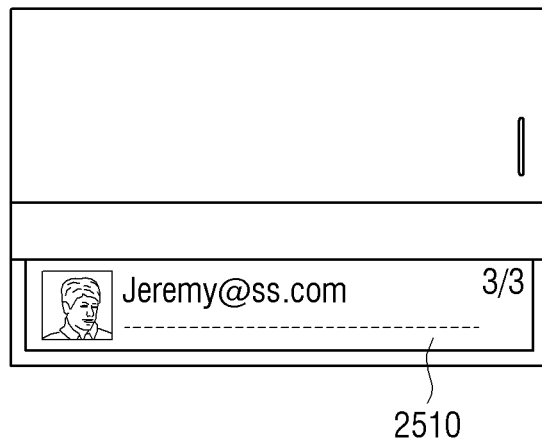
FIGS. 25A to 27B are views illustrating an exemplary embodiment where a user terminal device performs various functions according to a folding interaction and an unfolding interaction.
Figure 25B:
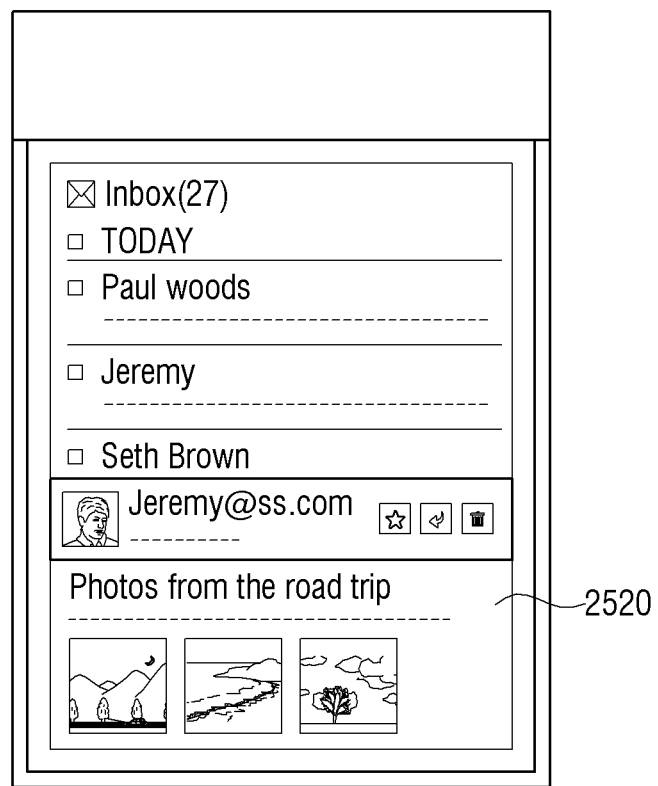

Specifically, if an SNS message or SMS message is received while the display 230 is folded, the controller 290 may control the display 230 to display a UI 2510 informing that the SNS message or SMS message is received on the exposure area as illustrated in FIG. 25A. In this case, the UI 2510 informing that an SNS message or SMS message is received may include sender, time of the message being sent, message title, and partial content, etc. of the received SNS message or SMS message. If an unfolding interaction of unfolding the display 230 which is in a folding state is detected, the controller 290 may control the display 230 to display the detailed contents of the SNS message or SMS message received as illustrated in FIG. 25B. In this case, the detailed contents of the SNS message or SMS message may include sender, the time of the message being sent, message title, the detailed contents, SNS message editing icon, or SMS message editing icon, etc.

According to another exemplary embodiment, if a folding interaction is detected while a specific application is executed when the display 230 is in an unfolding state, the controller 290 may control the display 230 to display a graphic effect related to the execution screen of the specific application on the exposure area.

Figure 26A:
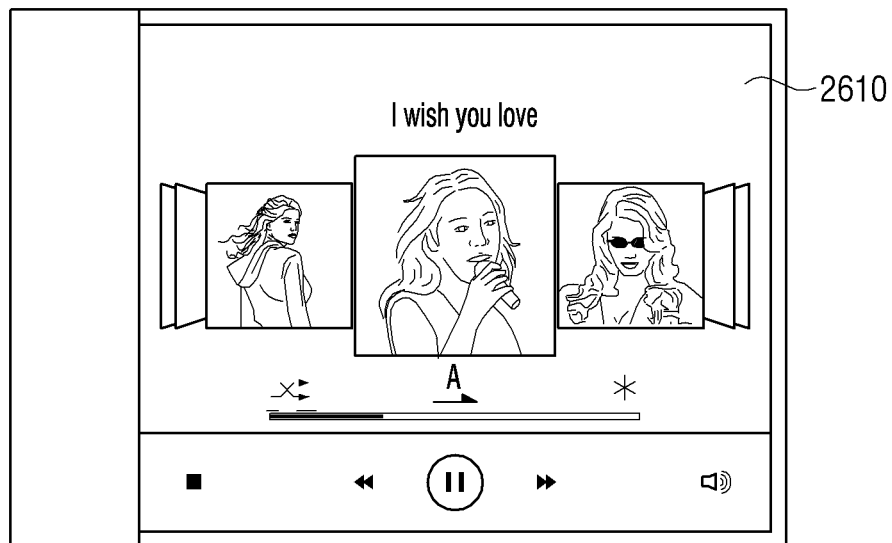
Figure 26B:
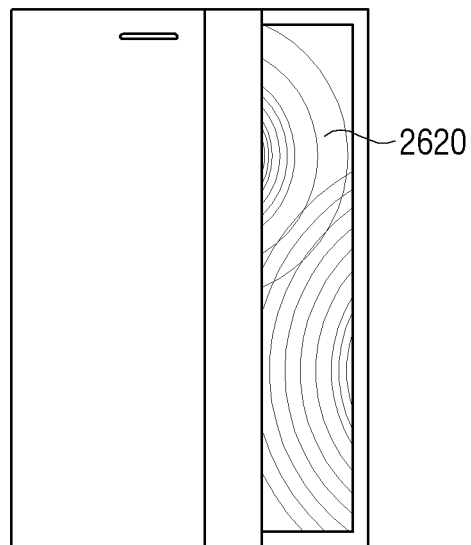

Specifically, as illustrated in FIG. 26A, if a folding interaction is detected while an execution screen 2610 of a music application is displayed when the display 230 is in an unfolding state, the controller 290 may control the display 230 to display an equalizer animation 2620 of the music which is currently played on the exposure area as illustrated in FIG. 26B.

Figure 27A:
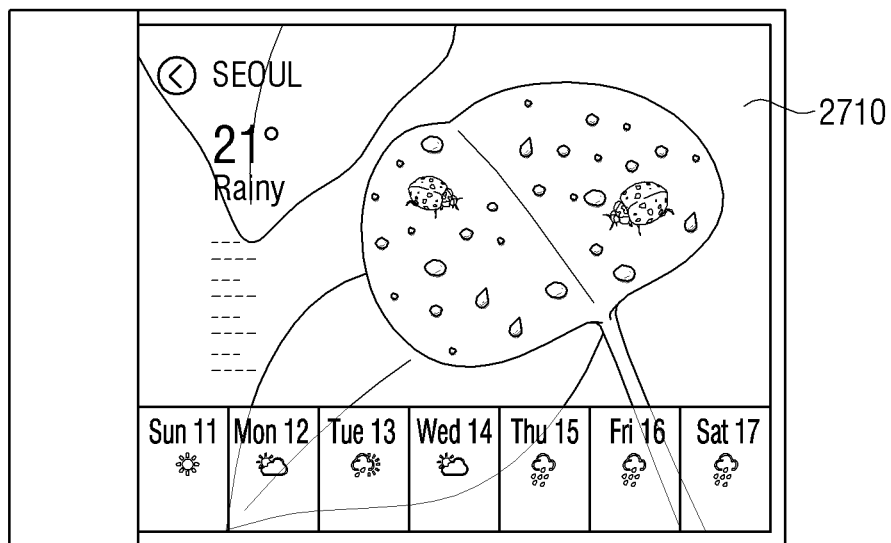
Figure 27B:
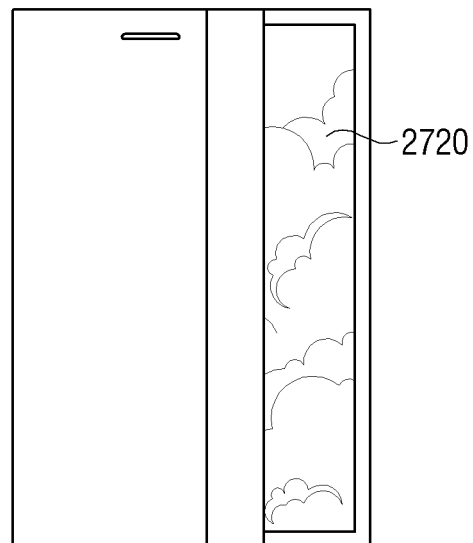

In addition, as illustrated in FIG. 27A, if a folding interaction is detected while an execution screen 2710 of a weather application is displayed when the display 230 is in an unfolding state, the controller 290 may control the display 230 to display an animation 2720 related to the current weather (for example, cloudy sky) on the exposure area as illustrated in FIG. 27B.

Meanwhile, in the above exemplary embodiment, the exposure area is an area exposed to outside, without being covered by a specific cover, but this is only an example. The exposure area may be protected and covered by a specific cover.

According to an exemplary embodiment, the user terminal device 200 may include a transparent cover on the exposure area in order to protect the exposure area.

Figure 28A:
FIGS. 28A to 31B are views illustrating an exemplary embodiment where a cover covers up an exposure area according to another exemplary embodiment.
Figure 28B:
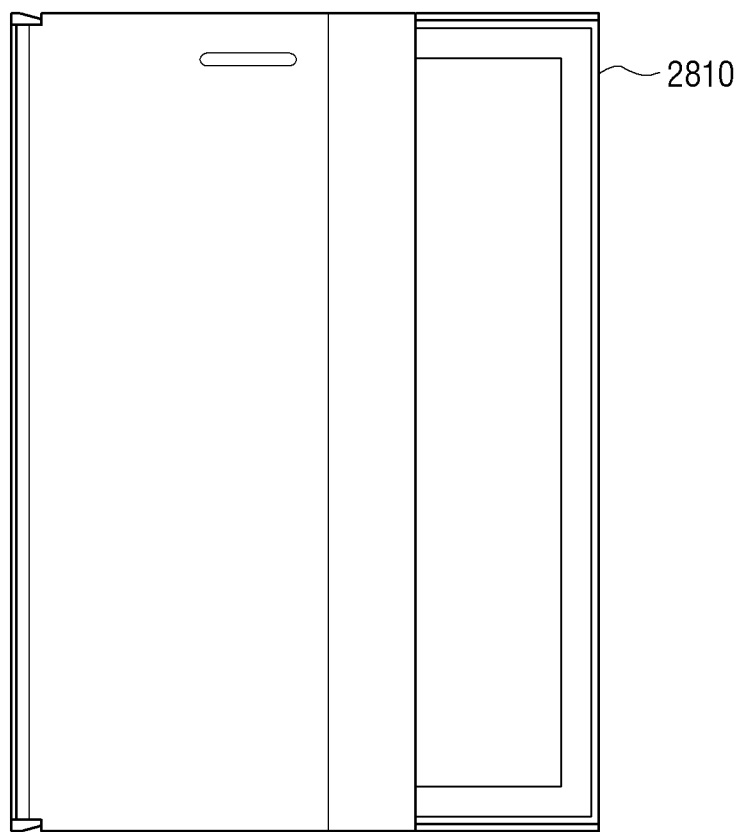
Figure 28C:
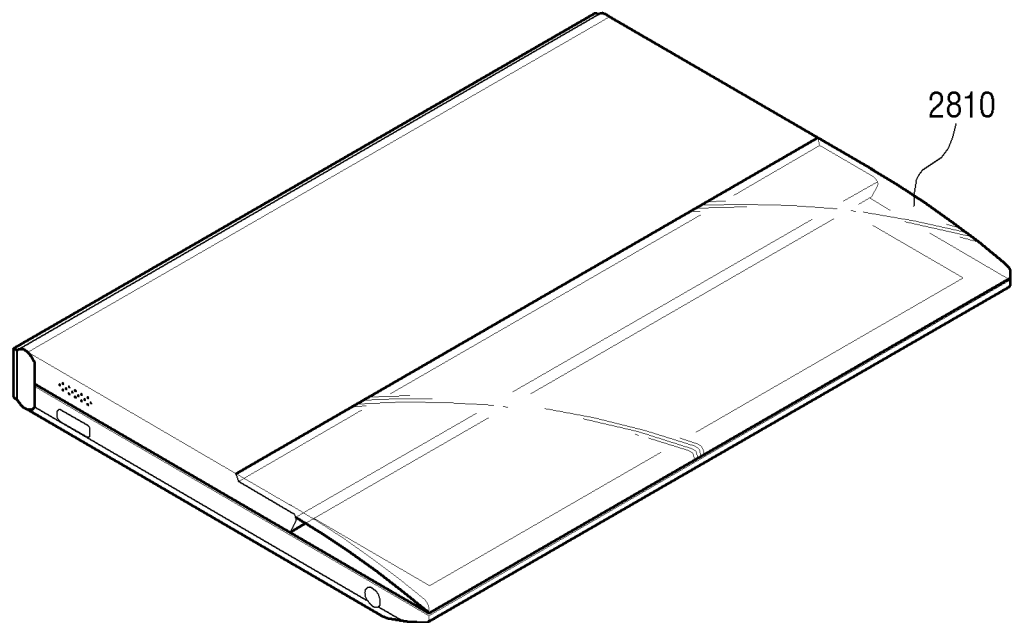
Figure 28D:
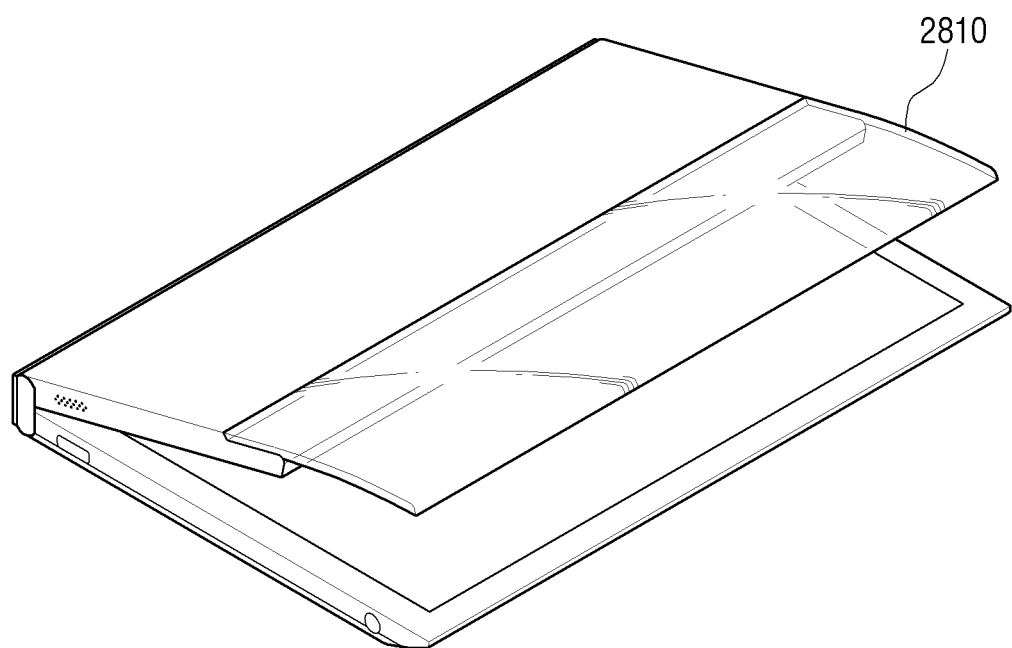

For example, if a folding line is in parallel with a longer side, the user terminal device 200 may include a transparent cover 2810 as illustrated in FIGS. 28A to 28D. FIG. 28A is a side view of the user terminal device 200 including the transparent cover 2810, FIG. 28B is a plane view of the user terminal device 200 including the transparent cover 2810, FIG. 28C is a perspective view of the user terminal device including the transparent cover 2810 which is in a folding state, and FIG. 28D is a perspective view of the user terminal device 200 including the transparent cover 2810, which is unfolded at a specific angle.

Figure 29A:
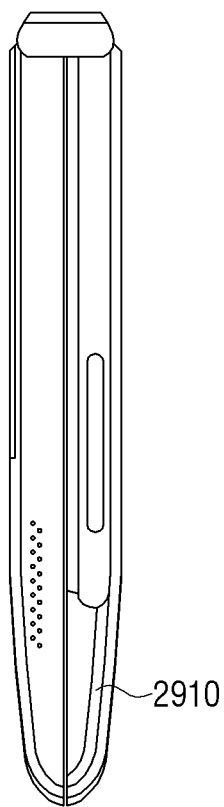
Figure 29B:
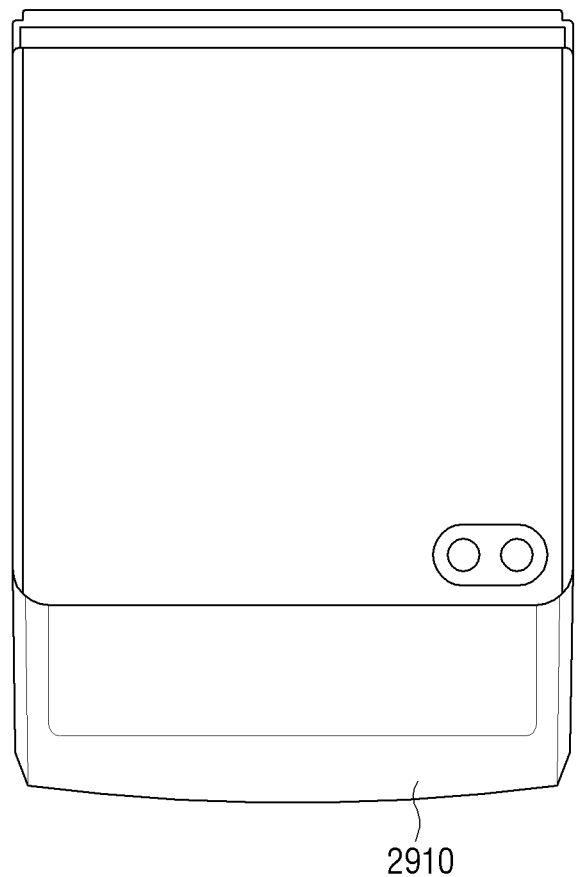
Figure 29C:
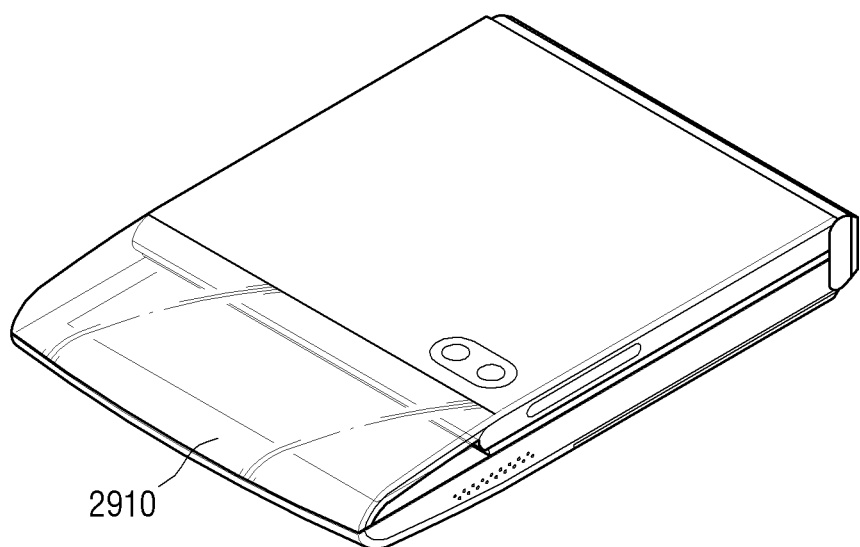

If a folding line is in parallel with a shorter side, the user terminal device 200 may include a transparent cover 2910 as illustrated in FIGS. 29A to 29C. FIG. 29A is a side view of the user terminal device 200 including the transparent cover 2910, FIG. 29B is a plane view of the user terminal device 200 including the transparent cover 2910, and FIG. 29C is a perspective view of the user terminal device 200 including the transparent cover 2910, which is in a folding state.

According to another exemplary embodiment, the user terminal device 200 may include a punching cover on the exposure area in order to protect the exposure area.

Figure 30A:
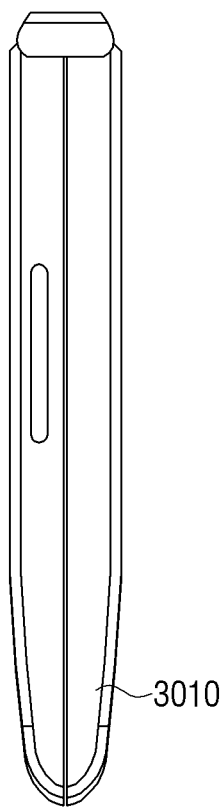
Figure 30B:
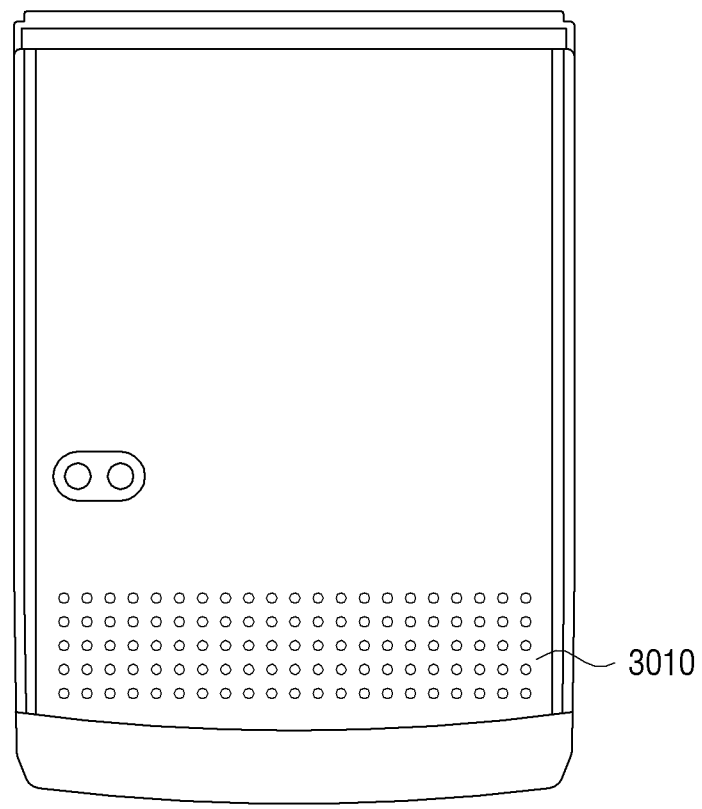
Figure 30C:
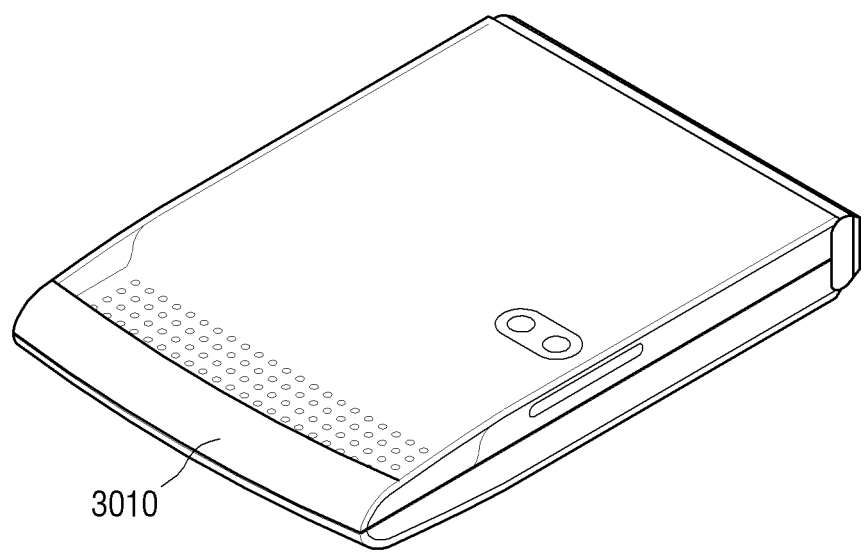

Specifically, the user terminal device 200 may include a punching cover 3010 where punch holes are formed on the lower side which comes in contact with the exposure area as illustrated in FIGS. 30A to 30C. FIG. 30A is a side view of the user terminal device 200 including the punching cover 3010, FIG. 30B is a plane view of the user terminal device 200 including the punching cover 3010, and FIG. 30C is a perspective view of the user terminal device 200 including the punching cover 3010, which is in a folding state. In particular, with the punching cover 3010, the user terminal device 200 may provide various information (for example, the current time, weather, a UI informing that a message is received, etc.) and image effects to a user by using the holes formed on the punching cover 3010.

With the transparent cover 2810, 2910, the controller 290 may sense a touch input in an area where the transparent cover 2810, 2910 is located while the display 230 is folded.

If a touch interaction of terminating a touch input is detected on a display cover area or a bezel area rather than the exposure area after the exposure area is touched while the display 230 is folded, the controller 290 may perform a predetermined function according to the detected touch interaction.

Figure 31A:
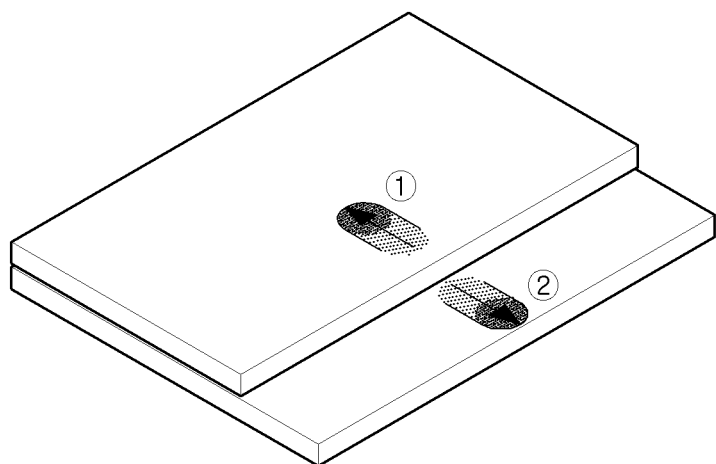
Figure 31B:
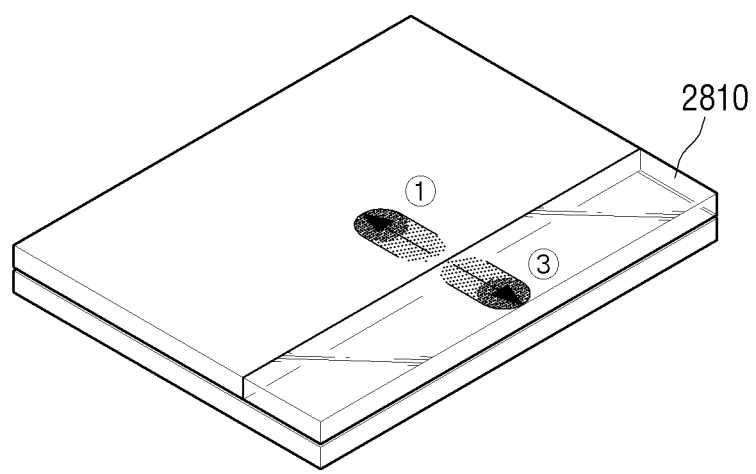

Specifically, as illustrated in ① of FIGS. 31A and 31B, if a touch interaction of terminating a touch input is detected on the upper side of the display cover area after the exposure area is touched when the display 230 is in a folding state, the controller 290 may perform a first function (for example, storing a message, etc.) according to the touch interaction. In addition, as illustrated in ② of FIG. 31A, if a touch interaction of terminating a touch input is detected on a bezel area of the lower side after the exposure area is touched when the display 230 is in a folding state, the controller 290 may perform a second function perform a second function (for example, deleting a message, etc.) according to the touch interaction. As illustrated in ③ of FIG. 31B, if a touch interaction of terminating a touch input is detected on a bezel area of the lower side after the exposure area is touched while the display 230 of the user terminal device 200 including the transparent cover 2810 is folded, the controller 290 may perform the second function (for example, deleting a message, etc.) according to the touch interaction.

A displaying method of a user terminal device according to one or more exemplary embodiments may be realized as a program and provided in a user terminal device. Specifically, a non-transitory computer readable medium which stores a program including a controlling method of a user terminal device may be provided.

The non-transitory recordable medium refers to a medium which may store data semi-permanently and may be readable by an apparatus. Specifically, the non-transitory readable medium may be CD, DVD, hard disk, Blu-ray disk, USB, memory card, ROM, etc.

The foregoing embodiments and advantages are merely exemplary and are not to be construed as limiting the present invention. The present teaching can be readily applied to other types of apparatuses. Also, the description of exemplary embodiments of the present inventive concept is intended to be illustrative, and not to limit the scope of the claims, and many alternatives, modifications, and variations will be apparent to those skilled in the art.

What is claimed is:

1. A user terminal device, comprising:
a first cover and a second cover;
a hinge which connects the first cover with the second cover;
a flexible display comprising a first display area and a second display area which is larger than the first display area, wherein the flexible display is mounted on opposite sides of the first cover and the second cover, and the flexible display is folded to be divided into the first display area and the second display area when the user terminal device is folded such that the first cover and the second cover face in opposite directions by the hinge;
a detector configured to detect a user interaction; and
a controller configured:
based on an event being received while the user terminal device is in a folded state, control the flexible display to display information related to the event on an exposure area of the second display area, the event being a communication event received from an external device through a communication unit, and
based on the information related to the event being touched and the user terminal device being unfolded from the folded state, control the flexible display to display an application screen for providing a response corresponding to the communication event received from the external device.

2. The user terminal device of claim 1, wherein the controller is further configured to, based on a message being received from the external device while the user terminal device is in the folded state, control the flexible display to display information related to the message on the exposure area, and
based on the information related to the message being touched and the user terminal device being unfolded from the folded state, control the flexible display to display an application screen for providing a response to the message.

3. The user terminal device of claim 2, wherein the information related to the message includes an indicator indicating that the message is received.

4. The user terminal device of claim 1, wherein the controller is further configured to,
based on a call reception event being received from the external device while the user terminal device is in the folded state, control the flexible display to display information related to the call reception event on the exposure area, and
based on the information related to the call reception event being touched, and the user terminal device being unfolded from the folded state, control the flexible display to display an application screen related to the call reception event.

5. The user terminal device of claim 4, wherein the information related to the call reception event includes a UI element for accepting or refusing the call reception event.

6. The user terminal device of claim 1, wherein the controller is further configured to control the flexible display to display information on the exposure area while the user terminal device is in the folded state, and based on the event being received while the information is being displayed on the exposure area, control the flexible display to display the information related to the event on the exposure area together with the information.

7. A displaying method of a user terminal device comprising a first cover and a second cover, a hinge which connects the first cover with the second cover, and a flexible display comprising a first display area and a second display area which is larger than the first display area, wherein the flexible display is mounted on opposite sides of the first cover and the second cover, and the flexible display is folded to be divided into the first display area and the second display area when the user terminal device is folded such that the first cover and the second cover face in opposite directions by the hinge, the method comprising:
based on an event being received while the user terminal device is in a folded state, displaying information related to the event on an exposure area of the second display area, the event being a communication event received from an external device through a communication unit; and
based on the information related to the event being touched and the user terminal device being unfolded from the folded state, displaying an application screen for providing a response corresponding to the communication event received from the external device.

8. The displaying method of claim 7, wherein the displaying of the information related to the event comprises, based on a message being received from the external device while the user terminal device is in the folded state, displaying information related to the message on the exposure area, and
wherein the displaying of the application screen comprises, based on the information related to the message being touched and the user terminal device being unfolded from the folded state, displaying an application screen for providing a response to the message.

9. The displaying method of claim 8, wherein the information related to the message includes an indicator indicating that the message is received.

10. The displaying method of claim 7, wherein the displaying of the information related to the event comprises, based on a call reception event being received from the external device while the user terminal device is in the folded state, displaying information related to the call reception event on the exposure area, and
wherein the displaying of the application screen comprises, based on the information related to the call reception event being touched and the user terminal device being unfolded from the folded state, displaying an application screen related to the call reception event.

11. The displaying method of claim 10, wherein the information related to the call reception event includes a UI element for accepting or refusing the call reception event.

12. The displaying method of claim 7, further comprising: displaying information on the exposure area while the user terminal device is in the folded state,
wherein the displaying of the information related to the event comprises, based on the event being received while information is being displayed on the exposure area, displaying the information related to the event on the exposure area together with the information.

* * * * *